(12) United States Patent  (10) Patent No.: US 7,773,088 B2
Keller et al.  (45) Date of Patent: Aug. 10, 2010

(54) SIMULTANEOUS SIMULATION OF MARKOV CHAINS USING QUASI-MONTE CARLO TECHNIQUES

(75) Inventors: Alexander Keller, Ulm (DE); Carsten Waechter, Ulm (DE)

(73) Assignee: Mental Images GmbH, Berlin (DE)

( * ) Notice: Subject to any disclaimer, the term of this patent is extended or adjusted under 35 U.S.C. 154(b) by 297 days.

(21) Appl. No.: 11/839,161

(22) Filed: Aug. 15, 2007

(65) Prior Publication Data

US 2008/0100617 A1  May 1, 2008

Related U.S. Application Data

(63) Continuation-in-part of application No. 11/474,517, filed on Jun. 23, 2006, now Pat. No. 7,499,053, and a continuation-in-part of application No. 10/299,574, filed on Nov. 19, 2002, now Pat. No. 7,184,042, which is a continuation-in-part of application No. 09/884,861, filed on Jun. 19, 2001, now Pat. No. 7,227,547.

(60) Provisional application No. 60/822,417, filed on Aug. 15, 2006, provisional application No. 60/693,231, filed on Jun. 23, 2005, provisional application No. 60/265,934, filed on Feb. 1, 2001, provisional application No. 60/212,286, filed on Jun. 19, 2000.

(51) Int. Cl.
*G06T 15/50* (2006.01)

(52) U.S. Cl. ..................................................... 345/426

(58) Field of Classification Search ........................ None
See application file for complete search history.

(56) References Cited

U.S. PATENT DOCUMENTS

| 6,028,606 | A  | * | 2/2000 | Kolb et al. ............ 345/419 |
| 6,529,193 | B1 |   | 3/2003 | Herken |
| 7,091,973 | B1 | * | 8/2006 | Cohen ................... 345/426 |
| 2003/0052874 | A1 | | 3/2003 | Abramov |
| 2004/0051783 | A1 | | 3/2004 | Chellappa |
| 2004/0125103 | A1 | | 7/2004 | Kaufman |

OTHER PUBLICATIONS

Arno Formella, and Christian Gill, "Ray tracing: A quantitative analysis and a new practical algorithm," 1995, The Visual Computer, vol. 11, pp. 465-476.*
Eric Veach, Leonidas J. Guibas, "Metropolis Light Transport," Aug. 1997, Proceedings of the 24th Annual Conference on Computer Graphics and Interactive Techniques.*
Art Owen, "Latin Supercube Sampling for Very High-Dimensional Simulations," Jan. 1998, ACM Transactions on Modeling and Computer Simulation, vol. 8, No. 1, pp. 71-102.*

(Continued)

*Primary Examiner*—Jason M Repko
(74) *Attorney, Agent, or Firm*—Jacobs & Kim LLP; David Jacobs

(57) ABSTRACT

Methods, systems, apparatus and computer software/computer code products operable to enable computer graphics systems to simulate Markov chains (and thus trajectories of photons and the like) comprise simulating, and/or means for simulating, Markov chains using a quasi-Monte Carlo methodology, wherein the simulating of Markov chains comprises sorting states, and wherein the sorting comprises proximity sorting.

32 Claims, 36 Drawing Sheets

OTHER PUBLICATIONS

Ilja Friedel, Alexander Keller, "Fast Generation of Randomized Low-Discrepancy Point Sets," Nov. 27, 2000, in Proceedings of Monte Carlo and Quasi-Monte Carlo Methods 2000.*

J.K. Lawder, P. J. H. King, "Querying Multi-dimensional Data Indexed Using the Hilbert Space-Filling Curve," Mar. 2001, SIGMOD Record, vol. 30, No. 1, pp. 19-24.*

P. L'Ecuyer, C. Lecot and B. Tuffin, "A Randomized Quasi-Monte Carlo Simulation Method for Markov Chains," Apr. 2005, Institut National De Recherche En Informatique Et En Automatique Technical Report No. 5545, ISSN 0249-6399.*

V. Demers, P. L'Ecuyer, and B. Tuffin, "A Combination of Randomized Quasi-Monte Carlo with Splitting for Rare-Event Simulation," Jun. 1, 2005, Proceedings of the 2005 European Simulation and Modeling Conference, EUROSIS, 2005, pp. 25-32.*

Lemieux, "Using Lattice Rules for Variance Reduction", Department of Mathematics, University of Calgary, 2000.

Morokoff, "Quasi-Monte Carlo Integration", J. of Computational Physics, Dec. 1995.

Veach, "Optimally Combining Sampling Techniques for Monte Carlo Rendering", Computer Graphics Proceedings, 1995.

Shirley, "Monte Carlo Techniques for Direct Lighting Calculations", ACM Transactions on Graphics, 1996.

* cited by examiner

FIG. 23A
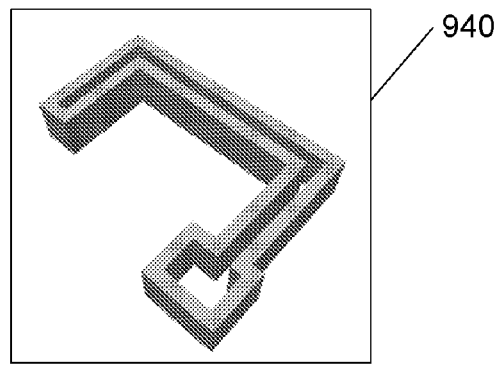
FIG. 23B
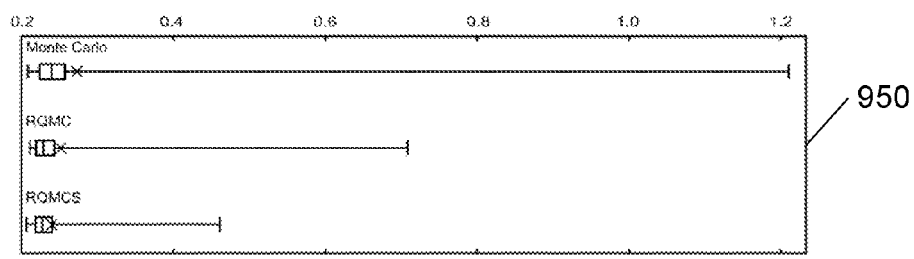
FIG. 23C
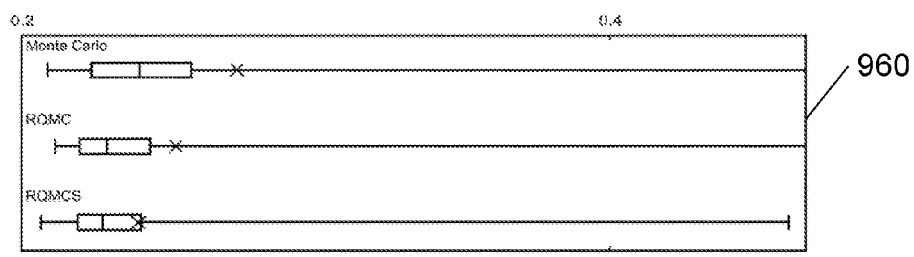
FIG. 23D
| | $L_1$ per camera | $L_2$ per camera | $L_1$ per pixel | $L_2$ per pixel |
|---|---|---|---|---|
| Monte Carlo | 0.0626521 | 0.0236887 | 0.202377 | 463.397 |
| RQMC | 0.0407531 | 0.0077351 | 0.162835 | 62.0994 |
| RQMCS | 0.0247592 | 0.0017890 | 0.138360 | 9.79994 |

SIMULTANEOUS SIMULATION OF MARKOV CHAINS USING QUASI-MONTE CARLO TECHNIQUES

CROSS-REFERENCE TO RELATED APPLICATIONS

This application for patent claims the priority benefit of U.S. Provisional Patent App. Ser. No. 60/822,417, filed Aug. 15, 2006. This application is also a Continuation-in-Part of U.S. patent application Ser. No. 11/474,517, filed Jun. 23, 2006, which claims the benefit of U.S. Provisional Patent App. Ser. No. 60/693,231 filed Jun. 23, 2005, and which is also a Continuation-in-Part of U.S. patent application Ser. No. 10/299,574, filed Nov. 19, 2002.

U.S. patent application Ser. No. 10/299,574 is a Continuation-in-Part of U.S. Ser. No. 09/884,861, filed Jun. 19, 2001, which claims priority benefit from U.S. Provisional Patent App. Ser. No. 60/265,934, filed Feb. 1, 2001, and No. 60/212, 286 filed Jun. 19, 2000.

Each of the above-listed patent applications, including, but not limited to, (U.S. Ser. Nos. 09/884,861, 10/299,574, 60/693,231 and 11/474,517, respectively), as well as their provisional counterparts, is incorporated by reference herein in its entirety as if set forth in its entirety herein.

REFERENCE TO COMPUTER PROGRAM LISTING

Attached to this application below is a source code listing. The source code listing is referred to herein as the "Computer Program Listing," and is organized into sections identified by a three-digit reference number in the format "1.1.1."

FIELD OF THE INVENTION

The present invention relates generally to methods and systems for image rendering in and by digital computing systems, such as for motion pictures and other applications, and in particular, relates to methods, systems, devices, and computer software for real-time, precision ray tracing.

BACKGROUND OF THE INVENTION

The term "ray tracing" describes a technique for synthesizing photorealistic images by identifying all light paths that connect light sources with cameras and summing up these contributions. The simulation traces rays along the line of sight to determine visibility, and traces rays from the light sources in order to determine illumination.

Ray tracing has become mainstream in motion pictures and other applications. However, current ray tracing techniques suffer from a number of known limitations and weaknesses, including numerical problems, limited capabilities to process dynamic scenes, slow setup of acceleration data structures, and large memory footprints. Thus, current ray tracing techniques lack the capability to deal efficiently with fully animated scenes, such as wind blowing through a forest or a person's hair. Overcoming the limitations of current ray tracing systems would also enable the rendering of, for example, higher quality motion blur in movie productions.

Current attempts to improve the performance of ray tracing systems have fallen short for a number of reasons. For example, current real-time ray tracing systems generally use 3D-trees as their acceleration structure, which are based on axis-aligned binary space partitions. Because the main focus of these systems is on rendering static scenes, they typically fail to address the significant amount of setup time required to construct the required data structures in connection with fully animated scenes. Along these lines, one manufacturer has improved real-time ray tracing by building efficient 3D-trees and developing a technique able to shorten the time needed to traverse the tree. However, it can be shown that the expected memory requirement for the system increases quadratically with an increase in the number of objects to be ray-traced.

Another manufacturer has designed a ray tracing integrated circuit that uses bounding volume hierarchies to improve system performance. However, it has been found that the architecture's performance breaks down if too many incoherent secondary rays are traced.

In addition, attempts have made to improve system performance by implementing 3D-tree traversal techniques using field-programmable gate arrays (FPGAs). The main increase in processing speed in these systems is obtained by tracing bundles of coherent rays and exploiting the capability of FPGAs to perform rapid hardwired computations.

The construction of acceleration structures has not yet been implemented in hardware. The FPGA implementations typically use floating point techniques at reduced precision.

A number of different techniques can be used to simulate photon trajectories, including Markov chains. The use of quasi-Monte Carlo techniques in simulating Markov chains is described, for example, in: L'Ecuyer et al., *Randomized Quasi-Monte Carlo Simulation of Markov Chains with an Ordered State Space* (2004) ("L'Ecuyer"), which is incorporated herein by reference as if set forth in its entirety.

L'Ecuyer discusses the use of a randomized quasi-Monte Carlo method for estimating the state distribution at each step of a Markov chain with totally ordered (discrete or continuous) state space. The number of steps in the chain can be random and unbounded. The method can be used in particular to get a low-variance unbiased estimator of the expected total cost up to some random stopping time, when state dependent costs are paid at each step. That paper provides numerical illustrations where the variance reduction with respect to standard Monte Carlo is substantial.

L'Ecuyer notes that a deterministic quasi-Monte Carlo method for estimating transient measures over a fixed number of steps, for discrete-time and discrete-state Markov chains with a totally ordered state space, was proposed and studied in the following papers, which are also incorporated herein by reference in their entireties:

Lécot et al., "Quasi-Random Walk Methods," *Monte Carlo and Quasi-Monte Carlo Methods* 2000, pp. 63-85, Springer-Vertlag (Berlin, 2002).

Lécot et al., "Quasi-Monte Carlo Methods for Estimating Transient Measures of Discrete time Markov Chains," *Monte Carlo and Quasi-Monte Carlo and Quasi-Monte Carlo Methods* 2002, pp. 329-42, Springer-Verlag (Berlin, 2004) ("Lécot 2004").

L'Ecuyer describes a technique that simulates $n=2^k$ copies of the chain in parallel, for the same number of steps, using a (0, 2)-sequence in base 2. At step j of the chain, it reorders the n copies according to their states and simulates the transitions (i.e., next states) for the n copies by employing the elements nj to nj+n−1 of the (0, 2)-sequence in place of uniform random numbers to drive the simulation. It assumes that simulating each transition of the chain requires a single uniform random variate. Convergence to the correct value was proved in Lécot 2004 under a condition on the structure of the transition matrix of the Markov chain.

L'Ecuyer attempts to generalize the technique to Markov chains with continuous state space, with a random and unbounded number of steps (and it is claimed that such a technique permits one to cover regenerative simulation, in particular), and for which the number d of uniform random variates that are required to generate the next state in one step of the Markov chain can be larger than 1.

However, while various researchers have postulated the use of Markov chains to simulate photon trajectories and the like, previous techniques of using quasi-Monte Carlo methods to simulate Markov chains, e.g., trajectories of photons, provided only moderate improvements over random sampling. However, QMC methods in accordance with the present invention, as described below, can exploit the intrinsic low-dimensional structure of the solution operator, yielding much more efficient techniques.

Thus, prior to the present invention, there was still a need for more efficient methods, systems, apparatus, devices and software program/code products for simultaneously simulating Markov chains.

It would be desirable, therefore, to provide improved and more efficient methods, systems, apparatus, devices and software program/code products for simulating Markov chains, using Quasi-Monte Carlo techniques and sorting strategies.

SUMMARY OF THE INVENTION

The present invention provides methods, systems, apparatus, and computer software/computer code products suitable for use in a computer graphics system for generating a pixel value for a pixel in an image, the pixel value being representative of points in a scene as recorded on an image plane of a simulated camera, the computer graphics system being configured to generate the pixel value for an image using a selected ray-tracing methodology comprising the simulating of at least one ray shot from the pixel into a scene along a selected direction, the ray-tracing methodology further comprising the calculating of the intersections of rays and surfaces of objects in the scene and the simulating of trajectories of rays illuminating objects in the scene, the simulating of trajectories using Markov chains.

In one aspect of the invention, methods, systems, apparatus and computer software/computer code products in accordance with the invention comprise simulating (and/or means for simulating) the Markov chains using a quasi-Monte Carlo methodology, wherein the simulating of Markov chains comprises sorting states, and wherein the sorting comprises proximity sorting.

A further aspect of the invention comprises simulating a plurality of Markov chains simultaneously, and the simulating of a plurality of Markov chains simultaneously comprises utilizing quasi-Monte Carlo points, which can be selected using any of a Halton sequence, a variant of a Halton sequence, a lattice sequence or a (t, s)-sequence. The simulating of a plurality of Markov chains simultaneously can utilize any number of chains.

In a further aspect of the invention, the simulating of a plurality of Markov chains simultaneously comprises adding additional trajectories on the fly, such as by trajectory splitting. The simulating can also comprise utilizing a technique simulating particle absorption, and can include using a Russian Roulette technique.

In one aspect of the invention, the simulating of a plurality of Markov chains simultaneously for an s-dimensional problem comprises the following technique:
  n:=0
  initialize $X_{0,i}$ using quasi-Monte Carlo points $x_i$
  loop:
    sort state vector using a suitable order
    n:=n+1
    continue chain by computing $X_{n,i}$ using subsequent quasi-Monte Carlo points $x_i$.

The invention can also comprise ordering states by proximity in state space, and techniques of randomization. Any selected set or sequence of points with any selected randomization can be employed in conjunction with the methods of the present invention.

In another aspect, the invention further comprises the following technique:
  n:=0, select point sequence $x_i$
  instantiate randomization
  initialize $X_{0,i}$ using rand($x_i$)
  loop
    sort state vector using some order
    n:=n+1
    instantiate randomization
    continue chain by computing $X_{n,i}$ using rand($x_i$)

The randomizing technique can comprise randomizing the quasi-Monte Carlo points in each time step n, wherein the randomizing more particularly comprises: selecting a (t, s)-sequence in base b=2, from which subsequent samples are drawn, and XOR-ing the samples by an s-dimensional random vector, the random vector being generated after each transition step.

Another aspect of the invention comprises sorting by luminosity, or the norm of state; sorting using a spatial hierarchy; and sorting using buckets enumerated by at least one space filling curve. The sorting using a spatial hierarchy can comprise utilizing a binary hierarchy, and the spatial hierarchy can comprise any of a BSP-tree, kD-tree or other axis-aligned subset of a BSP-tree structure, or bounding volume hierarchies, or regular voxels. The binary hierarchy can be constructed by recursively subdividing using planes selected by a selected heuristic; and then traversing the hierarchy in in-order to enumerate the leaves of the hierarchy in an order of proximity. More efficient traversal can be provided by left-balancing the tree and storing the tree in an array data structure. Sorting using a spatial hierarchy can also comprise utilizing bucket sorting and a selected space-filling curve; and in one aspect of the invention, using regular voxels.

In another aspect of the invention, the simulation and/or sorting processing comprises:
  bounding an object to be rendered by an axis-aligned bounding box;
  recursively or iteratively dividing the bounding box into successive left and right branches, each terminating in a leaf, by applying splitting planes passing through selected points of the object, thereby generating a plurality of leaves;
  ordering the leaves hierarchically according to their respective luminosities;
  performing a bucket sort on a matrix of selected size, divided into a selected number of buckets; and
  using a selected space-filling curve to proceed through the matrix, wherein within an individual bucket, a smaller space-filling curve is used to proceed through individual cells in the matrix.

The simulation processes of the present invention can be adapted for configuration to solve integral equations. The simulation is operable to enable light transport simulation for synthesizing realistic-appearing images. In accordance with this aspect of the invention, an underlying light transport simulating integral equation can be reformulated as a path integral, such that sampling path space corresponds to simulating Markov chains, in which paths are established by ray tracing and scattering events; wherein an initial distribution is determined by emission characteristics of light sources or sensors, and transition probabilities are determined by bidirectional reflectance distribution functions and bi-directional subsurface scattering distribution functions for a surface in the image. Transparency effects can be processed by utilizing the path integral, initial distribution and transition probabilities. In related aspects of the invention, the path integral can be solved by utilizing either high dimensional quasi-Monte Carlo points or by padding low dimensional quasi-Monte Carlo points, and the integral equation underlying light transport simulation is considered either as a Fredholm or a Volterra integral equation.

Additional details, embodiments, practices, and examples are described in the following Detailed Description, taken in conjunction with the attached drawing figures, or will become readily apparent to those skilled in the art from a reading of the Detailed Description in conjunction with the drawings.

BRIEF DESCRIPTION OF THE DRAWINGS

FIGS. 23A-D are, respectively, a schematic view of a labyrinth test scene, a graph showing the average amount of total radiance received by the camera using each technique, an enlarged portion of the graph, and a table displaying the deviation from a master solution.

DETAILED DESCRIPTION

The present invention provides improved techniques for ray tracing, and for the efficient construction of acceleration data structures required for fast ray tracing. The following discussion describes methods, structures and systems in accordance with these techniques.

It will be understood by those skilled in the art that the described methods and systems can be implemented in software, hardware, or a combination of software and hardware, using conventional computer apparatus such as a personal computer (PC) or equivalent device operating in accordance with, or emulating, a conventional operating system such as Microsoft Windows, Linux, or Unix, either in a standalone configuration or across a network. The various processing means and computational means described below and recited in the claims may therefore be implemented in the software and/or hardware elements of a properly configured digital processing device or network of devices. Processing may be performed sequentially or in parallel, and may be implemented using special purpose or reconfigurable hardware.

Figure 1:
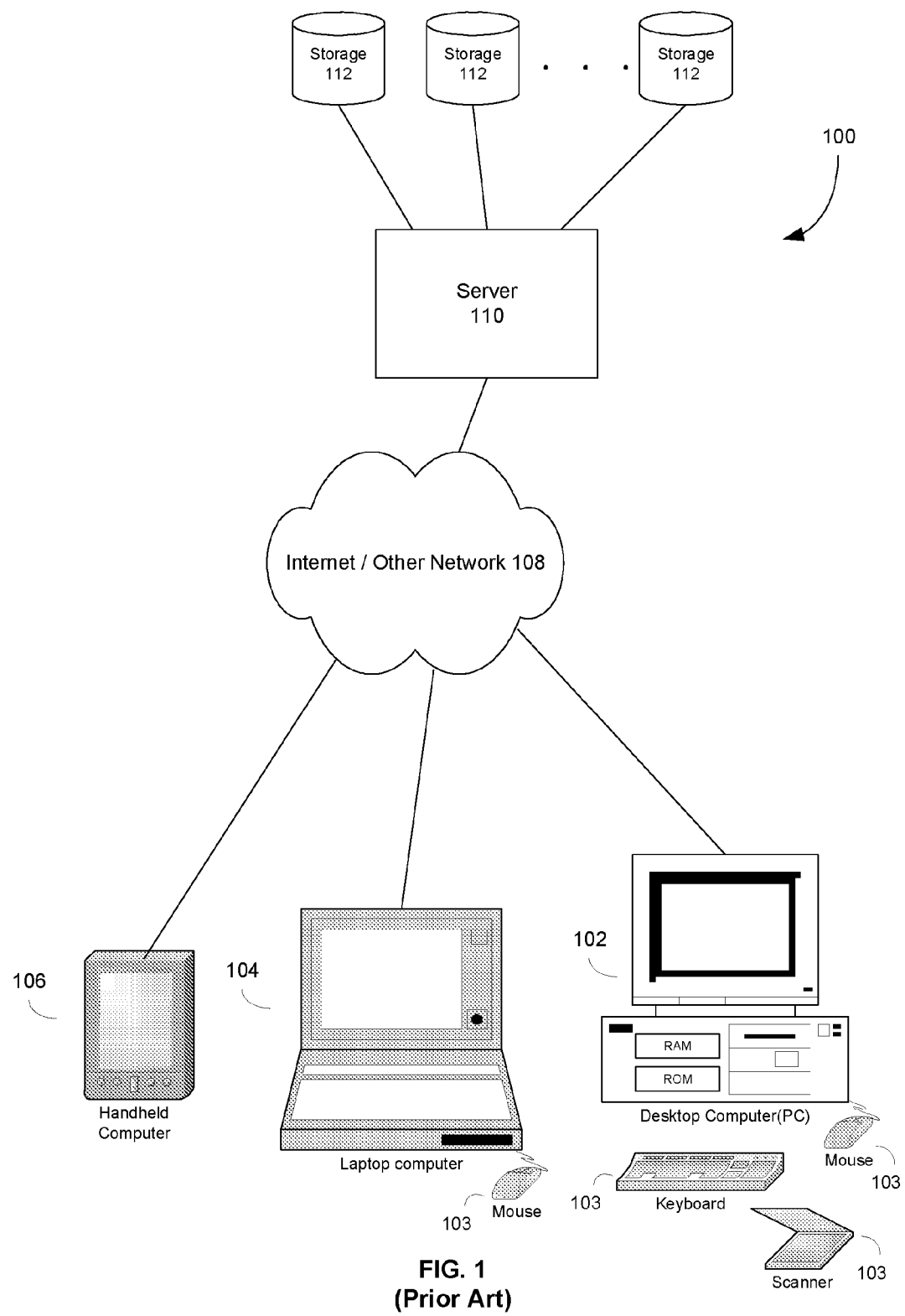
FIG. 1 is a schematic diagram of a conventional digital processing system in which the present invention can be deployed.

Methods, devices or software products in accordance with the invention can operate on any of a wide range of conventional computing devices and systems, such as those depicted by way of example in FIG. 1 (e.g., network system 100), whether standalone, networked, portable or fixed, including conventional PCs 102, laptops 104, handheld or mobile computers 106, or across the Internet or other networks 108, which may in turn include servers 110 and storage 112.

Figure 2:
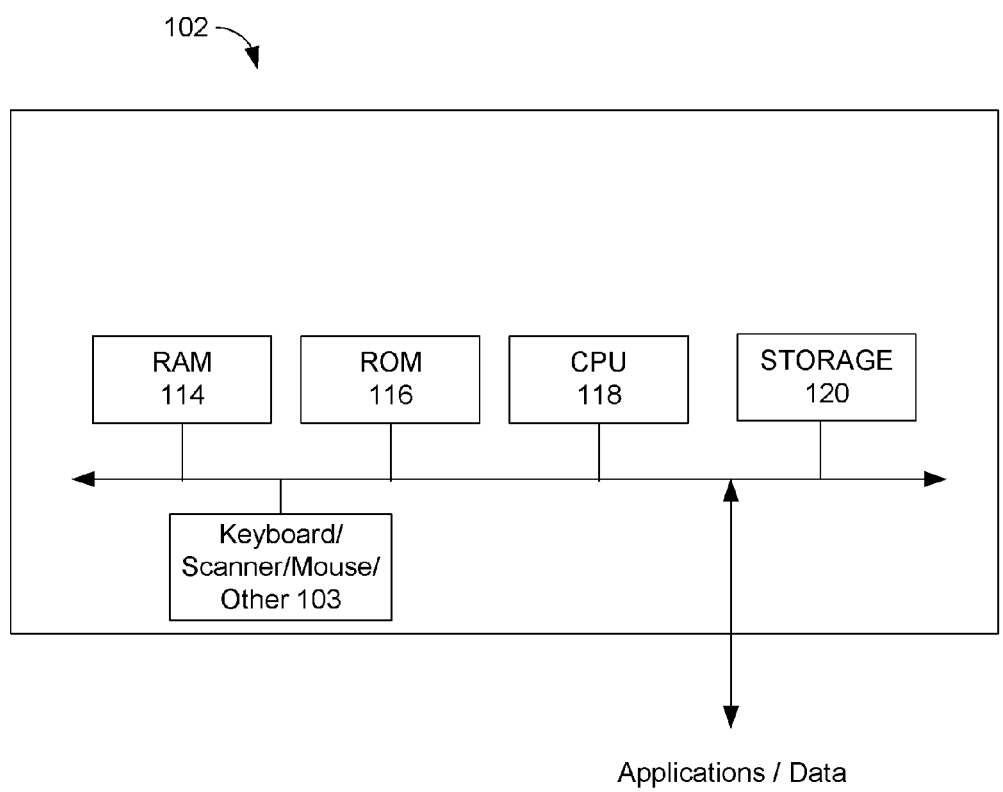
FIG. 2 is a schematic diagram of a conventional personal computer, or like computing apparatus, in which the present invention can be deployed.

In line with conventional computer software and hardware practice, a software application configured in accordance with the invention can operate within, e.g., a PC 102 like that shown in FIG. 2, in which program instructions can be read from a CD-ROM 116, magnetic disk or other storage 120 and loaded into RAM 114 for execution by CPU 118. Data can be input into the system via any known device or means, including a conventional keyboard, scanner, mouse or other elements 103.

The present description of the invention is divided into two major sections:

I. Real-time Precision Ray Tracing

Figure 3:
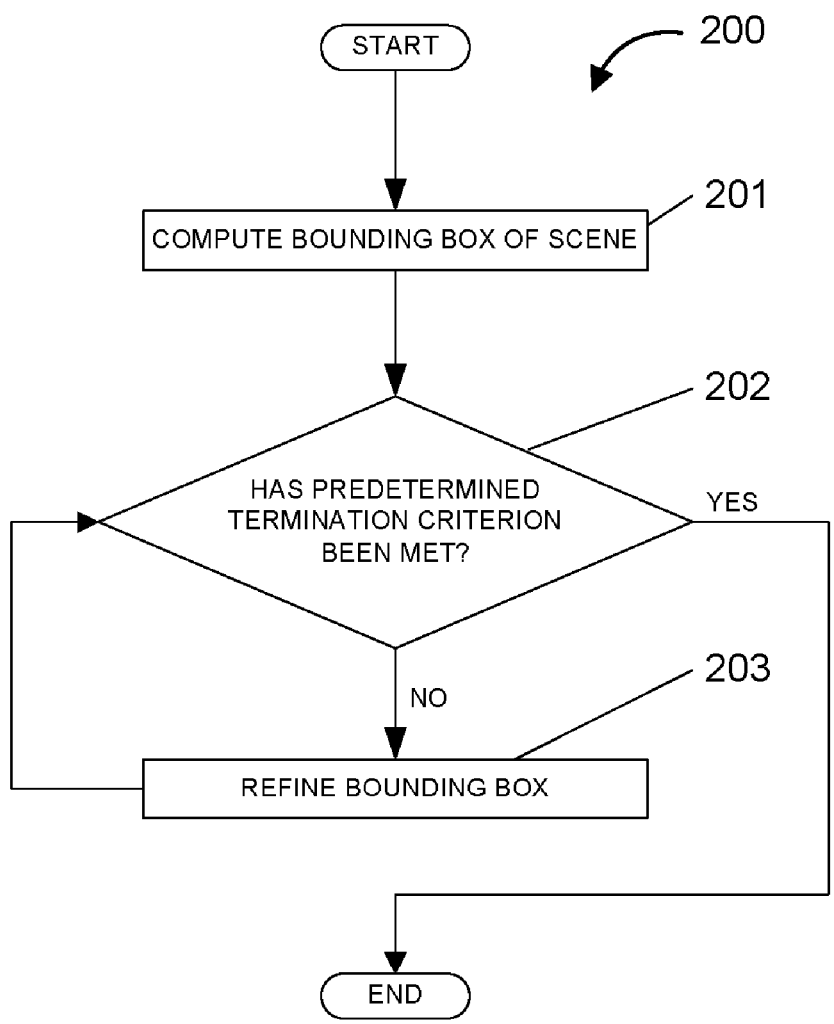
FIG. 3 is a diagram illustrating an overall method in accordance with a first aspect of the present invention.

II. Sorting Strategies for Rays Simulated Using Markov Chains and Quasi-Monte Carlo Techniques I. Real-Time Precision Ray Tracing FIG. 3 is a diagram depicting an overall method 200 in accordance with an aspect of the present invention. The method is practiced in the context of a computer graphics system, in which a pixel value is generated for each pixel in an image. Each generated pixel value is representative of a point in a scene as recorded on an image plane of a simulated camera. The computer graphics system is configured to generate the pixel value for an image using a selected ray-tracing methodology. The selected ray-tracing methodology includes the use of a ray tree that includes at least one ray shot from the pixel into a scene along a selected direction, and further includes calculations of the intersections of rays and objects (and/or surfaces of objects) in the scene.

In the FIG. 3 method 200, bounding volume hierarchies are used to calculate the intersections of rays and surfaces in the scene. In step 201, a bounding box of a scene is computed. In step 202, it is determined whether a predetermined termination criterion is met. If not, then in step 203 the axis-aligned bounding box is refined. The process continues recursively until the termination criterion is met. According to an aspect of the invention, the termination criterion is defined as a condition at which the bounding box coordinates differ only in one unit of resolution from a floating point representation of the ray-surface intersection point. However, the scope of the present invention extends to other termination criteria.

The use of bounding volume hierarchies as an acceleration structure is advantageous for a number of reasons. The memory requirements for bounding volume hierarchies can be linearly bounded in the number of objects to be ray traced. Also, as described below, bounding volume hierarchies can be constructed much more efficiently than 3D-trees, which makes them very suitable for an amortized analysis, as required for fully animated scenes.

Figure 4:
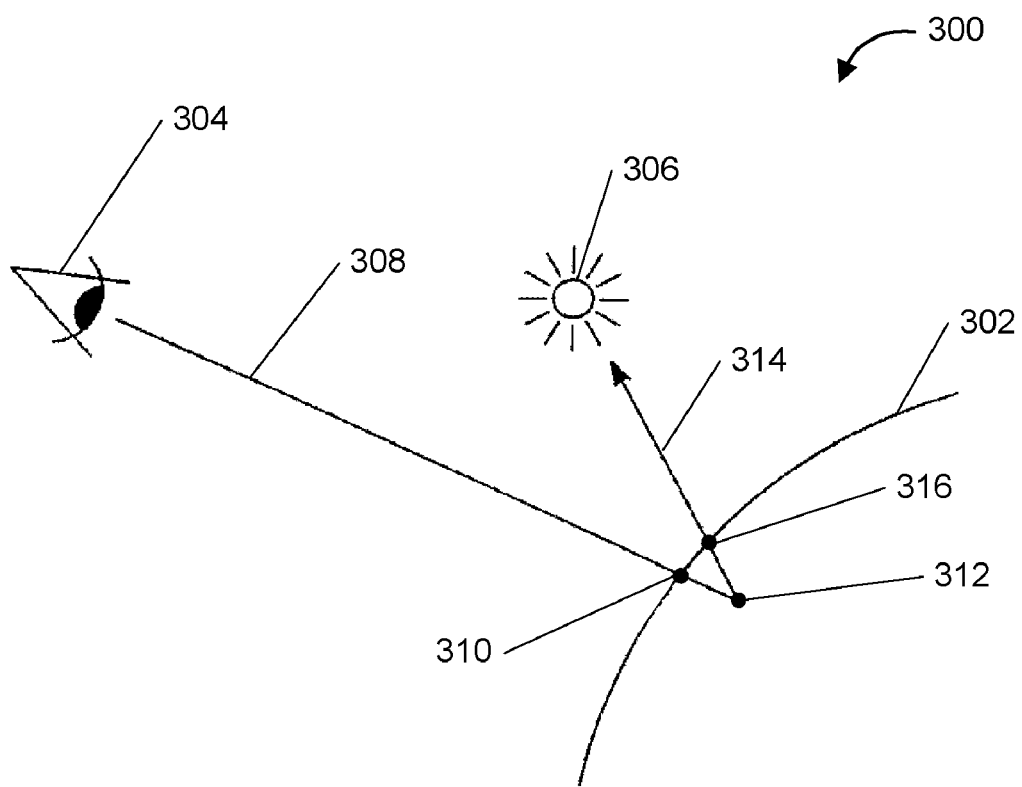
FIG. 4 is a diagram of a ray tracing procedure, illustrating the problem of self-intersection.

The following discussion describes in greater detail certain issues in ray tracing technology, and particular aspects of the invention that address those issues. FIG. 4 is a diagram illustrating the "self-intersection" problem. FIG. 4 shows a ray tracing procedure 300, including an image surface 302, an observation point 304, and a light source 306. In order to synthesize an image of the surface, a series of computations are performed in order to locate rays extending between the observation point 304 and the surface 302. FIG. 4 shows one such ray 308. Ideally, there is then calculated the exact point of intersection 310 between the ray 308 and the surface 302.

However, due to floating point arithmetic computations on computers, it is sometimes possible for the calculated ray/surface intersection point 312 to be different from the actual intersection point 310. Further, as illustrated in FIG. 4, it is possible for the calculated point 312 to be located on the "wrong" side of the surface 302. In that case, when computations are performed to locate a secondary ray 314 extending from the calculated ray/surface intersection point 312 to the light source 306, these computations indicate that the secondary ray 314 hits the surface 302 at a second intersection point 316 rather than extending directly to the light source 306, thus resulting in an imagining error.

One known solution to the self-intersection problem is to start each ray 308 at a safe distance from the surface 302. This safe distance is typically expressed as a global floating point $\epsilon$. However, the determination of the global floating point $\epsilon$ depends heavily on the scene, and the particular location within the scene itself, for which an image is being synthesized.

An aspect of the invention provides a more precise alternative. After arriving at a calculated ray/surface intersection point 312, the calculated point 312 and the direction of the ray 308 are then used to re-compute an intersection point that is closer to the actual intersection point 310. This re-computation of the intersection point is incorporated into the ray tracing technique as an iteration that increases precision. If the iteratively computed intersection point turns out to be on the "wrong" side of the surface 302, it is moved to the "correct" side of the surface 302. The iteratively computed intersection point can be moved along the surface normal, or along the axis determined by the longest component of the normal. Instead of using a global floating point $\epsilon$, the point is moved by an integer $\epsilon$ to the last bits of the floating point mantissas.

The described procedure avoids computations in double precision and has the advantage that it implicitly adapts to the scale of the floating point number, which is determined by its exponent. Thus, in this implementation, all secondary rays directly start from these modified points making an $\epsilon$-offset unnecessary. During intersection computation, it can therefore be assumed that the ray interval of validity to begin at 0 rather than some offset.

Modifying the integer representation of the mantissa also avoids numerical problems when intersecting a triangle and a plane in order to decide which points are on what side.

Exploiting the convex hull property of convex combinations, intersections of rays and freeform surfaces can be found by refining an axis-aligned bounding box, which contains the point of intersection nearest to the ray origin. This refinement can be continued until the resolution of floating point numbers is reached, i.e., until the bounding box coordinates differ only in one unit of resolution from the floating point representation. The self-intersection problem then is avoided by selecting the bounding box corner that is closest to the surface normal in the center of the bounding box. This corner point then is used to start the secondary ray. This "ray object intersection test" is very efficient and benefits from the avoidance of the self-intersection problem.

After constructing the acceleration data structure, the triangles are transformed in-place. The new representation encodes degenerate triangles so that the intersection test can handle them without extra effort. It of course is also possible to just prevent degenerate triangles to enter the graphics pipeline. Sections 2.2.1 and 2.2.2 of the Computer Program Listing set forth listings of source code in accordance with the present aspect of the invention.

The test first determines the intersection of the ray and the plane of the triangle and then excludes intersections outside the valid interval ]0, result.tfar] on the ray. This is achieved by only one integer test. Note that the +0 is excluded from the valid interval. This is important if denormalized floating point numbers are not supported. If this first determination is successful, the test proceeds by computing the Barycentric coordinates of the intersection. Note that again only an integer test, i.e., more specifically only testing two bits, is required to perform the complete inclusion test. Thus the number of branches is minimal. In order to enable this efficient test, the edges and the normal of the triangle are scaled appropriately in the transformation step.

The precision of the test is sufficient to avoid wrong or missed ray intersections. However, during traversal situations may occur in which it is appropriate to extend the triangles for a robust intersection test. This can be done before transforming the triangles. Since the triangles are projected along the axis identified by the longest component of their normal, this projection case has to be stored. This is achieved by counters in the leaf nodes of the acceleration data structure: The triangle references are sorted by the projection case and a leaf contains a byte for the number of triangles in each class.

A further aspect of the present invention provides an improved approach for constructing acceleration data structures for ray tracing. Compared with prior software implementations that follow a number of different optimizations, the approach described herein yields significantly flatter trees with superior ray tracing performance.

Candidates for splitting planes are given by the coordinates of the triangle vertices inside the axis-aligned bounding box to be partitioned. Note that this includes vertices that actually lie outside the bounding box, but have at least one coordinate that lies in one of the three intervals defined by the bounding box. Out of these candidates, there is selected the plane closest to middle of the longest side of the current axis-aligned bounding box. A further optimization selects only coordinates of triangles whose longest component of the surface normal matches the normal of the potential splitting plane. This procedure yields much flatter trees, since placing splitting planes through the triangle vertices implicitly reduces the number of triangles split by splitting planes. In addition, the surface is approximated tightly and empty space is maximized. If the number of triangles is higher than a specified threshold and there are no more candidates for splitting planes, the box is split in the middle along its longest side. This avoids inefficiencies of other approaches, including the use, for example, of long diagonal objects.

The recursive procedure of deciding which triangles belong to the left and right child of a node in the hierarchy has typically required extensive bookkeeping and memory allocation. There is a much simpler approach that only fails in exceptional cases. Only two arrays of references to the objects to be ray traced are allocated. The first array is initialized with the object references. During recursive space partition, a stack of the elements on the left is grown from the beginning of the array, while the elements, which are classified right, are kept on a stack growing from the end of the array towards the middle. In order to be able to quickly restore the elements that are intersecting a split plane, i.e., are both left and right, the second array keeps a stack of them. Thus backtracking is efficient and simple.

Instead of pruning branches of the tree by using the surface area heuristic, tree depth is pruned by approximately left-balancing the binary space partition starting from a fixed depth. As observed by exhaustive experimentation, a global fixed depth parameter can be specified across a vast variety of scenes. This can be understood by observing that after a certain amount of binary space partitions usually there remain connected components that are relatively flat in space. Section 2.3.1 of the Computer Program Listing sets forth a listing of source code in accordance with this aspect of the invention.

Using bounding volume hierarchies, each object to be ray traced is referenced exactly once. As a consequence, and in contrast with 3D-trees, no mailbox mechanisms are required to prevent the multiple intersection of an object with a ray during the traversal of the hierarchy. This is a significant advantage from the viewpoint of system performance and makes implementations on a shared memory system much simpler. A second important consequence is that there cannot be more inner nodes in the tree of a bounding volume hierarchy than the total number of objects to be ray-traced. Thus the memory footprint of the acceleration data structure can be linearly bounded in the number of objects before construction. Such an a priori bound is not available for the construction of a 3D-tree, where the memory complexity is expected to increase quadratically with the number of objects to be ray-traced.

Thus, there is now described a new concept of bounding volume hierarchies that are significantly faster than current 3D-tree ray tracing techniques, and in which the memory requirements grow linearly, rather than expected quadratically, with the number of objects to be ray-traced. The core concept that allows bounding volume hierarchies to outperform 3D-trees is to focus on how space can be partitioned, rather than focusing on the bounding volumes themselves.

Figure 5:
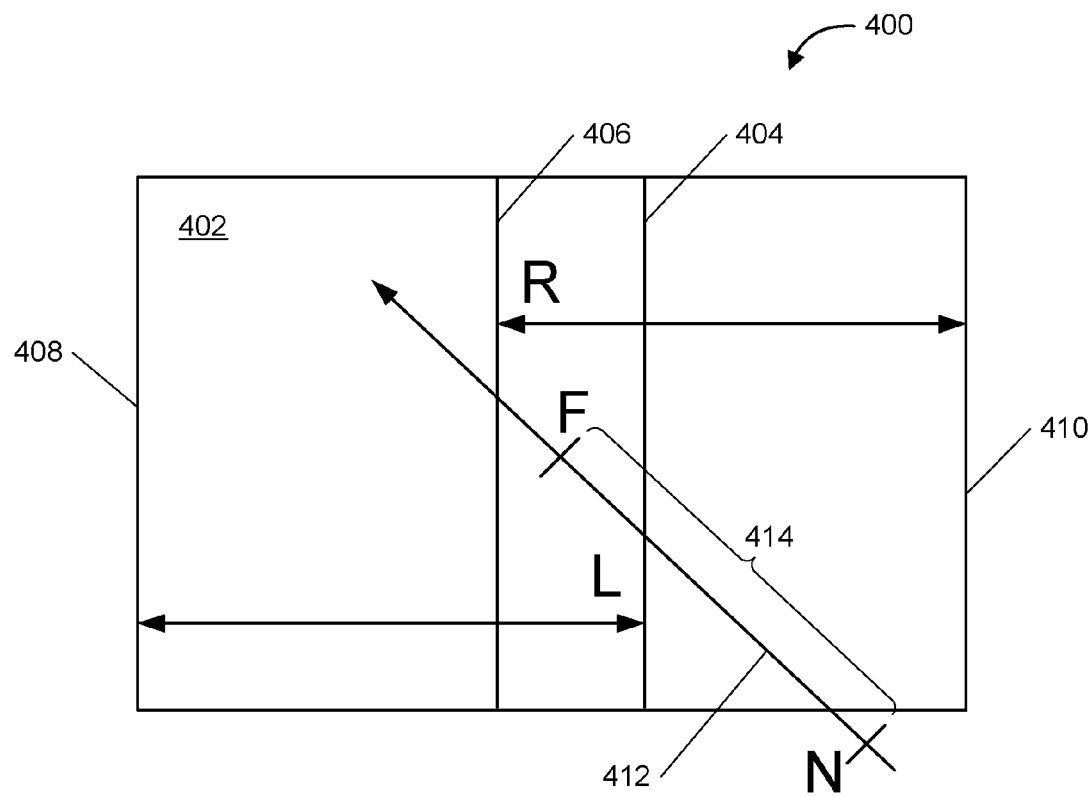
FIG. 5 shows a diagram, in elevation view, of a partitioned axis-aligned bounding box that is used as an acceleration data structure in accordance with a further aspect of the invention.

In a 3D-tree, a bounding box is partitioned by a single plane. According to the present aspect of the invention, two parallel planes are used to define two axis-aligned bounding boxes. FIG. 5 is a diagram illustrating the principal data structure 400.

FIG. 5 shows an axis-aligned bounding box 402, in elevation view. An L-plane 402 and an R-plane 404, which are axis-aligned and parallel with each other, are used to partition bounding box 402 into left and right axis-aligned bounding box. The left bounding box extends from the left wall 406 of the original bounding box 402 to the L-plane 402. The right bounding box extends from the R-plane 404 to the right wall 408 of the original bounding box 402. Thus, the left and right bounding boxes may overlap each other. The traversal of ray 412 is determined by the positions of intersection with the L- and R-planes 402 and 404 relative to the interval of validity [N, F] 412 of the ray 410.

In the FIG. 5 data structure 400, the L- and R-planes 402 and 404 are positioned with respect to each other to partition the set of objects contained within the original bounding box 402, rather than the space contained within the bounding box 402. In contrast with a 3D-tree partition, having two planes offers the possibility of maximizing the empty space between the two planes. Consequently the boundary of the scene can be approximated much faster.

Figure 6:
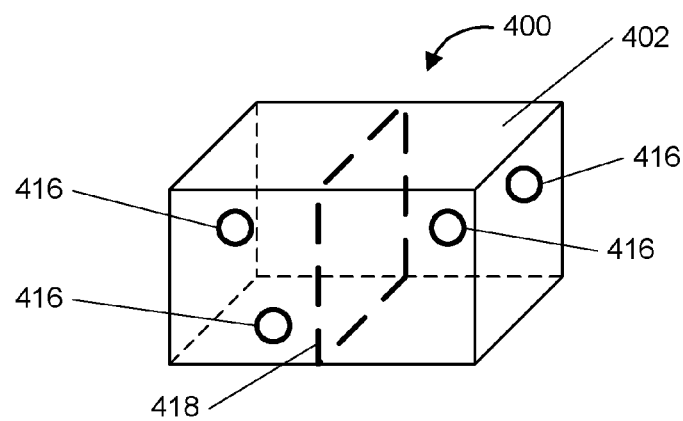
FIGS. 6-8 are series of diagrams, in isometric view, of the axis-aligned bounding box shown in FIG. 5, illustrating the partitioning of the bounding box with L- and R-planes.
Figure 7:
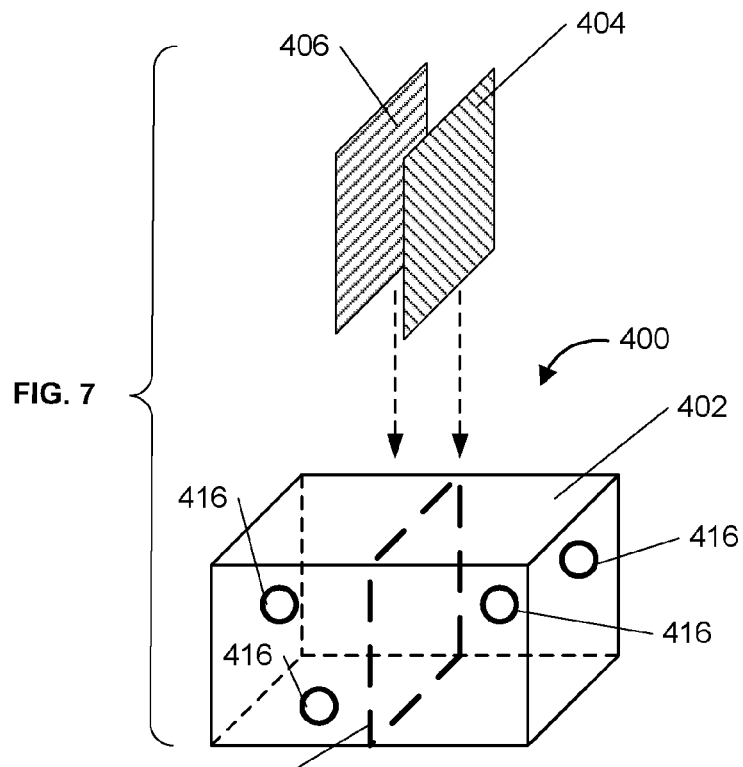
Figure 8:
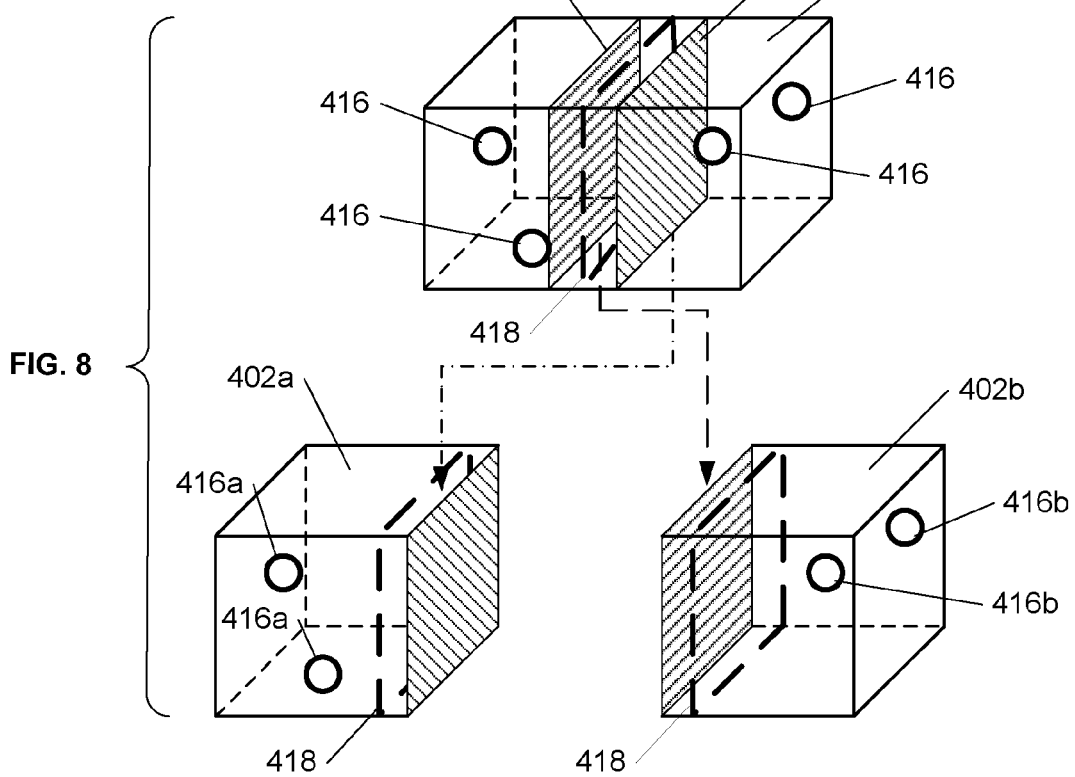

FIGS. 6-8 are a series of three-dimensional diagrams further illustrating data structure 400. FIG. 6 shows a diagram of bounding box 402. For purposes of illustration, virtual objects within bounding box 402 are depicted as abstract circles 416. As shown in FIGS. 7 and 8, L-plane 404 and R-plane 406 are then used to partition bounding box 402 into a left bounding box 402a and a right bounding box 402b. The L- and R-planes are selected such that the empty space between them is maximized. Each virtual object 416 ends up in either the left bounding box 402a or the right bounding box 402b. As shown at the bottom of FIG. 8, the virtual objects 416 are partitioned into "left" objects 416a and "right" objects 416b. Each of the resulting bounding boxes 402a and 402b are themselves partitioned, and so on, until a termination criterion has been satisfied.

Figure 9:
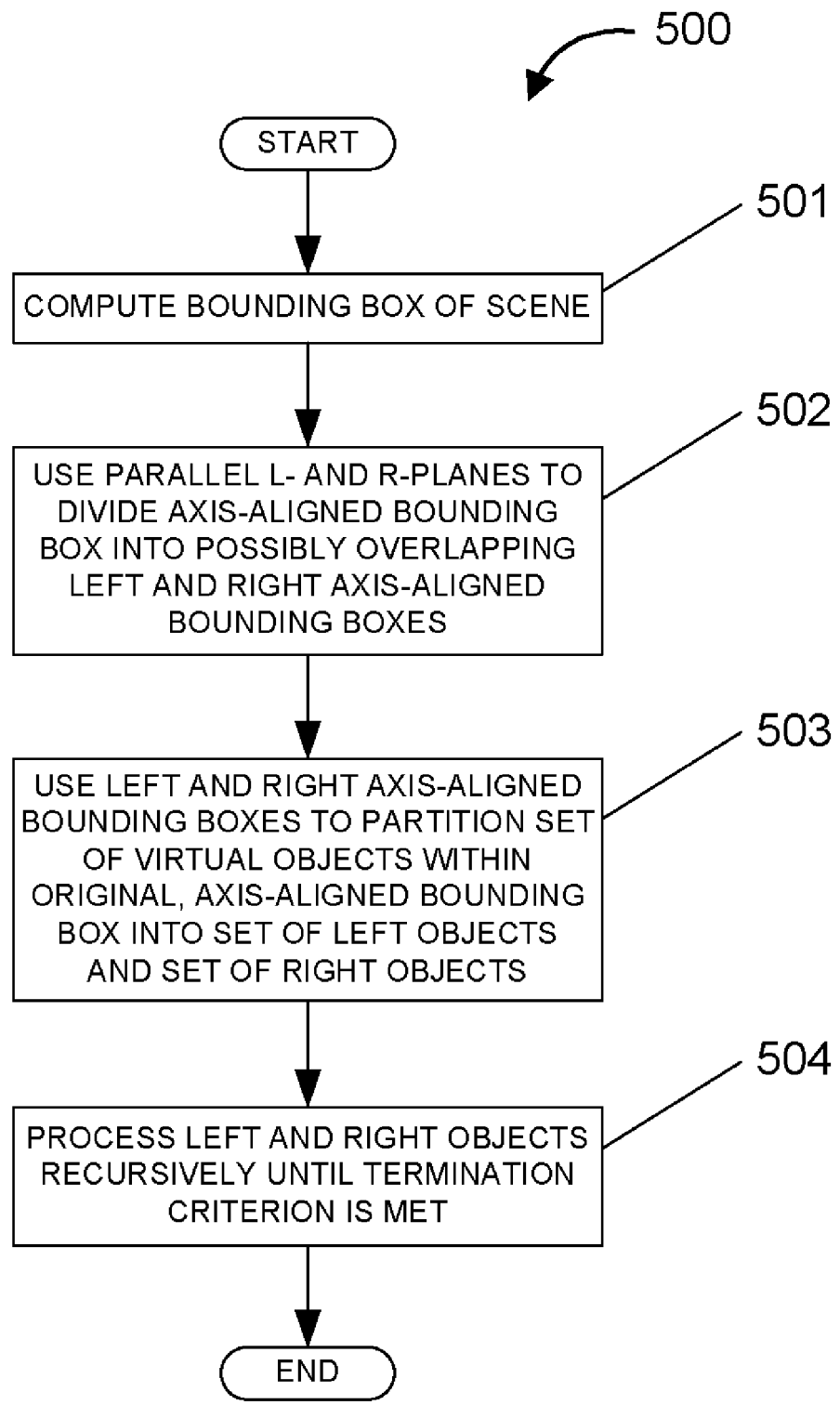
FIGS. 9 and 10 are flowcharts of ray tracing methods according to further aspects of the invention.

FIG. 9 is a flowchart of the described method 500. In step 501, a bounding box of a scene is computed. In step 502, parallel L- and R-planes are used to partition the axis-aligned bounding box left and right axis-aligned bounding boxes, which may overlap. In step 503, the left and right bounding boxes are used to partition the set of virtual objects contained with the original axis-aligned bounding box into a set of left objects and a set of right objects. In step 504, the left and right objects are processed recursively until a termination criterion is met.

Instead of one split parameter, used in earlier implementations, two split parameters are stored within a node. Since the number of nodes is linearly bounded by the number of objects to be ray traced, an array of all nodes can be allocated once. Thus, the costly memory management of 3D-trees during construction becomes unnecessary.

The construction technique is much simpler than the analog for 3D-tree construction and is easily implemented in a recursive way, or by using an iterative version and a stack. Given a list of objects and an axis-aligned bounding box, the L- and R-planes are determined, and the set of objects is determined accordingly. The left and right objects are then processed recursively until some termination criterion is met. Since the number of inner nodes is bounded, it is safe to rely on termination when there is only one object left.

It should be noted that the partition only relies on sorting objects along planes that are perpendicular to the x-, y-, and z-axes, which is very efficient and numerically absolutely stable. In contrast with 3D-trees, no exact intersections of objects with splitting planes need to be computed, which is more costly and hard to achieve in a numerically robust way. Numerical problems of 3D-trees, such as missed triangles at vertices and along edges, can be avoided by extending the triangles before the construction of the bounding volume hierarchy. Also, in a 3D-tree, overlapping objects have to be sorted both into the left and right axis-aligned bounding boxes, thereby causing an expected quadratic growth of the tree.

Various techniques may be used to determine the L- and R-planes, and thus the actual tree layout. Returning to FIGS. 6-8, one technique is to determine a plane M 418 using the 3D-tree construction technique described above and partition the objects such that the overlap of the resulting L-plane and R-plane of the new axis-aligned bounding boxes minimally overlaps the suggested splitting plane M 418. The resulting tree is very similar to the corresponding 3D-tree, however, since the object sets are partitioned rather than space, the resulting tree is much flatter. Another approach is to select the R-plane and L-plane in such a way that the overlap of child boxes is minimal and the empty space is maximized if possible. It should be noted that for some objects axis-aligned bounding boxes are inefficient. An example of such a situation is a long cylinder with small radius on the diagonal of an axis-aligned bounding box.

Figure 10:
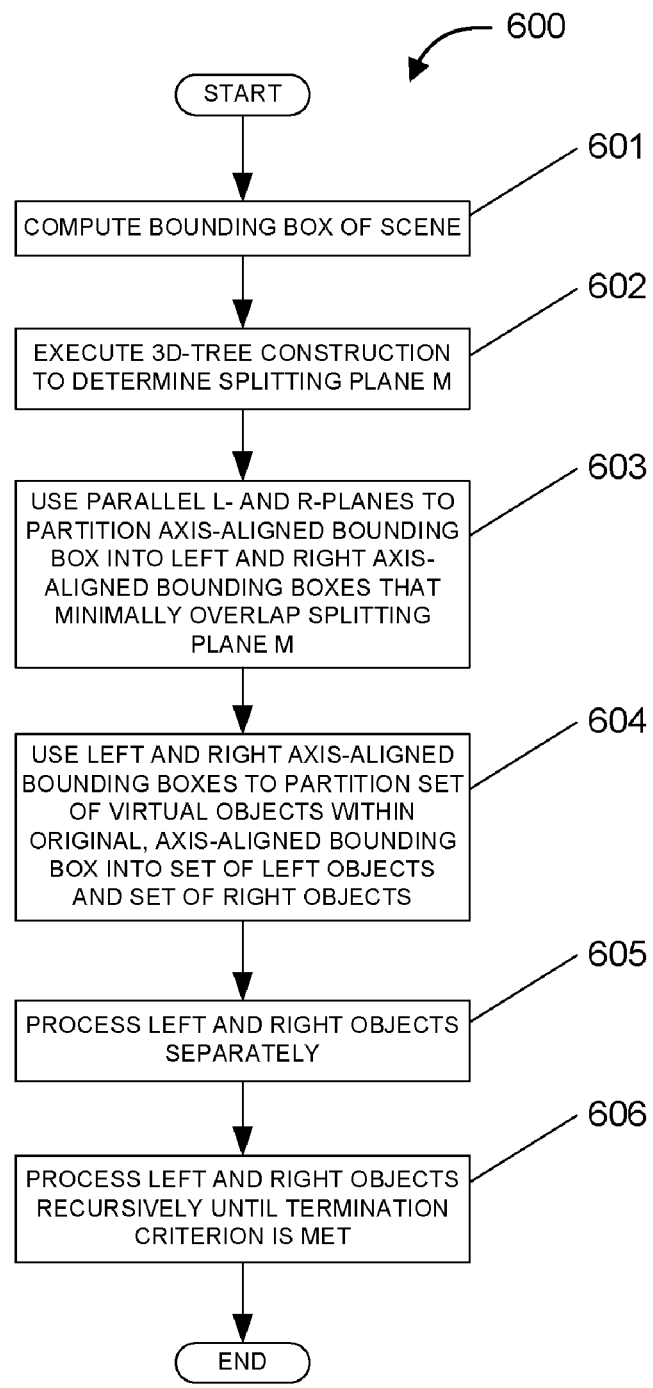

FIG. 10 is a flowchart of a method 600 according to this aspect of the invention. In step 601, a bounding box of the scene is computed. In step 602, a 3D-tree construction is executed to determine a splitting plane M. In step 603, parallel L- and R-planes are used to partition the axis-aligned bounding box into left and right axis-aligned bounding boxes that minimally overlap the splitting plane M. In step 604, the left and right bounding boxes are used to partition the set of virtual objects contained within the original axis-aligned bounding box into a set of left objects and a set of right objects. In step 605, the left and right objects are processed recursively until a termination criterion is met. It should be noted that the method 600 illustrated in FIG. 10, as well as the method 200 illustrated in FIG. 3, may be combined with other techniques described herein, including techniques relating to 3D-tree construction, real-time processing, bucket sorting, self-intersection, and the like.

In the case of the 3D-tree, the spatial subdivision is continued so as to cut off the empty portions of the space around the object. In the case of the described bounding volume hierarchy, partitioning such objects into smaller ones results in a similar behavior. In order to maintain the predictability of the memory requirements, a maximum bounding box size is defined. All objects with an extent that exceeds the maximum bounding box size are split into smaller portions to meet the requirement. The maximum allowed size can be found by scanning the data set for the minimal extent among all objects.

The data structure described herein allows the transfer of the principles of fast 3D-tree traversal to bounding volume hierarchies. The cases of traversal are similar: (1) only the left child; (2) only the right child; (3) the left child and then the right child; (4) the right child and then the left child; or (5) the ray is between split planes (i.e., empty space). Since one node in the described technique is split by two parallel planes, the order of how to traverse the boxes is determined by the ray direction. FIG. 6 sets forth a source code listing incorporating the techniques described above.

Previous bounding volume hierarchy techniques could not efficiently determine the order of how to traverse the child nodes or required additional effort, such as updating a heap data structure. In addition a whole bounding volume had to be loaded and tested against the ray, while the present approach only requires the two plane distances. Checking the ray against the two planes in software seems to be more expensive, however. The traversal is the bottle neck in 3D-trees, and doing some more computation here better hides the latencies of memory access. In addition, the bounding volume hierarchy trees tend to be much smaller than corresponding 3D-trees of same performance.

Although there is herein described a new bounding volume hierarchy, there is a strong link to traversing 3D-trees: Setting L=R, the classical binary space partition is obtained, and the traversal technique collapses to the traversal technique for 3D-trees.

The described bounding volume hierarchy also can be applied to efficiently find ray freeform surface intersections by subdividing the freeform surface. Doing so allows the intersection of a freeform surface with a convex hull property and a subdivision technique efficiently to be computed up to floating point precision, depending on the actual floating point arithmetic. A subdivision step is performed, for example, for polynomial surfaces, rational surfaces, and approximating subdivision surfaces. For each axis in space the possibly overlapping bounding boxes are determined as discussed above. In case of a binary subdivision, the intersection of the L-boxes and the intersection of the R-boxes for new bounding boxes of the new meshes. Now the above-described traversal can be efficiently performed, since the spatial order of the boxes is known. Instead of pre-computing the hierarchy of bounding volumes, it can be computed on the fly. This procedure is efficient for freeform surfaces and allows one to save the memory for the acceleration data structure, which is replaced by a small stack of the bounding volumes that have to be traversed by backtracking. The subdivision is continued until the ray surface intersection lies in a bounding volume that collapsed to a point in floating point precision or an interval of a small size. Section 2.1.1 of the Computer Program Listing sets forth a code listing in accordance with his aspect of the invention.

Using regular grids as an acceleration data structure in ray tracing is simple, but efficiency suffers from a lack of spatial adaptivity and the subsequent traversal of many empty grid cells. Hierarchical regular grids can improve on the situation, but still are inferior as compared to bounding volume hierarchies and 3D-trees. However, regular grids can be used to improve on the construction speed of acceleration data structures. The technique for constructing the acceleration data structures are similar to quick sorting and are expected to run in $\mathcal{O}(n \log n)$. An improvement can be obtained by applying bucket sorting, which runs in linear time. Therefore the axis-aligned bounding box of the objects is partitioned into $n_x \times n_y \times n_z$ axis-aligned boxes. Each object then is sorted into exactly one of these boxes by one selected point, e.g., the center of gravity or the first vertex of each triangle could be used. Then the actual axis-aligned bounding box of the objects in each grid cell is determined. These axis-aligned bounding boxes are used instead of the objects they contain as long as the box does not intersect one of the division planes. In that case the box is unpacked and instead the objects in the box will be used directly. This procedure saves a lot of comparisons and memory accesses, noticeably improves the constant of the order of the construction techniques, and also can be applied recursively. The above technique is especially appealing to hardware implementations, since it can be realized by processing a stream of objects.

The acceleration data structures can be built on demand, i.e., at the time when a ray is traversing a specific axis-aligned bounding box with its objects. Then on the one hand the acceleration data structure never becomes refined in regions of space, which are invisible to the rays, and caches are not polluted by data that is never touched. On the other hand after refinement the objects possibly intersected by a ray are already in the caches.

From the above discussion, it will be seen that the present invention addresses long known issues in ray tracing and provides techniques for ray tracing having improved precision, overall speed and memory footprint of the acceleration data structures. The improvements in numerical precision transfer to other number systems as well as, for example, to the logarithmic number system used in the hardware of the ART ray tracing chips. It is noted that the specific implementation of the IEEE floating point standard on a processor or a dedicated hardware can severely influence performance. For example, on a Pentium 4 chip denormalized numbers can degrade performance by a factor of 100 and more. As discussed above, an implementation of the invention avoids these exceptions. The view of bounding volume hierarchies described herein makes them suited for realtime ray tracing. In an amortized analysis, the described techniques outperform the previous state of the art, thus allowing more precise techniques to be used, for example, for computing motion blur in fully animated scene, as in a production setting or the like. It will be apparent from the above discussion that the described bounding volume hierarchies have significant advantages when compared with 3D-trees and other techniques, particularly in hardware implementations and for huge scenes. In an amortized analysis, the described bounding volume hierarchies outperform current 3D-trees by at least a factor of two. In addition, the memory footprint can be determined beforehand and is linear in the number of objects.

II. Sorting Strategies for Rays Simulated Using Markov Chains and Quasi-Monte Carlo Techniques The following described aspect of the invention provides methods, techniques and systems for efficient photorealistic simulation of light transport, suitable for use in computer graphics and other applications in which a computer or other digital processor is used to calculate pixel values for pixels in an image, using ray-tracing techniques to calculate ray-surface intersections.

In particular, the present invention provides improvements to conventional ray-tracing techniques, including methods for making ray-surface intersection testing more efficient, by applying sorting strategies that enable rapid processing of objects within a scene illuminated by packets or units of light, such as photons, the trajectories of which are simulated using Markov chains, the Markov chains being simulated using a suitable quasi-Monte Carlo (QMC) methodology. The sorting strategies include proximity sorting, and the invention advantageously exploits the low dimensionality of the QMC methodology using such proximity sorting.

The described techniques and systems can be used to solve the integral equation in close to real-time, a task that has presented significant difficulty in conventional systems.

Previously, using quasi-Monte Carlo methods to simulate Markov chains, e.g., trajectories of photons, provided only moderate improvements over random sampling. However, QMC methods in accordance with the present invention can exploit the intrinsic low-dimensional structure of the solution operator, yielding much more efficient techniques.

The description of this aspect of the invention is organized as follows:

1. Markov Chains and Quasi-Monte Carlo Techniques
2. Simultaneous Simulation of Markov Chains
2.1 Analysis of a Deterministic Technique in One Dimension
   2.1.1 Simplification of the Technique
   2.1.2 When and Why It Works
2.2 Simplified Technique in s Dimensions
2.3 Randomization
2.4 Array-Randomized Quasi-Monte Carlo
3. Application to Light Transport Simulation
3.1 Fredholm and Volterra Integrals
4. Sorting Techniques and Systems
4.1 Norm of State
4.2 Spatial Hierarchy
4.3 Bucket Sorting and Space-Filling Curves
5. Results
6. Conclusion
7. General Techniques 1. Markov Chains and Quasi-Monte Carlo Techniques In mathematics, a Markov chain is a discrete-time stochastic sequence of system states. A Markov chain is a "memoryless" process, in which previous states are irrelevant for predicting the probability of subsequent states, given knowledge of the current stare. Markov chins can be used to model and analyze a number of different phenomena. For example, the English language has been modeled using a Markov chain, based upon the calculation of the relative frequencies of one word following another. Using these transition probabilities, it is possible to generate English sentences. Many other evolution processes can also be described using Markov chains, including, for example: the analysis of queues, Brownian motion, particle transport, and, of particular relevance to the present discussion, light transport simulation.

More particularly, Markov chains can be used to simulate the trajectories of photons illuminating objects in a scene in a simulated image. Light transport simulation is characterized by complicated domains and discontinuities, and reduction to high-dimensional integrals. In addition, light transport simulation is characterized by a low-dimensional structure, due to repeated application of identical operators.

Markov chains may themselves be simulated using quasi-Monte Carlo (QMC) techniques. The general idea behind QMC techniques is that, rather than attempting to condition randomly generated numbers in some way, one starts with a deterministic sequence that is known to provide very uniform coverage of a selected interval. In randomized QMC, the sequence is randomized in such a way that the numbers have a random appearance, but as a group retain the desirable property of covering the selected interval in a regular way.

There are a number of approaches that can be employed for using QMC to simulate Markov chains. One approach is to apply a high-dimensional, low-discrepancy point set. However, this approach provides significant advantages only for moderate dimensions. Another approach is padding of a low-dimensional, randomized point set. This second approach is simpler to implement, and achieves results that are almost as good. A third approach combines sorting states and padding. This third approach results in a performance boost, in which the power of QMC is visible, and may be used in conjunction with both deterministic and randomized techniques. The implementation of this approach is relatively straightforward.

Properties of processes can be estimated by averaging the contributions of multiple Markov chains. Instead of simulating each trajectory independently, it has been found that simultaneously simulating Markov chains using correlated samples and sorting the ensemble of states after each transition step can notably improve convergence.

Given an order on the state space, these approaches can be improved by sorting the ensemble of Markov chains. According to aspects of the invention described below, the use of deterministic approaches results in simplifications in the described techniques, and provides useful indicia as to when and why the described sorting results in increased performance. As further described below, some or all of the described sorting strategies may be advantageously used to increase the efficiency of light transport simulation.

2. Simultaneous Simulation of Markov Chains

In order to increase efficiency, Markov chains may be simulated simultaneously. The idea of improving the simultaneous simulation of Markov chains with quasi-Monte Carlo methods by an intermediate sorting step was originally introduced by Lécot in a series of papers dealing with the Boltzmann equation and, later on, the heat equation. This idea was then used and refined for solving the heat equation on a grid by Morokoff and Caflisch and recently extended by L'Ecuyer, Tuffin, Demers et al. to incorporate randomized versions of the technique and splitting for rare event simulation. Independent research, in a way related to the above approaches, has been conducted in the field of computer graphics.

In the following discussion, there are described techniques embodying improvements over the above schemes. Background for these improved techniques is provided, in part, by techniques described in Lécot et al., "Quasi-Monte Carlo Methods for Estimating Transient Measures of Discrete Time Markov Chains," in H. Niederreiter, editor, *Monte Carlo and Quasi-Monte Carlo Methods in Scientific Computing* 2002, pp. 329-44, Springer Verlag (2004), which is incorporated herein by reference as if set forth in its entirety.

The following discussion provides a conceptual framework as to when and why the described techniques are superior to prior approaches. There also described advantageous implementations of the described techniques.

2.1 Analysis of a Deterministic Technique in One Dimension

There is now described a deterministic technique for a one-dimensional problem. The technique presented in Lécot simultaneously simulates Markov chains on a discrete state space E with an initial distribution $$\mu := (\mu_l)_{l \in E}$$

and a transition matrix $$P := (p_{i,j})_{i,j \in E}$$

Using a (t, 2)-sequence $(x_{i \in \mathbb{N}_0})$ in base b, $N = b^m$ chains are simulated in parallel, where $X_{n,l}$ is the state of chain l at time step n and $\mathbb{N}_0$ is the set of natural numbers including zero. Further, the techniques requires that for m>t the $N=b^m$ subsequent components $x_{i,l}$ form a (0, m, 1)-net in base b. As shown in Lécot, the technique converges if the following criterion is met:

$$\forall k \in E: \sum_{l=1}^{N-1} \left| \sum_{n=1}^{k-1} p_{l+1,n} - \sum_{n=1}^{k-1} p_{l,n} \right| \leq 1$$

$X_{n,l}$ is the state of chain l at time step n. Thus, the simulation may be performed as follows:

n:=0
initialize $X_{0,\lfloor N \cdot x_{l,1} \rfloor}$ using $x_{l,2}$ for $0 \leq l < N$
loop
    sort state vector using some order
    n:=n+1
    continue chain by computing $X_{n,\lfloor N \cdot x^{(l+n \cdot N),t} \rfloor}$ for $0 \leq l > N$ For $N = b^m$ chains, there is selected a (t, 2)-sequence $x^t$ in base b, such that for m>t, the $b^m$ subsequent components $x_{i,l}$ form a (0, m, 1)-net.

It will be seen that the Sobol' (0, 2)-sequence $(\phi_2(i), \phi_S(i))$ in base b=2 fulfills the following requirements:

For m=3>t=0, we have $N=2^3=8$ and $$(\lfloor 8 \cdot \phi_2(l+n \cdot 8) \rfloor)_{l=0}^{7} \equiv \{0,4,2,6,1,5,3,7\} \text{ for } n\delta \in \mathbb{N}_0$$

All permutations are identical.

2.1.1 Simplification of the Technique

It will be seen that, assuming uniform distributions, stable sorting does not change the state order. In fact, all permutations can be omitted because the convergence condition remains unchanged. Thus, the above-described technique can be simplified.

Consider the Sobol' sequence $$x_l = (x_{l,1}, x_{l,2}) = (\Phi_2(l), \Phi_S(l)) \in [0,1]^2$$

which is a (0, 2)-sequence in base b=2 and fulfills the assumptions required for the convergence condition to hold. The original Sobol' sequence is defined in I. Sobol', "On the Distribution of Points in a Cube and the Approximate Evaluation of Integrals," *Zh. Vychisl. Mat. i Mat. Fiz.*, 7(4): 784-802 (1967), which is incorporated herein by reference as if set forth in its entirety. A simple code example for $$(\Phi_2(l), \Phi_S(l))$$

is provided in T. Kollig and A. Keller, "Efficient Multidimensional Sampling," *Computer Graphics Forum*, 21(3):557-563 September 2002), which is incorporated herein by reference as if set forth in its entirety.

The simulation itself starts at time step n=0 initializing state $$X_{0,\lfloor N \cdot x_{l,1} \rfloor}$$

for $0 \leq l \leq N$ using $x_{l,2}$ for the realization of $\mu$. The technique then continues by sorting the states (described in detail in Section 3, below) and continues the chains by computing $$X_{n,\lfloor N \cdot x_{(l+n \cdot N),1} \rfloor}$$

using $$x_{(l+n \cdot N),2}$$

for $0 \leq l \leq N$ to realize transitions according to P. The index $$\sigma(l) := \lfloor N \cdot x_{(l+n \cdot N),2} \rfloor$$

for selecting the next state for transition in fact uses the van der Corput sequence $\Phi_2$ in base 2, which is a (0, 1)-sequence and thus a sequence of (0, m, 1)-nets. For example, choosing m=3>t=0 we have $N=2^3=8$ and $$(\lfloor 8 \cdot \phi_2(l+n \cdot 8) \rfloor)_{l=0}^{7} \equiv \{0,4,2,6,1,5,3,7\}$$

for $n \in \mathbb{N}$. Hence all indices used during the different time steps n are in fact identical for all m.

Assuming uniform probabilities $$p_{i,j} = \frac{1}{|E|}$$

the convergence theorem still applies, but more important, stable sorting does not change the state order. It thus follows that, in fact, the index permutation can be chosen as identity without touching the convergence conditions. The same applies for selecting the initial states $X_{0,l}$ and it results in the following simplified, but equivalent, technique:

n:=0
initialize $X_{0,l}$ using $x_{l,2}$ for $0 \leq l < 2^m$
loop
    sort state vector using a suitable order
    n:=n+1
    continue chain by computing $X_{n,l}$ using $\Phi_S(l+n \cdot 2^m)$ for $0 \leq l < 2^m$ using only the second component of the (0,2)-sequence $x_l$.

2.1.2 When and Why it Works

Figure 11:
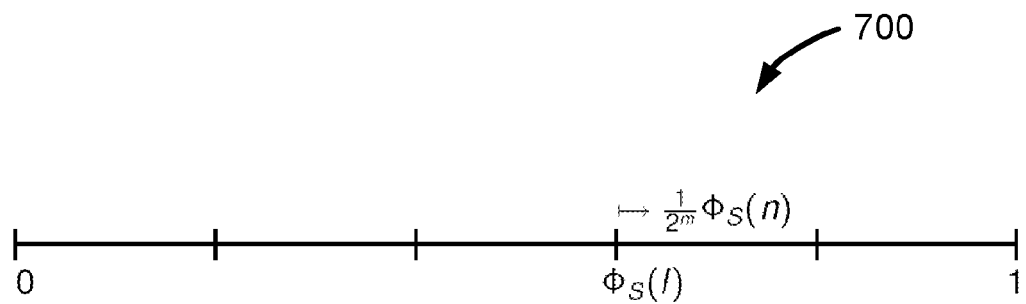
FIG. 11 is diagram illustrating the shift $\Phi_S(n)$.

It will be seen that the improved convergence of the scheme, which has been observed in many applications, is caused by the structure of the samples $$\Phi_S(l+n \cdot 2^m)$$

used to realize the transitions of $X_{n,l}$ according to P. This can be understood by decomposing the radical inverse $$\Phi_S(l + n \cdot 2^m) = \Phi_S(l) + \frac{1}{2^m} \Phi_S(n)$$

which reveals an implicit stratification: $\Phi_S(l)$ is an offset with spacing $1/2^m$ depending on the state number l, which the shift $\Phi_S(n)$ is identical for all the intervals at time step n FIG. 11 shows a two-dimensional array 700 illustrating the shift $\Phi_S(n)$.

Here, the low dimensional setting may result in a misleading interpretation of the sample being a shifted lattice or stratified samples, as the entirety of the $\Phi_S(l)$ for l=0, . . . , $2^m-1$ in fact must be an (0, m, 1)-net and thus an equidistant set of samples. However, the good performance stems from the property that $\Phi_S(l)$ is a (t, s)-sequence and thus a sequence of (t, m', s)-nets for any m' with $t \leq m' \leq m$. This means that $b^{m'}$ states, that are similar in state space and therefore subsequent by order after sorting, will sample their transition by a (t, m', s)-net, which guarantees for good discrete density approximation. The maximum improvement would be obtained if all $2^m$ chains were in the same state. The more states of the chains are separated in state space, the smaller the performance improvements will be.

2.2 Simplified Technique in s Dimensions

Using a (t, s)-sequence in base b, which is a sequence of (t, m, s)-nets, the scheme also works in s dimensions: Markov chains, whose states are similar after sorting are guaranteed to sample the transition probability by low discrepancy samples. The simplified technique in s dimensions now looks like the following:

n:=0
initialize $X_{0,l}$ using quasi-Monte Carlo points $x_l$
loop
    sort state vector using a suitable order
    n:=n+1
    continue chain by computing $X_{n,l}$ using subsequent samples $x_l$ from a (t, s)-sequence Some simulations require trajectory splitting in order to capture certain local subtle effects. While this already has been addressed using a more complicated approaches, it in fact can be achieved in a simpler way by just drawing more samples out of the (t, s)-sequence for states to be split.

This is a consequence of the fact that it is not even necessary to simultaneously simulate exactly $b^m$ chains. It is only important to draw subsequent samples from the (t, s)-sequence and to minimize the number $b^m$ of points in the subsequent (t, m, s)-nets in order to enable the maximal performance gain. The choice of the (t, s)-sequence, however, is restricted by the condition that (0, s)-sequences only exist for $b \geq s$ and that m>t.

Figure 12:
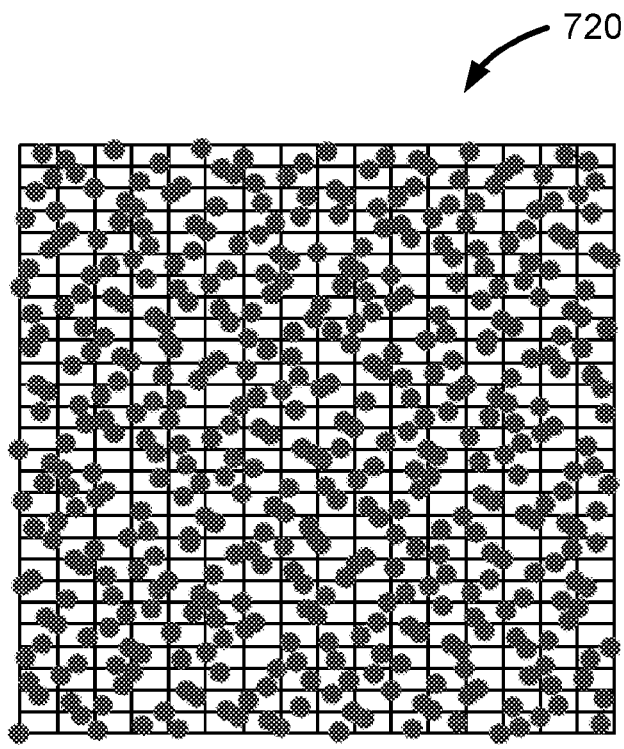
FIG. 12 shows an illustrative Halton sequence along with its stratification properties.

Note that other radical inversion based points sets like the Halton sequence or its scrambled variants fulfill properties similar to (t, s)-sequences and will result in similar performance gains. FIG. 12 shows a graph 720 illustrating a Halton sequence, points $x_i = (\phi_2(i), \phi_3(i))$. In the depicted Halton sequence, the radical inversion implies stratification, with subsequent points that fall into the biggest "holes." This property is good for any starting point; (t, s)-sequences have the same property.

2.3 Randomization

While there currently exists no general proof for convergence of the deterministic technique in higher dimensions, the technique becomes unbiased by freshly randomizing the quasi-Monte Carlo points in each time step n. Since this is, in fact, an instance of padded replications sampling, the argument for unbiasedness becomes simpler. Randomization, however, deserves special attention.

The most efficient implementation consists of choosing a (t, s)-sequence in base b=2, from which subsequent samples are drawn, which are XOR-ed by an s-dimensional random vector. This random vector is freshly drawn after each transition step. However, as random scrambling changes the order in which the points are enumerated, the local properties of the sequences of (t, m, s)-nets are changed, too.

This observation can be taken as an explanation for some of the effects seen using earlier approaches: Sobol and Korobov points used in the array-(R)QMC simulation are worse up to an order of magnitude in variance reduction than their transformed (Gray-code for Sobol, Baker transform for Korobov) counterparts. The explanation for this is found in the structure of the points. The sequence of (t, m, s)-nets extracted from the Sorbol sequence is locally worse than its Gray-code variant. The same goes for the Korobov lattice and its transformed variant.

2.4 Array-Randomized Quasi-Monte Carlo

The following is a randomized technique for an s-dimensional problem:

n:=0, select point sequence $x_l$
instantiate randomization
initialize $X_{0,l}$ using rand($x_l$) for $0 \leq l < N$
loop
    sort state vector using some order
    n:=n+1
    instantiate randomization
    continue chain by computing $X_{n,l}$ using rand($x_l$) for $0 \leq l < N$ The technique has a number of interesting properties. First, the technique is unbiased for one tabulated set of $x_l$ and for a continuous stream of $x_l$. Second, splitting and absorption are intrinsic when using a stream. This is true in a Russian roulette scheme, and is also true when splitting by taking more continuous samples from $x_l$.

3. Light Transport Simulation

For numerical evidence, the above-described techniques are applied to light transport simulation for synthesizing realistic images. The underlying integral equation can be reformulated as a path integral.

Figure 13:
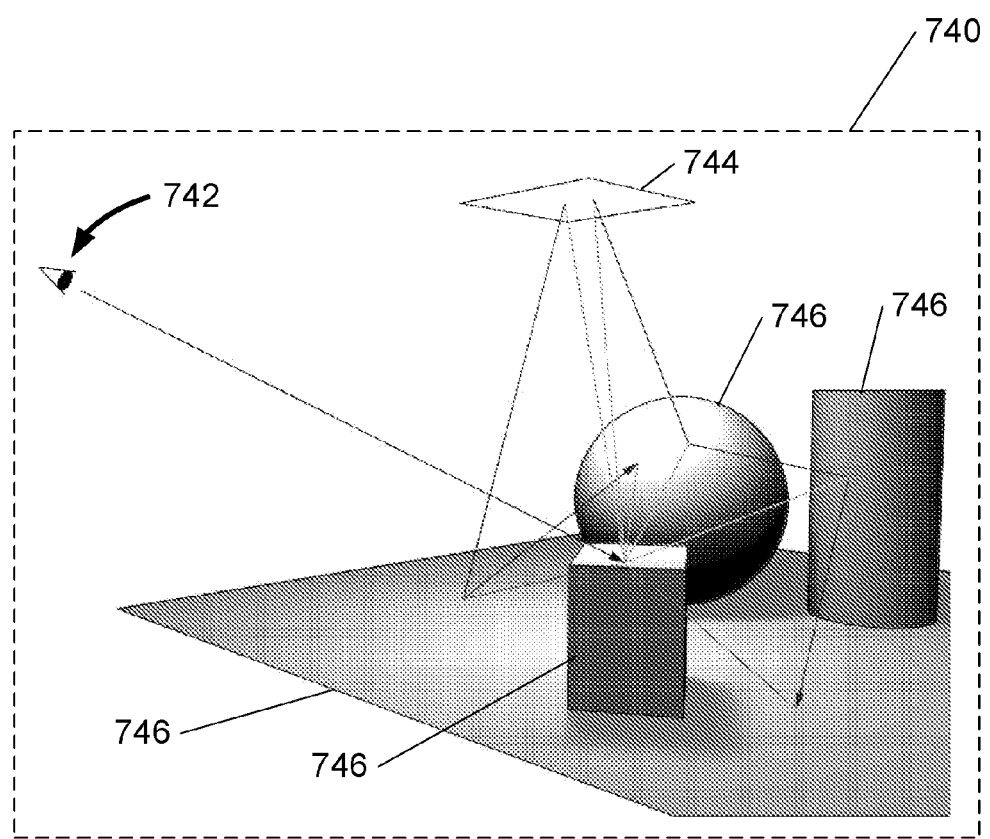
FIG. 13 is a diagram illustrating a sampling transport path space by bidirectional path tracing.
Figure 14A:
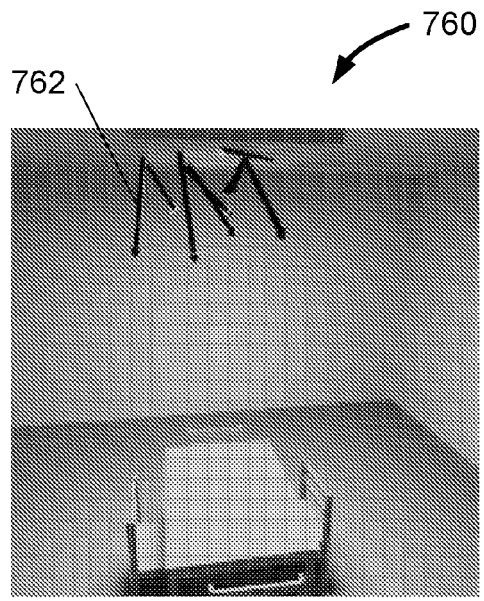
FIGS. 14A-B and 15A-B are rendered images illustrating differences between simulations using a Monte Carlo technique and simulations using an array-randomized quasi-Monte Carlo technique.
Figure 14B:
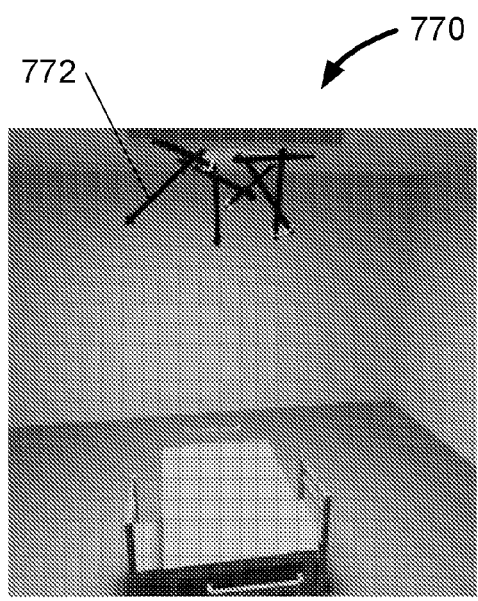
Figure 15A:
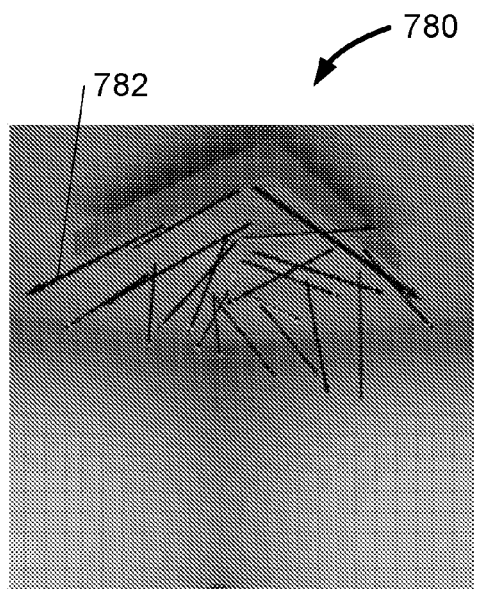
Figure 15B:
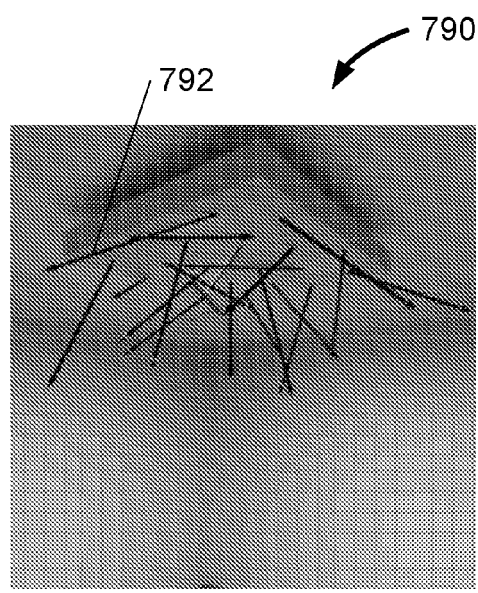
Figure 16A:
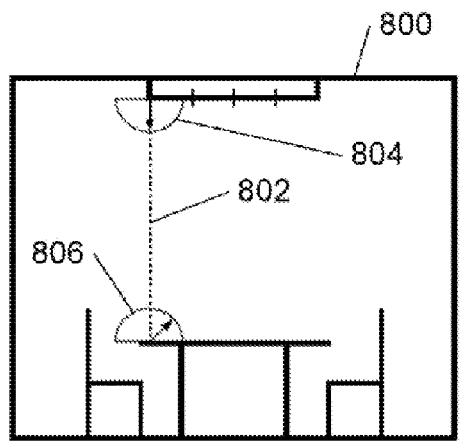
FIGS. 16A-D are series of diagrams illustrating photon trajectories from a plurality of starting points on a light source.
Figure 16B:
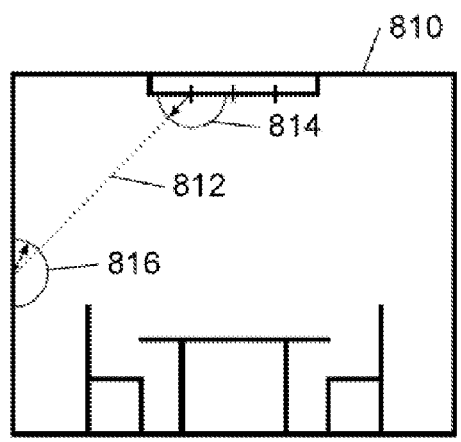
Figure 16C:
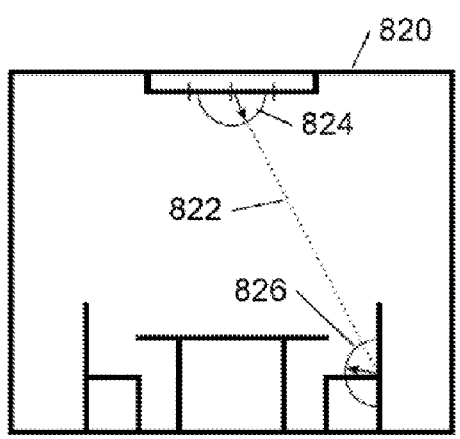
Figure 16D:
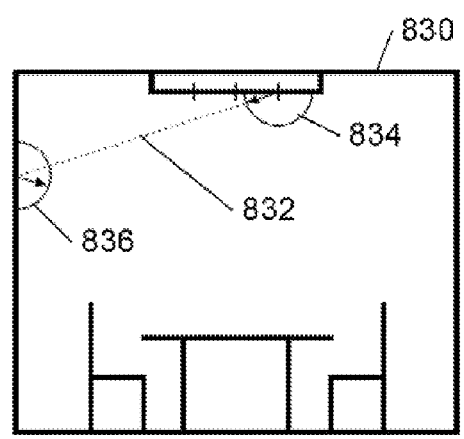

FIG. 13 is a diagram illustrating sampling transport path space 740 by bidirectional path tracing. Trajectories from the eye 742 and the light sources 744 to scene objects 746 are generated by Markov chains and connected to determine the transported amount of light. The sampling path space, shown in FIG. 13, corresponds to simulating Markov chains, where the paths are established by ray tracing and scattering events. The initial distribution is determined by the emission characteristics of the light sources 744 and the transition probabilities are given by bidirectional reflectance distribution functions on the hit surfaces.

To solve the path integral, there are at least two basic strategies, which are either using high dimensional low discrepancy points or padding low dimensional, low discrepancy points. The latter approach fits the above-discussed findings, where high dimensional events are composed as subsequent transitions of a Markov chain. As measured, the difference to using high dimensional sequences for Markov chain simulations is small to none, but using padded sequences is computationally faster and requires less implementation effort. It is also simpler for practitioners in rendering industry.

In addition, the low dimensional approach allows for much better results, because the stratification properties of (t, s)-sequences or the Halton sequence and its scrambled variants are much better for small dimensions, as discussed above.

FIGS. 14A-B and 15A-B are rendered images 760, 770, 780 and 790 illustrating differences between simulations using a Monte Carlo technique and simulations using an array-randomized quasi-Monte Carlo (A-RQMC) technique. The simulations using a Monte Carlo technique are shown in images 760 and 780 in FIGS. 14A and 15A. The simulations using an array-randomized quasi-Monte Carlo technique are shown in images 770 and 790 in FIGS. 14B and 15B. Arrows at the top of each rendered image 762, 772, 782, and 792 illustrate emission location and direction. It will be seen from FIGS. 14A-B and 15A-B that, in these examples, the light paths simulated using an array-randomized QMC technique are significantly more uniformly distributed than the light paths simulated using a Monte Carlo technique.

3.1 Fredholm and Volterra Integrals

The integral equation underlying light transport can be considered either as a Fredholm or Volterra integral equation, which matters for implementation $$L_r(x,\omega)=\int_{S^2(x)} f_r(\omega_i,x,\omega)L(x,\omega_i)(n(x)\cdot\omega_i)d\omega_i$$

is the radiance reflected off a surface in point x in direction ω, where the domain $$S^2(x)$$

of the integral operator is the hemisphere aligned to the normal n(x) in x.

FIGS. 16A-D show a series of diagrams 800, 810, 820, and 830 illustrating photon trajectories 802, 812, 822, and 832 that are started from a plurality of starting points 804, 814, 824, and 834 on a light source. Upon hitting a surface 806, 816, 826, and 836 after tracing a ray, the bidirectional reflectance distribution function is sampled to determine a direction of scattering to continue the path.

$f_r$ is the bidirectional reflectance distribution function describing the optical surface properties and L is the incident radiance. Using this integral operator results in a Volterra integral equation of the second king, as the integration domain depends on x.

$$L_r(x,\omega)=\int_{S^2} f_r(\omega_i,x,\omega)L(x,\omega_i)\max\{n(x)\cdot\omega_i,0\}d\omega_i$$

on the other hand results in a Fredholm integral equation of the second kind, as integration is being performed over all directions of the unit sphere $S^2$ independent of x.

Using the latter approach of generating global directions and rejecting directions with negative scalar product with respect to the surface normal n(x) is computationally attractive, while the first approach requires the generation of directions in the hemisphere that have to be transformed into the local surface frame, which is more expensive. Mappings from the unit square to $S^2$ or $S^2(x)$ are known in the art.

An even more important argument for generating global directions is related to the presently described approach: By sorting, it can happen that two close-by surface points with different surface normals, for example, in a corner, use subsequent samples of a (t, s)-sequence to generate scattering directions. Generating global directions now works fine, whereas generating directions in the two different local frames using subsequent samples will destroy the low discrepancy properties. These discontinuities become clearly visible. Using global directions, however, does not allow for importance sampling according to $f_r$ or the cosine term, which often is a disadvantage and deserves further investigation.

4. Sorting Techniques and Systems

It is possible to use sorting to increase the efficiency of the above-described techniques. As discussed herein, (t, s)-sequences of (t, m, s)-nets in base b, and are similar to Halton sequences and their variants. Similar states $X_{n,i}$ use successive points. Therefore, states should be ordered by proximity in state space. The closer the states are in the state space, the more uniformly it will be explored.

In order to have the states as closely together as possible, they have to be enumerated in an order such that the sum of the distances of neighboring states is minimal. This in fact relates to the traveling salesman problem, where for a given set of cities and the costs of traveling from one city to another city, the cheapest round trip is sought that visits each city exactly once and then returns to the starting city. This problem already was investigated by Euler in the early 18th century and unfortunately can be shown to be NP-hard.

Our problem is very similar except for it is not necessary to return from the last state of the route to the first state. Some techniques are already available to efficiently calculate approximate, but close to optimal, solutions for the traveling salesman problem. However, running times of these techniques have not been acceptable in simulations, as the calculation of the distance matrix alone exhibits an $\mathcal{O}(N^2)$ complexity, while it is desired to keep the technique as close as possible to the $\mathcal{O}(N)$ complexity of classic Monte Carlo methods.

In the following there are discussed a number of orders according to aspects of the present invention to achieve fast sorting for high-dimensional state spaces.

4.1 Norm of State

The average complexity of quicksort is $\mathcal{O}(N \log N)$, but for certain scenarios even $\mathcal{O}(N)$ techniques exist, such as radix sort, which, however, requires additional temporary memory. In order to use these one-dimensional sorting techniques, the multi-dimensional state must be reduced to one dimension. Amongst many choices often some norm:

$\|X_{n,i}\|$ is used to define an order on the state space. However, similar norms do not necessarily indicate proximity in state space. A simple example for this is similar energy of particles in a transport simulation that are located far away in space.

4.2 Spatial Hierarchy

A second possibility to enable multidimensional sorting is the usage of a spatial hierarchy to define an order on the states. Efficient data structures for this purpose are the BSP-tree, its specialized axis aligned subset, the kD-tree, or bounding volume hierarchies. The construction of such binary hierarchies is simple: The space is recursively subdivided using planes selected by some heuristic. The construction runs in $\mathcal{O}(N \log N)$ on the average. Traversing the hierarchy in in-order enumerates the leaves in an order of proximity. This traversal becomes trivial, if the tree is left-balanced and in consequence can be stored in an array.

If a spatial hierarchy must be used anyway, for example to accelerate ray tracing, there is no additional construction time for the hierarchy. The particles then are stored as linked lists attached to the leaves of the hierarchy.

FIGS. 17A-G, 18A-B, and 19A-C are a series of diagrams illustrating that sorting the states into the leaves of a spatial hierarchy defines an order of proximity by traversing the hierarchy in in-order.

Figure 17A:
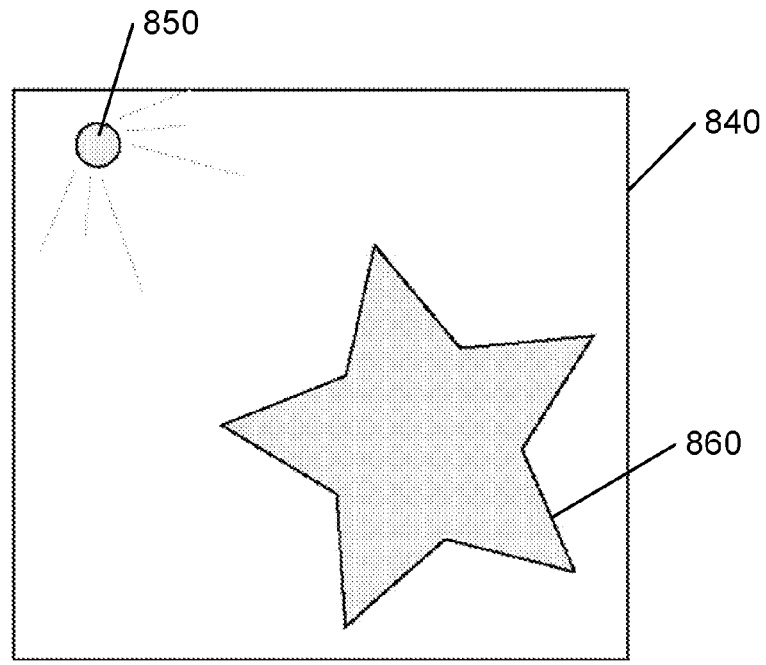
FIGS. 17A-G, 18A-B, and 19A-C are a series of diagrams illustrating the sorting of states into leaves of a spatial hierarchy, thereby defining an order of proximity by traversing the hierarchy in in-order.
Figure 17B:
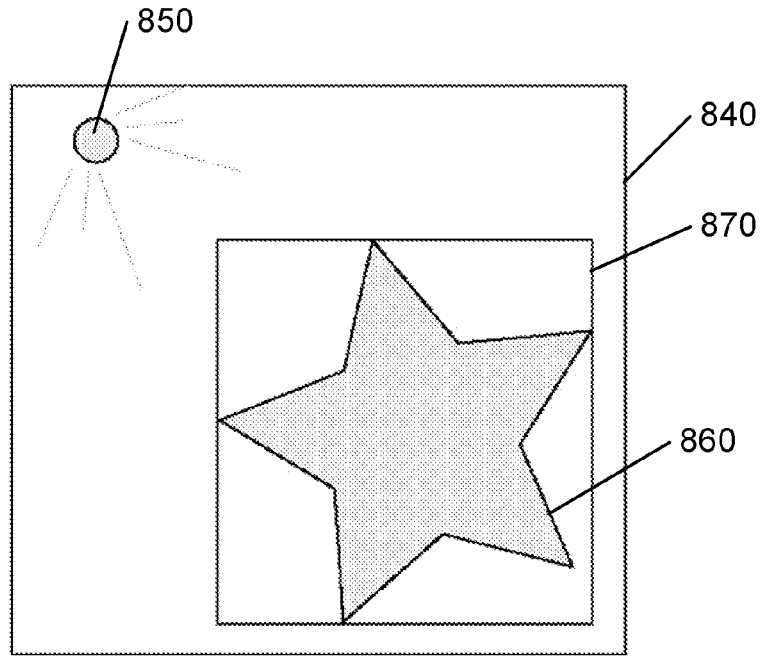

FIG. 17A shows an exemplary scene 840, including a light source 850 and an object 860 to be rendered. The object 860 is a five-pointed star. In FIG. 17B, the object 860 is bounded by an axis-aligned bounding box 870. In FIGS. 17C-G, the bounding box 870 is bounded by an axis-aligned bounding box 870. In FIGS. 17C-G, the bounding box 870 is iteratively subdivided into branches. Each branch terminates in a leaf.

Figure 17C:
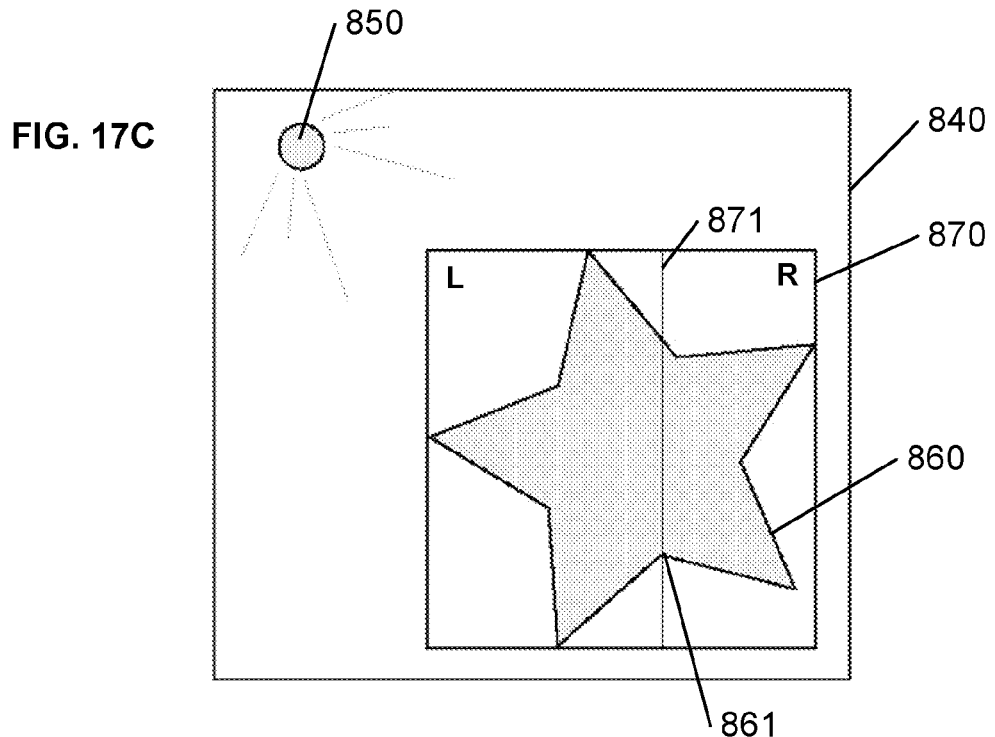

In FIG. 17C, the bounding box 870 is divided into a first-generation left branch L and a first-generation right branch R by a splitting plane 871 passing through a first vertex 861 of the object 860.

Figure 17D:
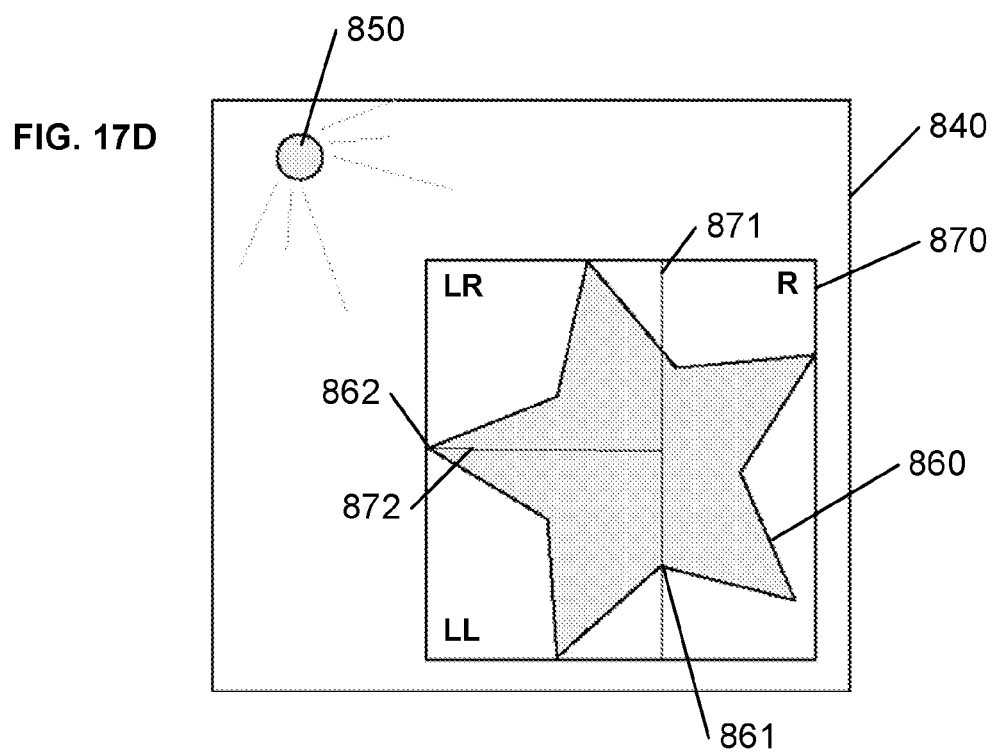

In FIG. 17D, the left branch L is divided by a second splitting plane 872 passing through a second vertex 862 of the object 860, resulting in a second-generation left branch LL and a second-generation right branch LR.

Figure 17E:
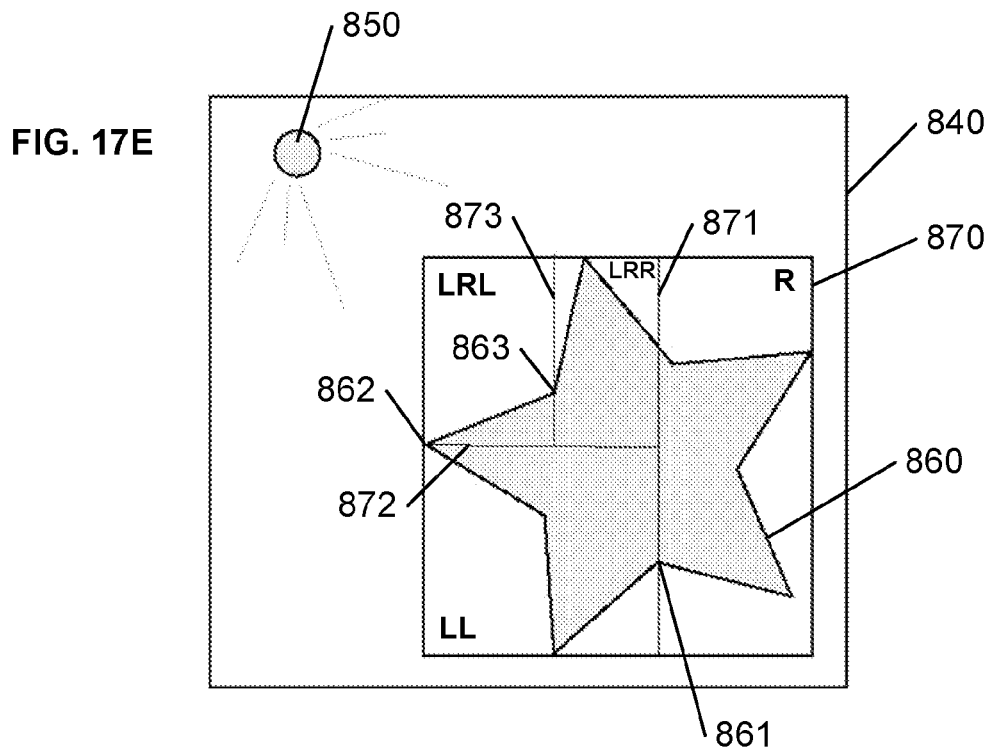

In FIG. 17E, a third splitting plane 873 passes through a third vertex 863 of the object 860, splitting branch LR into third-generation left and right branches LRL and LRR.

Figure 17F:
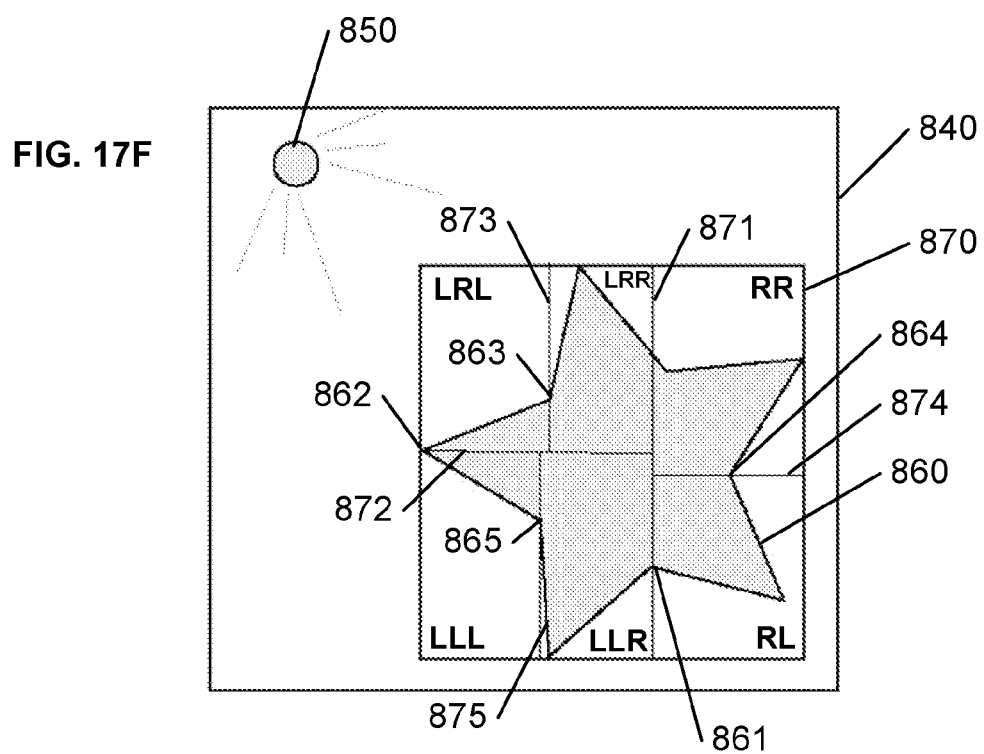

In FIG. 17F, fourth and fifth splitting planes 874 and 875 pass through fourth and fifth vertices 864 and 865 of the object 860. As shown in FIG. 17F, the result is five leafs LRL, LRR, RR, LLL, LLR and RL, one for each of the five points of the star 860.

Figure 17G:
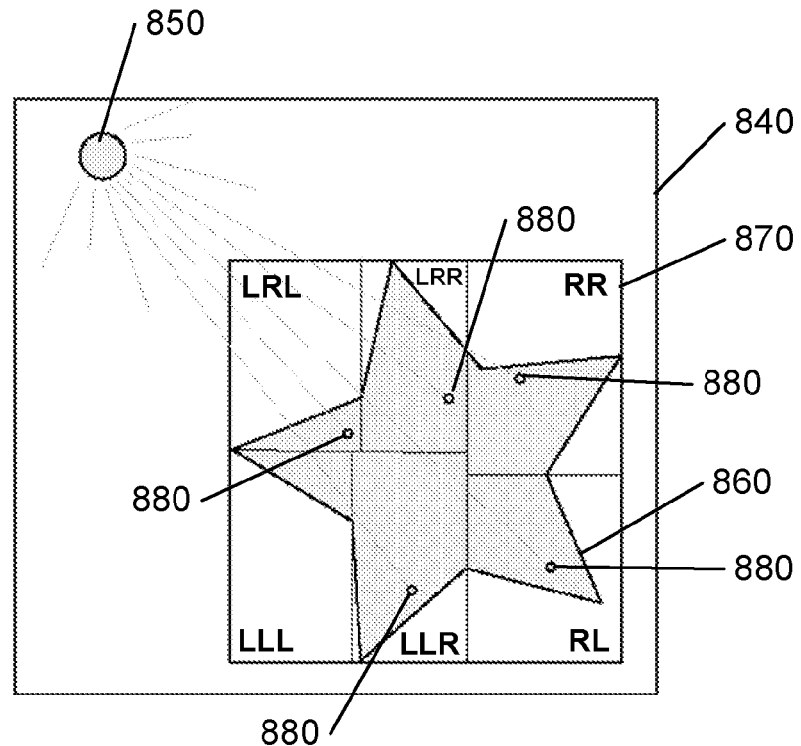
Figure 18A:
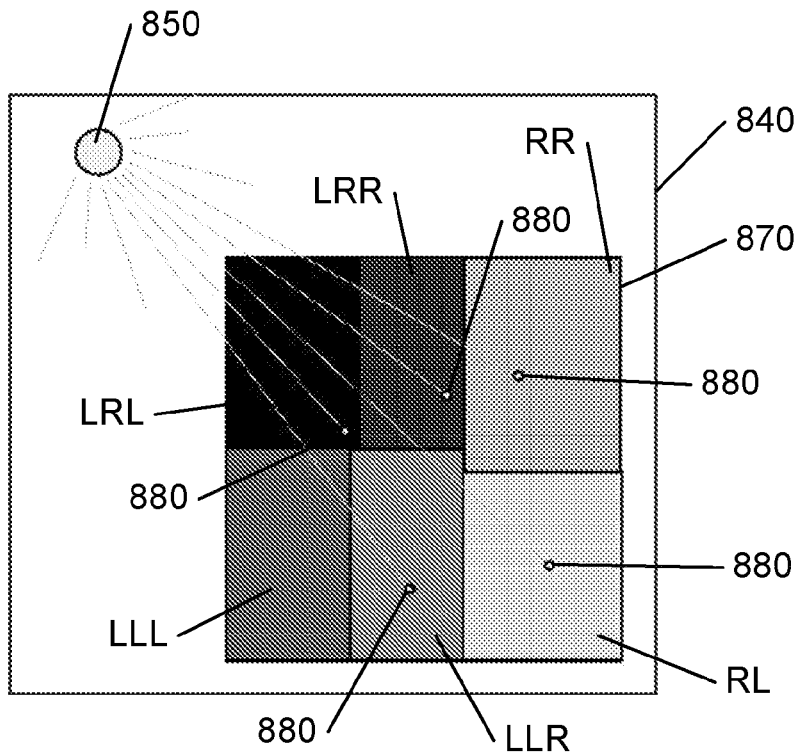
Figure 18B:
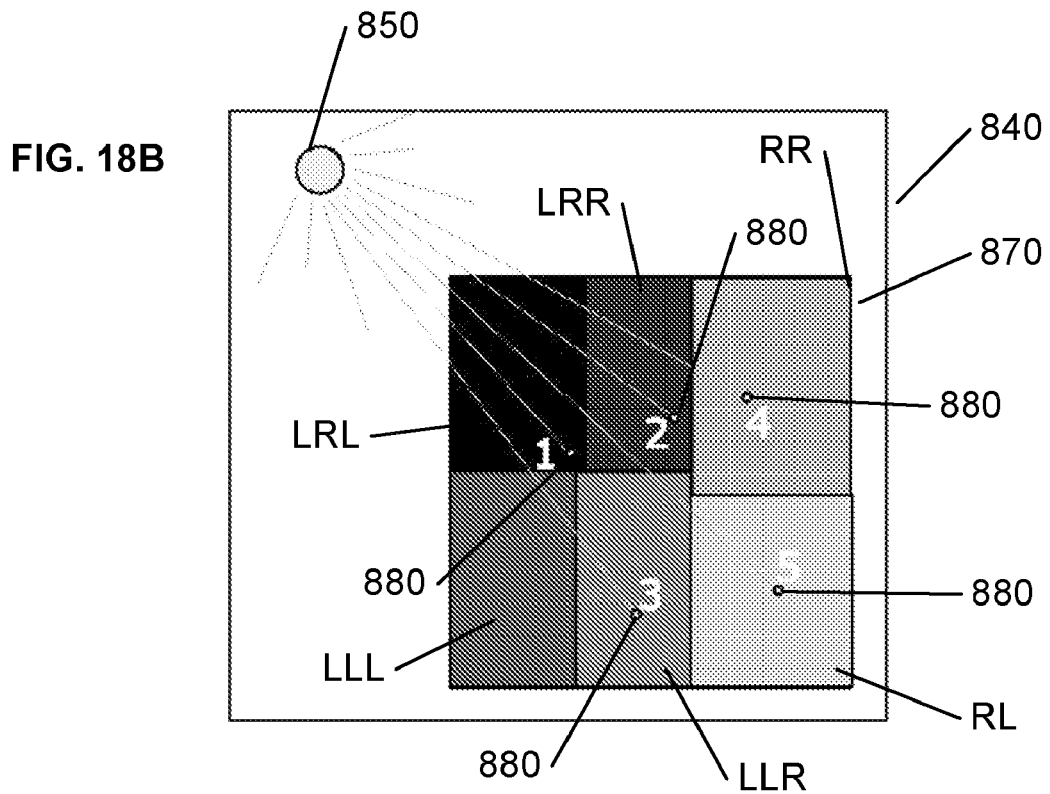

FIG. 17G illustrates the illumination of individual points within each leaf. In FIG. 18A, each leaf has been shaded to indicate its luminosity. In FIG. 18B, the leaves are hierarchically ordered according to their respective luminosities. From "darkest" to "brightest," the leaves are arranged as follows: LRL, LRR, LLR, RR, RL.

Unfortunately the quality of this order is strongly determined by the quality of the spatial hierarchy used for simulation, which is especially problematic if the number of leafs in the hierarchy is much smaller than the number of chains N as this results in several states being mapped to the same leaf.

4.3 Bucket Sorting and Space Filling Curves

In order to guarantee linear time complexity, bucket sorting can be used. In the s-dimensional extension of the simple technique sketched in Section 2.1, multidimensional states were sorted into buckets by the first dimension of the state, then the states of each bucket were sorted into buckets according to the second dimension, and so forth. This procedure works well, but has the problem that states close in state space can be separated by sorting procedure. In addition, a stratification of each dimension has to be used, which induces the curse of dimension in the number of Markov chains to be simulated simultaneously.

The state space is therefore into equal volume cells, or "voxels," which serve as buckets. The bucket of each state is found by truncating the state coordinates according to the resolution of the voxel grid. Note that this applies for continuous as well as discrete state spaces. Enumerating the voxels by proximity yields the desired order on the states and can be done in linear time in the number of voxels.

Orders that enumerate the voxels by proximity are given by space filling curves, such as the Peano curve, Hilbert curve, or H-indexing. These curves guarantee every voxel to be visited exactly once and an overall path length being relatively short. For problems with large geometry, which is the case in our own simulations, this can be even one of the few possibilities to generate fast and memory efficient approximate solutions to the traveling salesman problem. However, these curves are rather costly to evaluate, need to be tabulated to be efficient, or are not available for higher dimensions.

Fortunately, the Z-curve, also known as Lebesgue-curve or Morton order, avoids these problems. Given integer coordinates of a bucket in multidimensional space, its one dimensional Z-curve index is simply calculated by bitwise interleaving the coordinate values, as shown in FIGS. 19A-C.

Figures 19A, 19B, 19C:
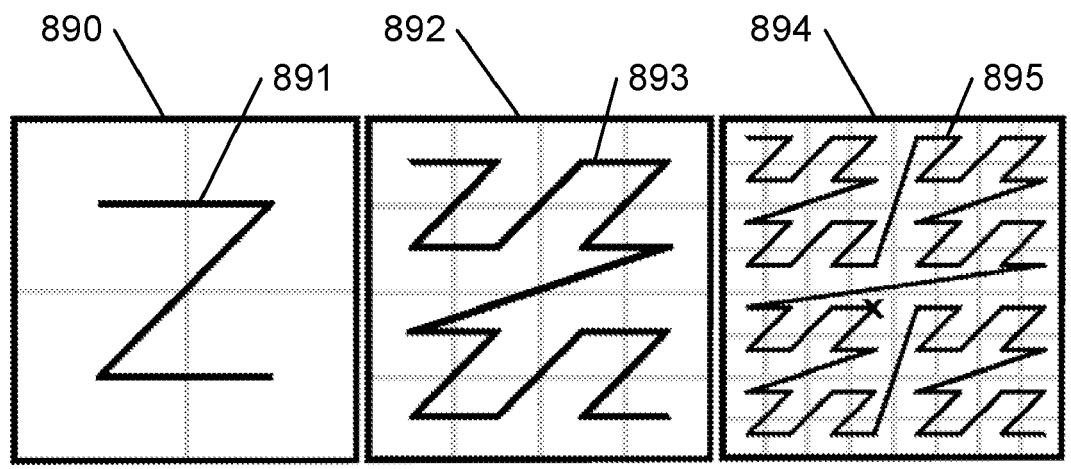

FIGS. 19A-C show a series of diagrams 890, 892, and 894 illustrates the Z-curve 891, 893, and 895 in two dimensions for 2×2 (FIG. 19A), 4×4 (FIG. 19B), and 16×16 (FIG. 19C) buckets. With the origin (0, 0) top left the point marked by × has the integer coordinates (3, 4), which corresponds to (011, 100)$_2$ in the binary system. Its binary Z-curve index 100101$_2$ is computed by bitwise interleaving the binary coordinates.

This is straightforward and fast to compute for any dimension and problem size, and requires no additional memory. It has been found that the results are not as good as, for example, the Hilbert curve in a global context. However, the average case partitioning quality and average/worst case logarithmic index ranges are comparably good. Problems can arise in highly symmetrical scenes like Shirley's "Scene 6," shown in FIG. 20A, used for numerical experiments: States on the walls parallel to the (x, y)-plane will be sorted very well, but the states located on the other two walls parallel to the (y, z)-plane will be visited by the curve in an alternating manner, which can lead to correlation artifacts in some scenarios.

5. Numerical Evidence

Following the above discussion, the Halton sequence was used, with permutations by Faure, randomized by a Cranley-Patterson rotation in order to have unbiased error estimates. For sorting, the Z-Curve order produced the best results for the particular setting and was used for the following experiments. It is further noted that it has been numerically verified that omitting the randomization has no notable effect on the precision of the results. In numerical experiments, four approaches to simulate Markov chains were compared:

| | |
|---|---|
| MC: | Uniform random numbers generated by the Mersenne Twister were used for classical Monte Carlo sampling. |
| RQMC: | Used the high-dimensional Halton sequence with permutations by Faure randomized by a Cranley-Patterson rotation, where pairs of components were used to sample the two-dimensional emission and scattering events. |
| lo-dim RQMCS: | Used the two-dimensional Halton sequence randomized by a Cranley-Patterson rotation. The Z-curve was used to enumerate the bucket-sorted states. |
| hi-dim RQMCS: | Used the high-dimensional Halton sequence with permutations by Faure randomized by a Cranley-Patterson rotation. The Z-curve was used to enumerate the bucket-sorted states. |

Figure 20A:
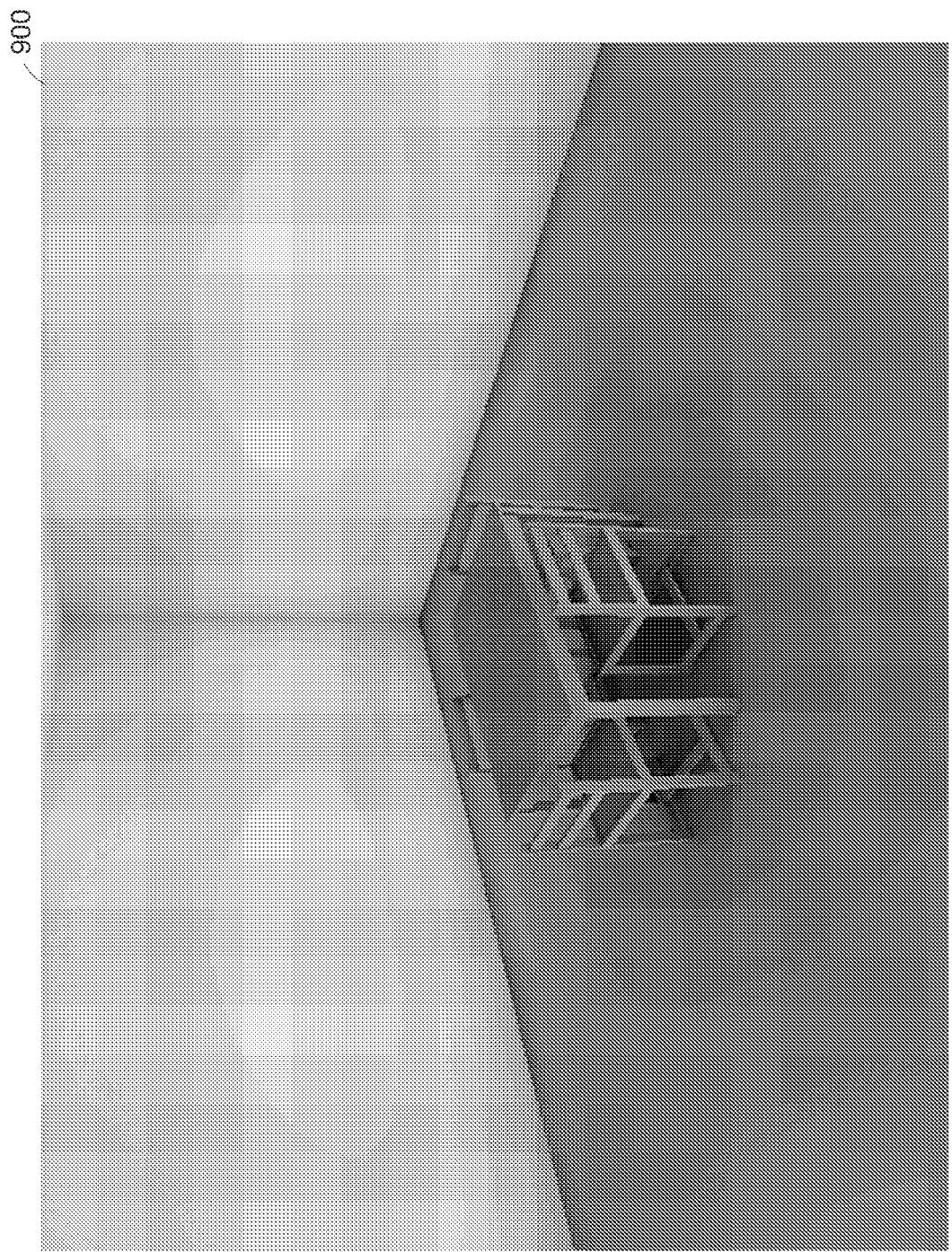
FIGS. 20A-D are, respectively, a test scene "Shirley 6," a graph showing average RMS error to a master solution, a graph showing global variance, and a graph showing pixel-based variance.
Figure 20B:
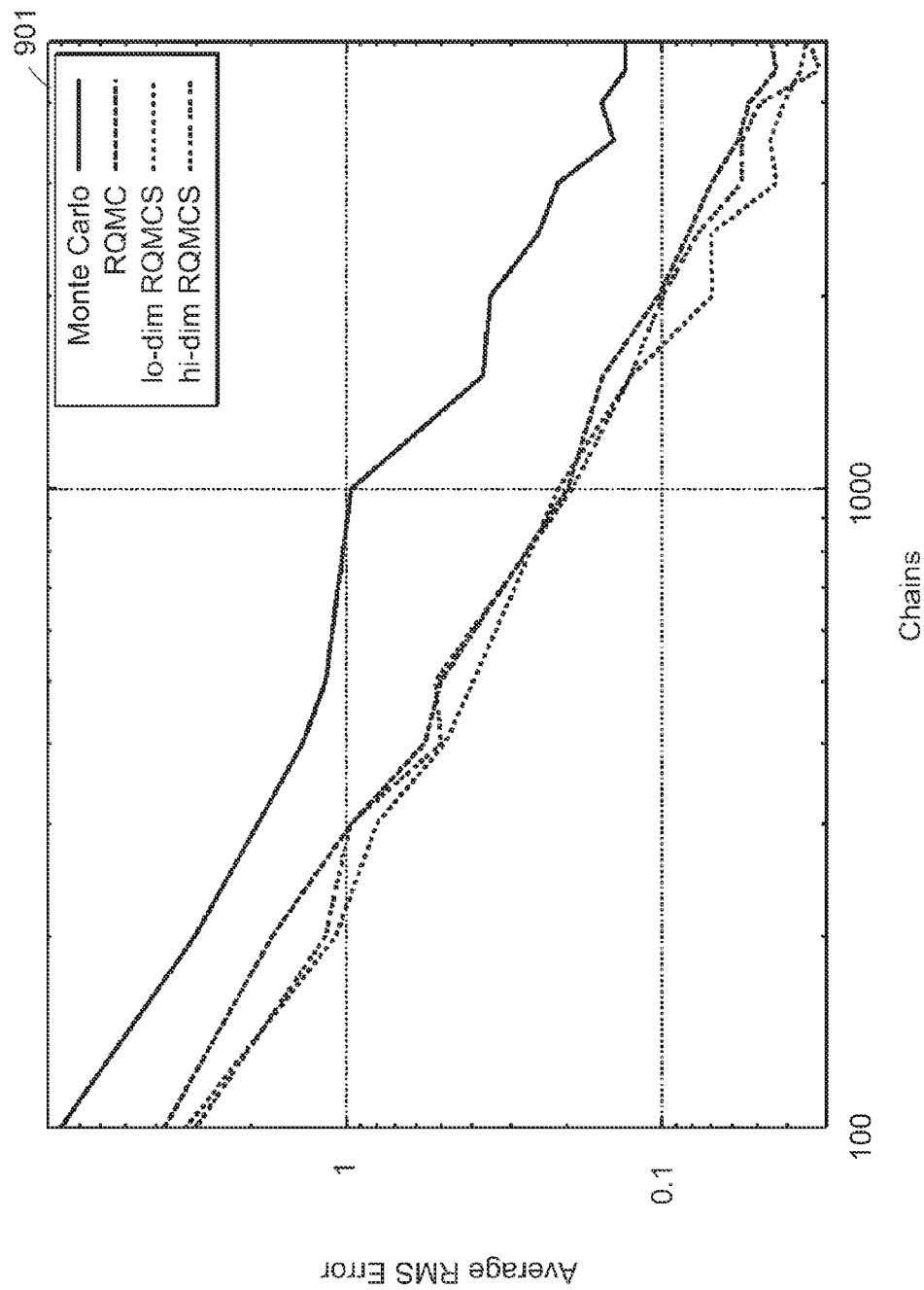
Figure 20C:
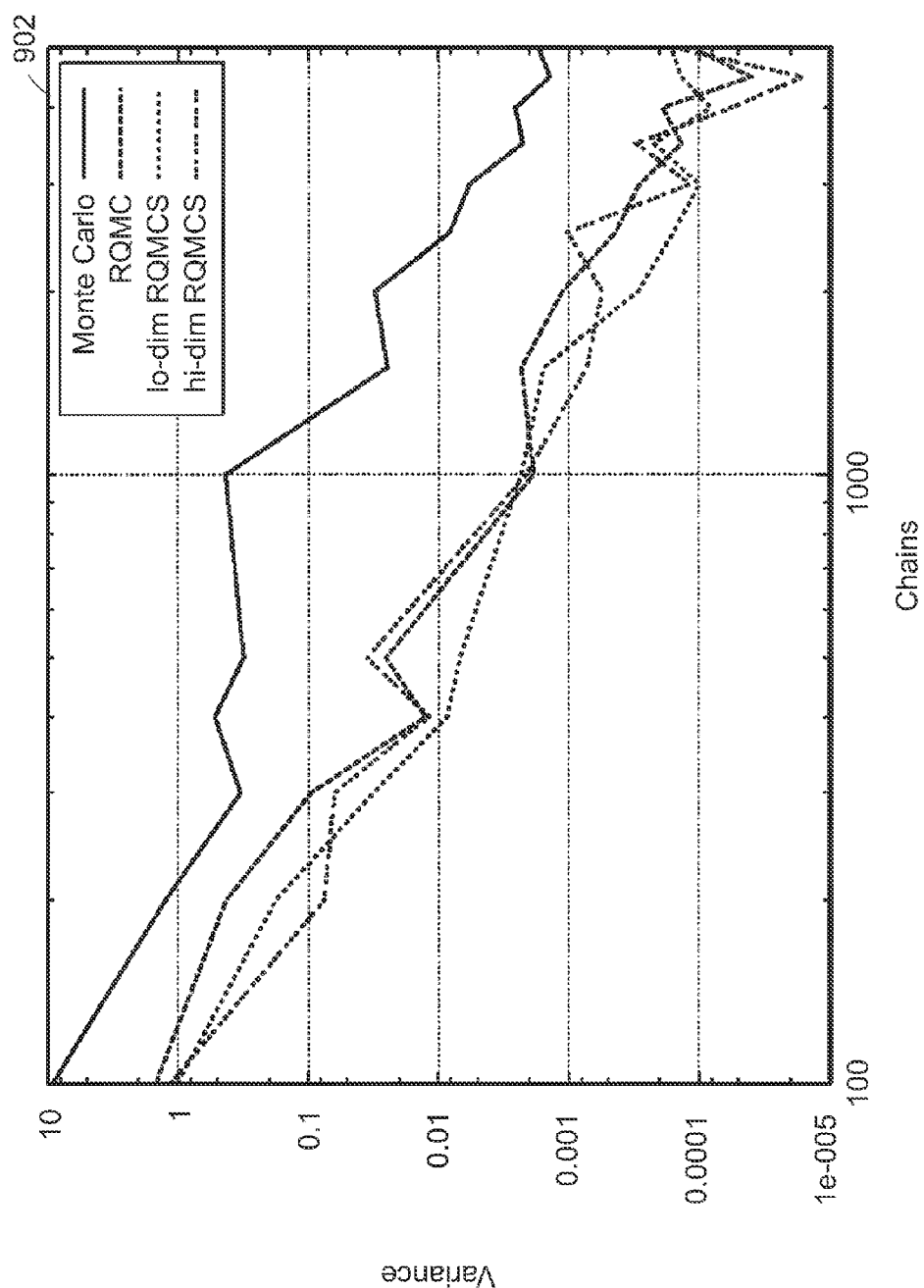
Figure 20D:
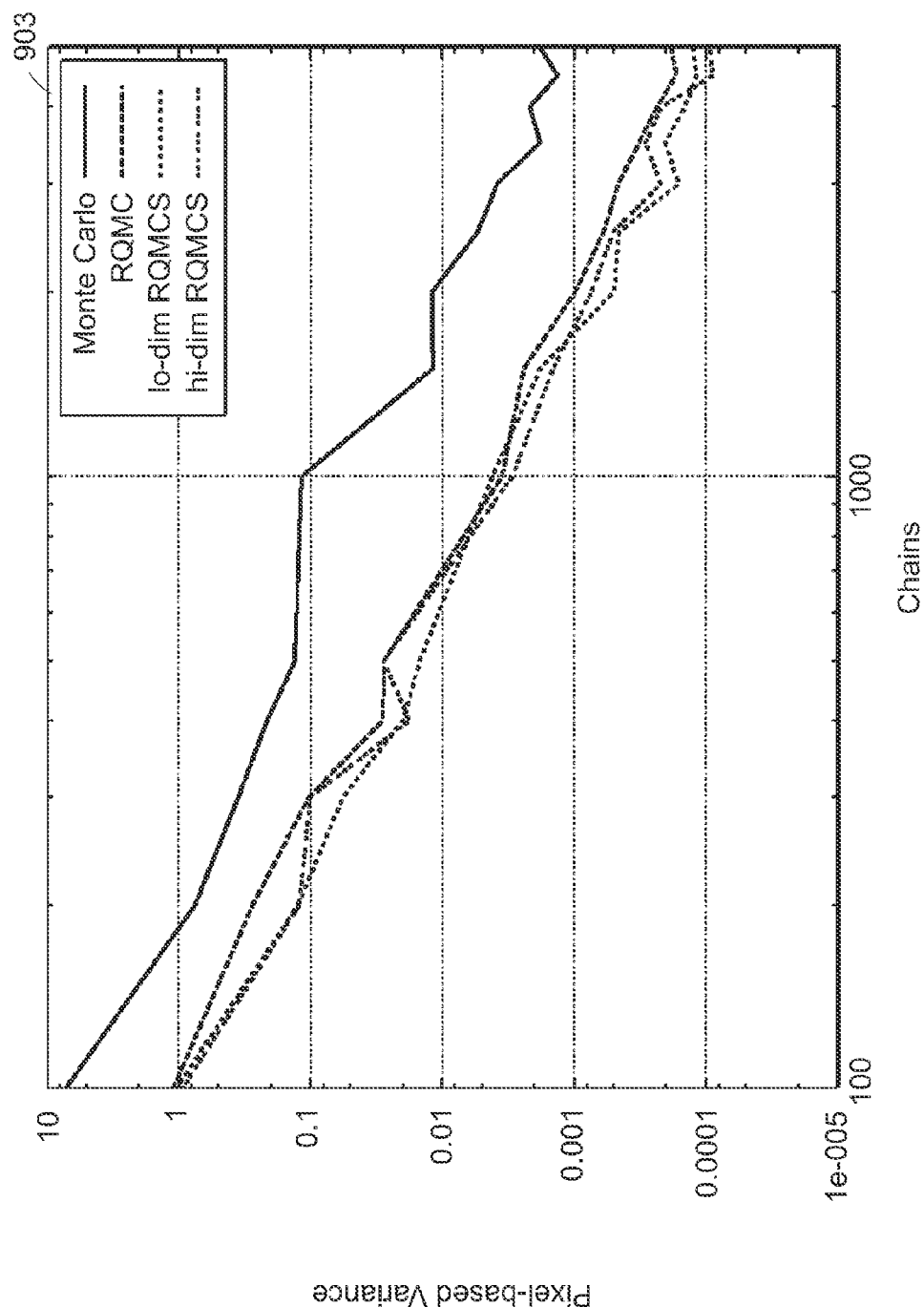
Figure 21A:
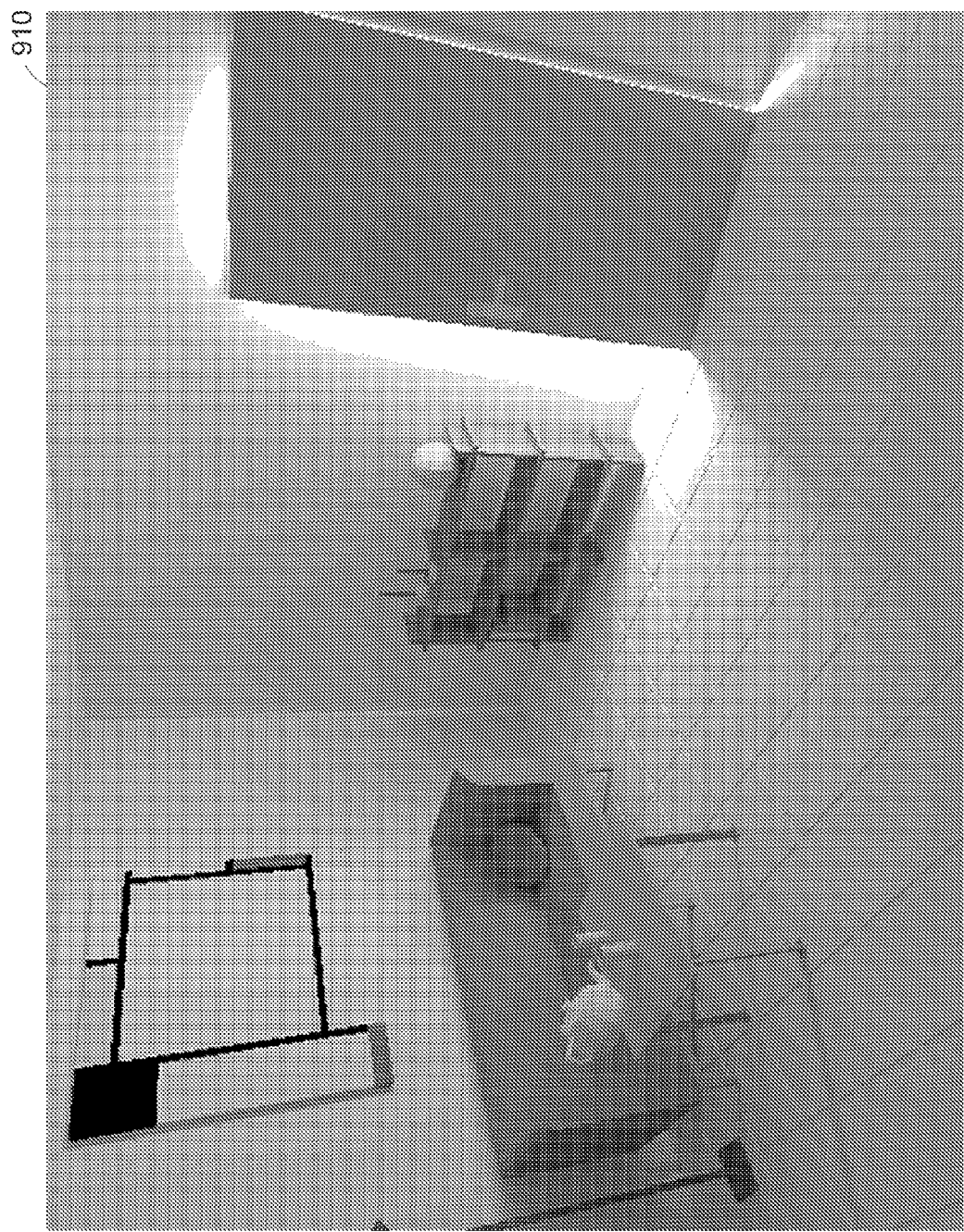
FIGS. 21A-D are, respectively, a test scene "Invisible Date," a graph showing average RMS error to a master solution, a graph showing global variance, and a graph showing pixel-based variance.
Figure 21B:
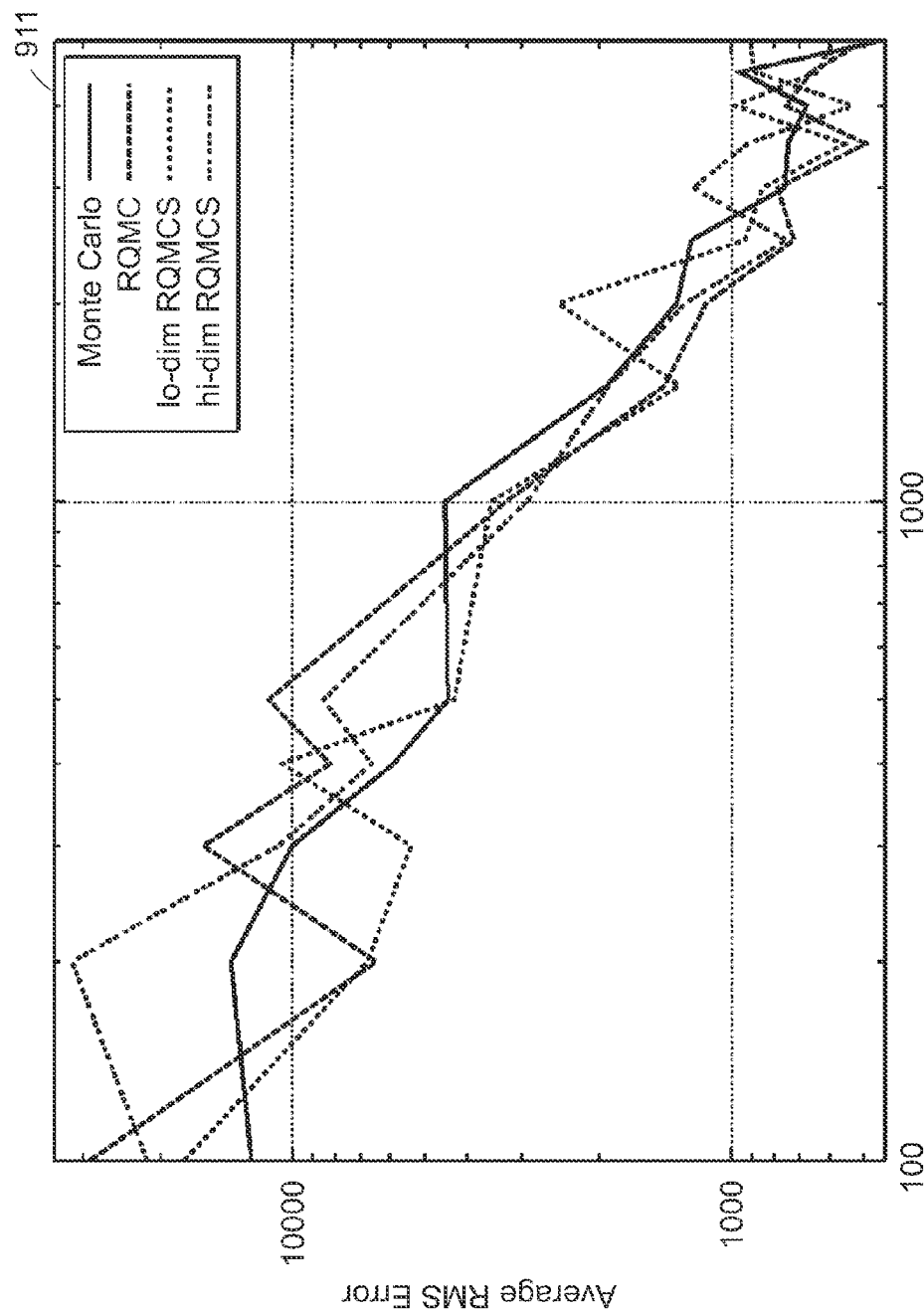
Figure 21C:
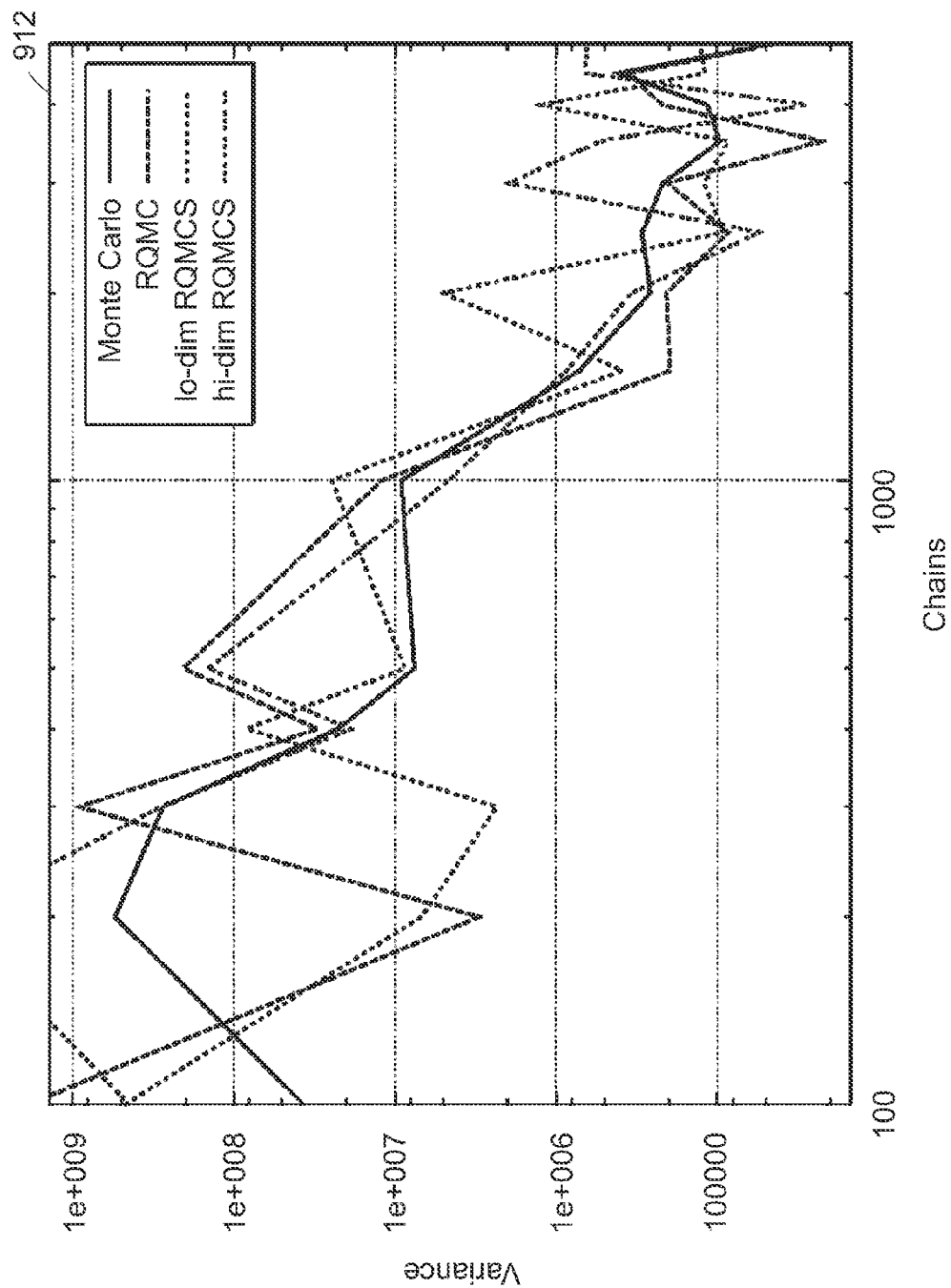
Figure 21D:
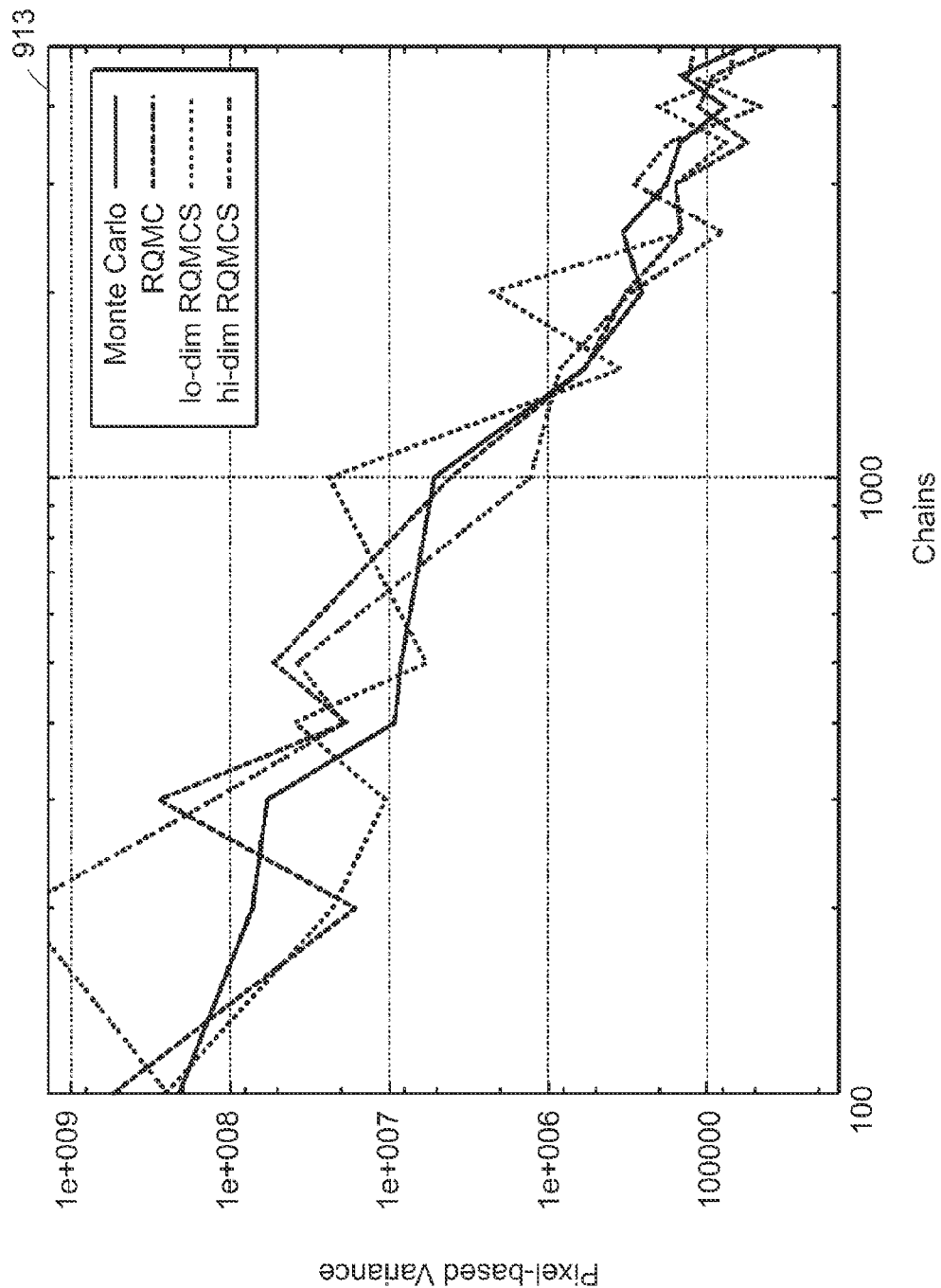

In a first experiment, the robust global illumination technique was used to compute the path integrals. FIG. 20A shows a test scene "Shirley 6," which is a relatively simple light transport setting, and FIG. 21A shows a test scene "Invisible Date," which is a more complicated light transport setting. FIGS. 20B and 21B are graphs 901 and 911 showing average RMS error to a master solution; FIGS. 20C and 21C are graphs 902 and 912 showing global variance (averaged over the whole image); and FIGS. 20D and 21D are graphs 903 and 913 showing pixel-based variance. The numbers were obtained by averaging 10 independent runs for a varying number of Markov chains. The measured numbers only convince for the simple test scene. In even the complicated cases, no performance gain over Monte Carlo sampling can be measured, because the number of independent runs is too small. More experiments were not possible due to excessive running times.

Figure 22A:
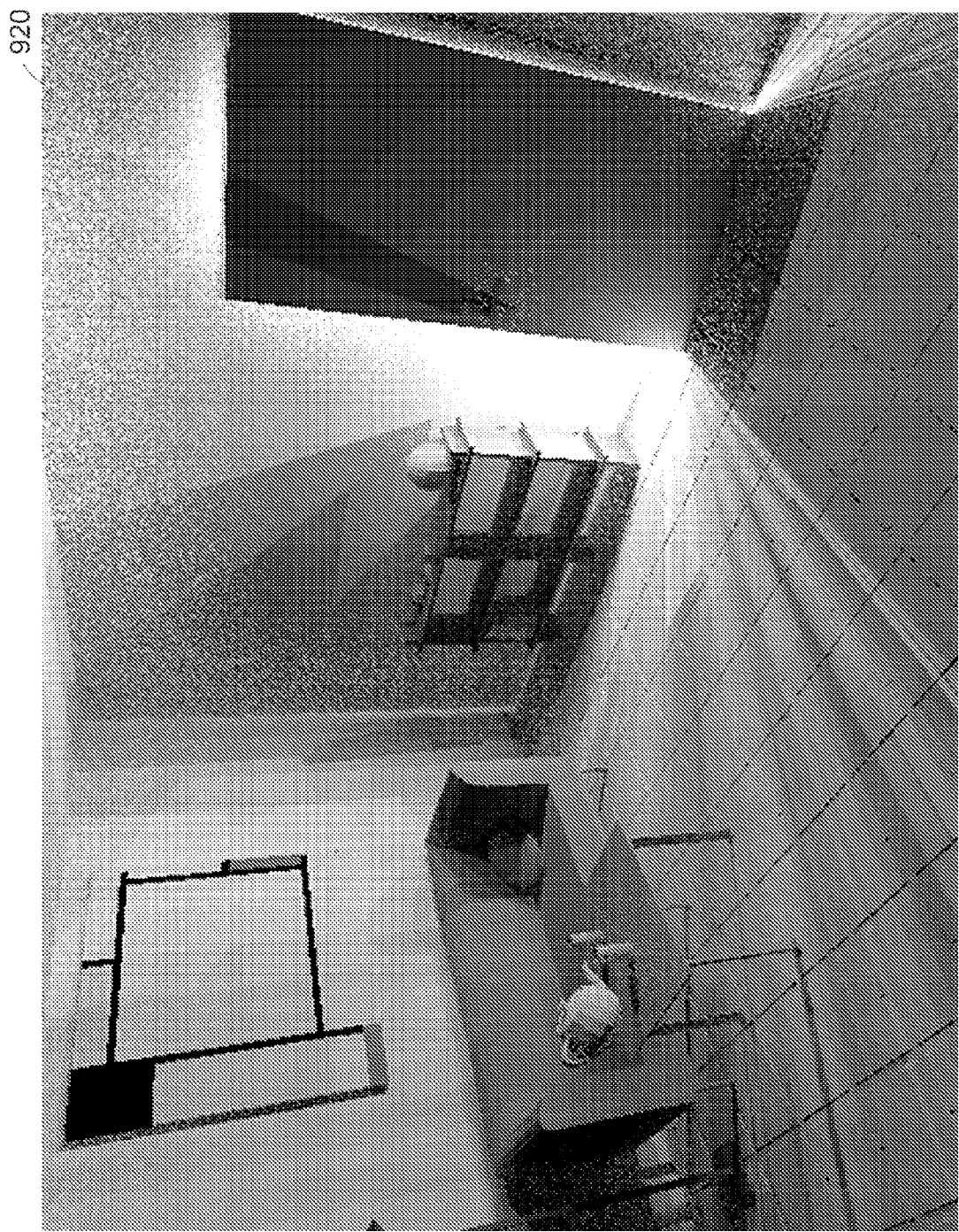
FIGS. 22A-C are a visual comparison of the test scene "Invisible Date" rendered, respectively, using Monte Carlo, randomized quasi-Monte Carlo, and randomized quasi-Monte Carlo with sorting.
Figure 22B:
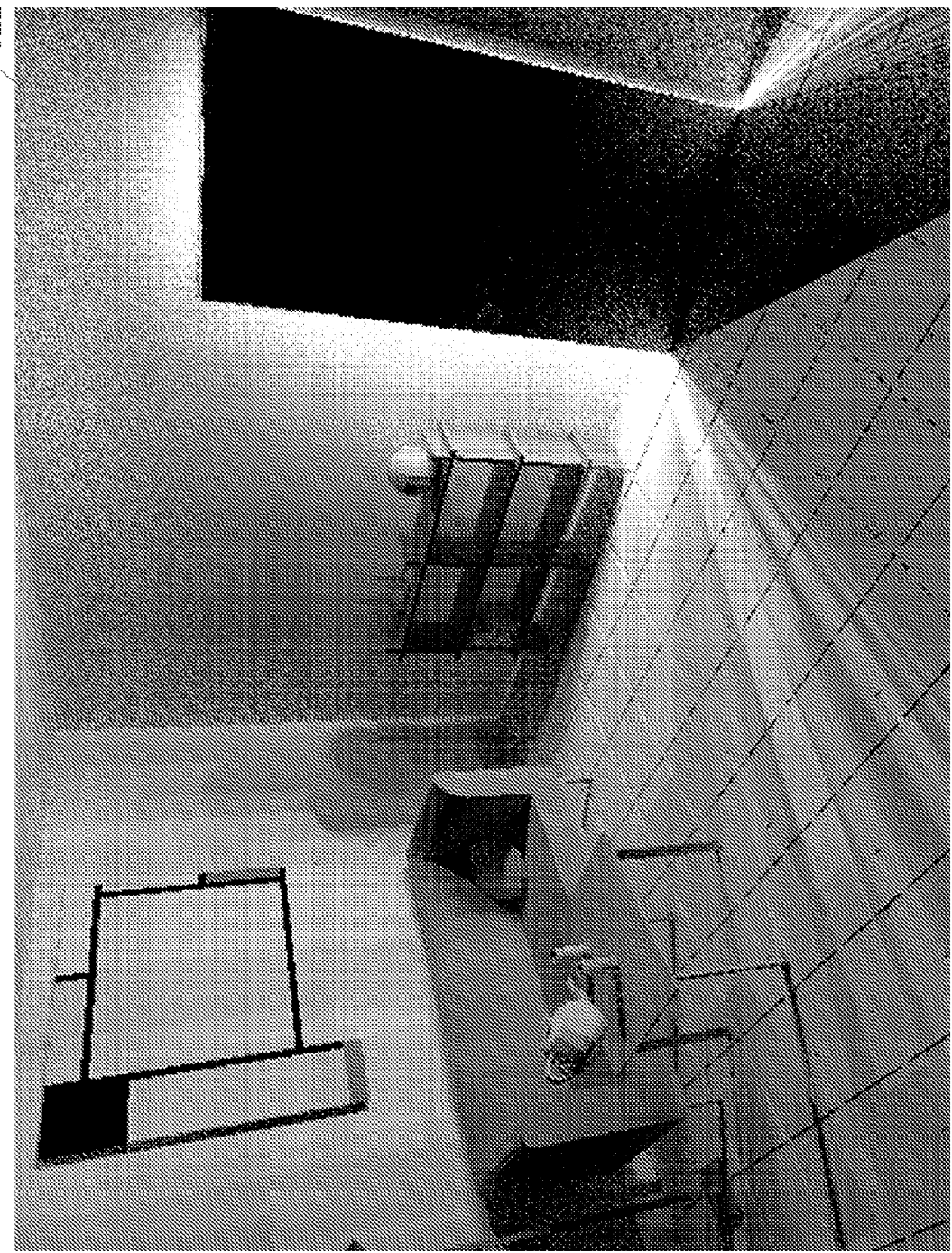
Figure 22C:

However, the visual error tells a dramatically different story as can be seen in FIGS. 22A-C, where a clear superiority of the new technique in even very difficult settings becomes obvious. FIGS. 22A-C show a visual comparison for the test scene "Invisible Date" using 300 chains for simulation. FIG. 22A shows the test scene rendered using Monte Carlo; FIG. 22B shows the test scene rendered using randomized quasi-Monte Carlo; and FIG. 22C shows the test scene rendered using randomized quasi-Monte Carlo with sorting.

In FIGS. 22A-C, the only light source is not visible as it is placed on the ceiling of the neighboring room. Due to the better distribution of the photons randomized quasi-Monte Carlo (RQMC) (FIG. 22B) outperforms Monte Carlo (MC) (FIG. 22A) visually, as can be seen by the reduced shadow artifacts. RQMC with sorting (RQMCS) (FIG. 22C) (using $256^3$ voxels for the bucket sort) is even superior as more photons made it into the second room and even the back of the door is lit very well.

This case is not an exception, but can be observed for many test cases. It only emphasizes that standard error measures are not appropriate error measures for visual quality, which is a known but unsolved problem in computer graphics.

FIGS. 23A-D shows measurements for a very difficult light transport problem, where photons were traced directly from the light sources and the final path segment was connected to the camera (one technique of bidirectional path tracing). FIG. 23A shows a schematic view of the labyrinth test scent 940, where floor and roof have been removed for illustration. The camera is situated in the room at the bottom, while a light source is located on the other end of the connecting tunnel. The graph 950 shown in FIG. 23B is a "Box-and-Whisker" plot, showing the average amount (marked by ×) of the total radiance received by the camera for 1048576 simulated light paths for 50 independent realizations using each technique. The graph 960 shown in FIG. 23C enlarges the interesting part of the graph shown in FIG. 23B. The table 970 shown in FIG. 23D finally displays the deviation from a master solution using the L1- and L2-norm (variance) for the total radiance received by the camera and received by each pixel (256×256 pixels resolution) averaged over the 50 independent realizations. In this difficult setting the new method (RQMCS) is clearly superior.

Opposite to the above measurements only one number of simultaneously simulated Markov chains is considered. Now a sufficient amount of experiments was computationally feasible and the superiority of the new technique became clearly visible.

6. Conclusion

It will be seen that the above described systems and techniques have a number of advantages over the prior art. These include the following: simplification of the technique, which is intuitively focused on sequence properties; improved convergence; linear complexity; and application to light transport simulation. The above described systems and techniques move one step closer to formulating the technique as an integral, at which point, it will be relatively straightforward to demonstrate consistency.

We successfully simplified the techniques to simultaneously simulate Markov chains and provided intuition when and why sorting the states can improve convergence. In addition the technique no longer is bounded by the curse of dimension and there is no restriction to homogeneous Markov chains, because the simulation just can use transition probabilities $P=P_n$ that can change over time. Thus, the techniques described herein can be used to simulate inhomogeneous Markov chains, i.e., where $P=P_n$ depends on the time step n.

Experiments have indicated that not all (t, s)-sequences or radical inversion based points sequences are equally good. This deserves further characterization.

The techniques described herein would be even simpler if rank-1 lattice sequences could be applied. The constructions thus far, however, lack the properties of (t, s)-sequences that are required for the improved performance. According to a further aspect of the invention, it may be possible to construct suitable rank-1 lattice sequences to achieve the desired results.

As we are using global directions, i.e. integrate over products of spheres, it is also interesting to establish connections to recent research in that direction.

7. General Techniques

FIGS. 24-30 are flowcharts of a number of techniques and sub-techniques according to the above-described aspects of the invention. It should be noted that some or all of the following techniques and sub-techniques, including individual boxes and groups of boxes thereof, may be combined as desired to practice the invention, as described herein.

Figure 24:
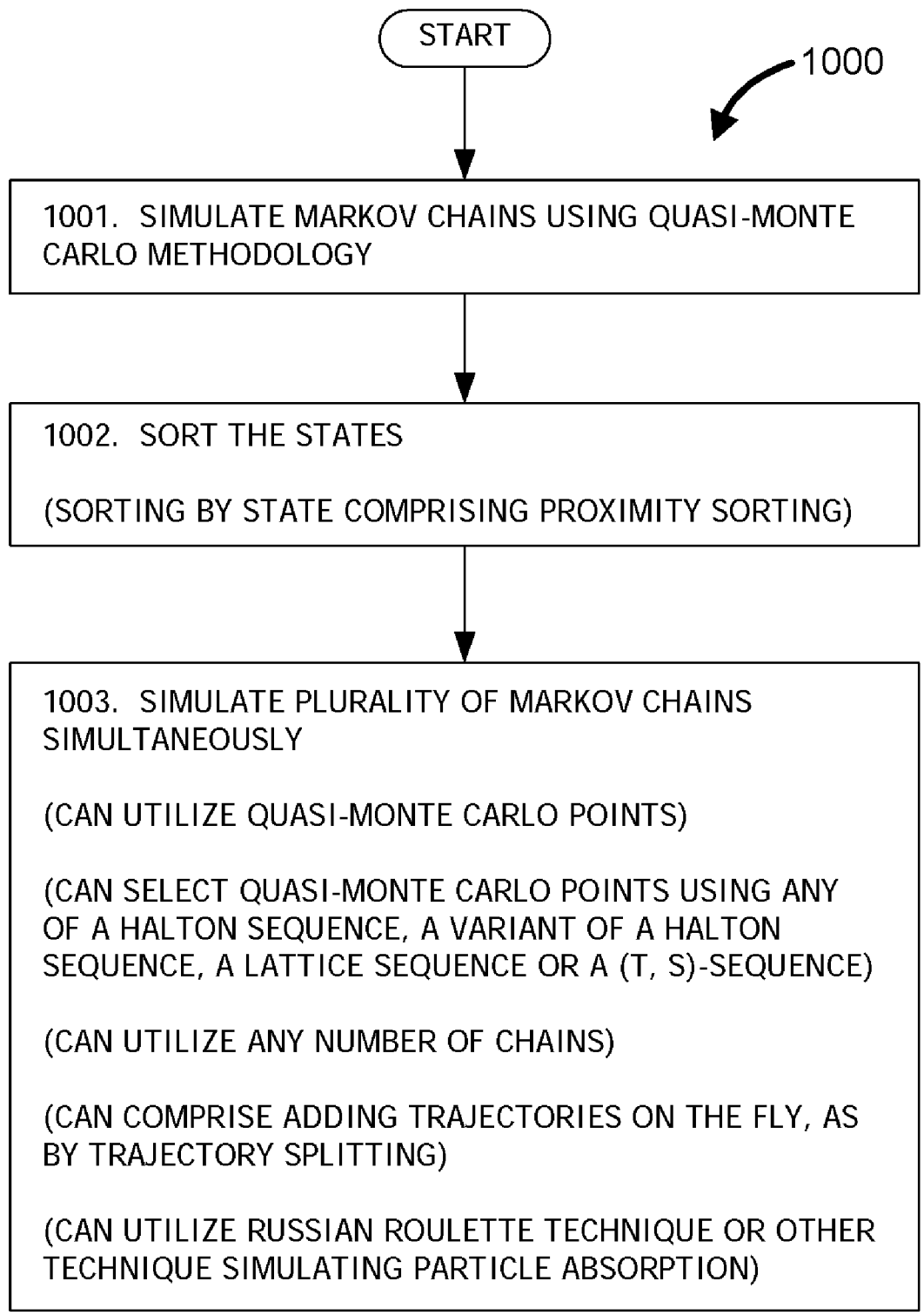
FIGS. 24-30 are flowcharts of a number of techniques and sub-techniques according to various described aspects of the invention.

FIG. 24 shows a flowchart of a first general technique 1000 according to the present invention. The technique 1000 includes the following:

Box 1001: Simulate Markov chains using Quasi-Monte Carlo methodology.

Box 1002: Sort the states.

(May include sorting by state comprising proximity sorting).

Box 1003: Simulate plurality of Markov chains simultaneously.

(Can utilize quasi-Monte Carlo points; can select quasi-Monte Carlo points using any of a Halton sequence, a variant of a Halton sequence, a lattice sequence or a (t, -s)-sequence; can utilize any number of chains; can comprise adding trajectories on the fly, as by trajectory splitting; can utilize Russian Roulette technique or other technique simulating particle absorption).

Figure 25:
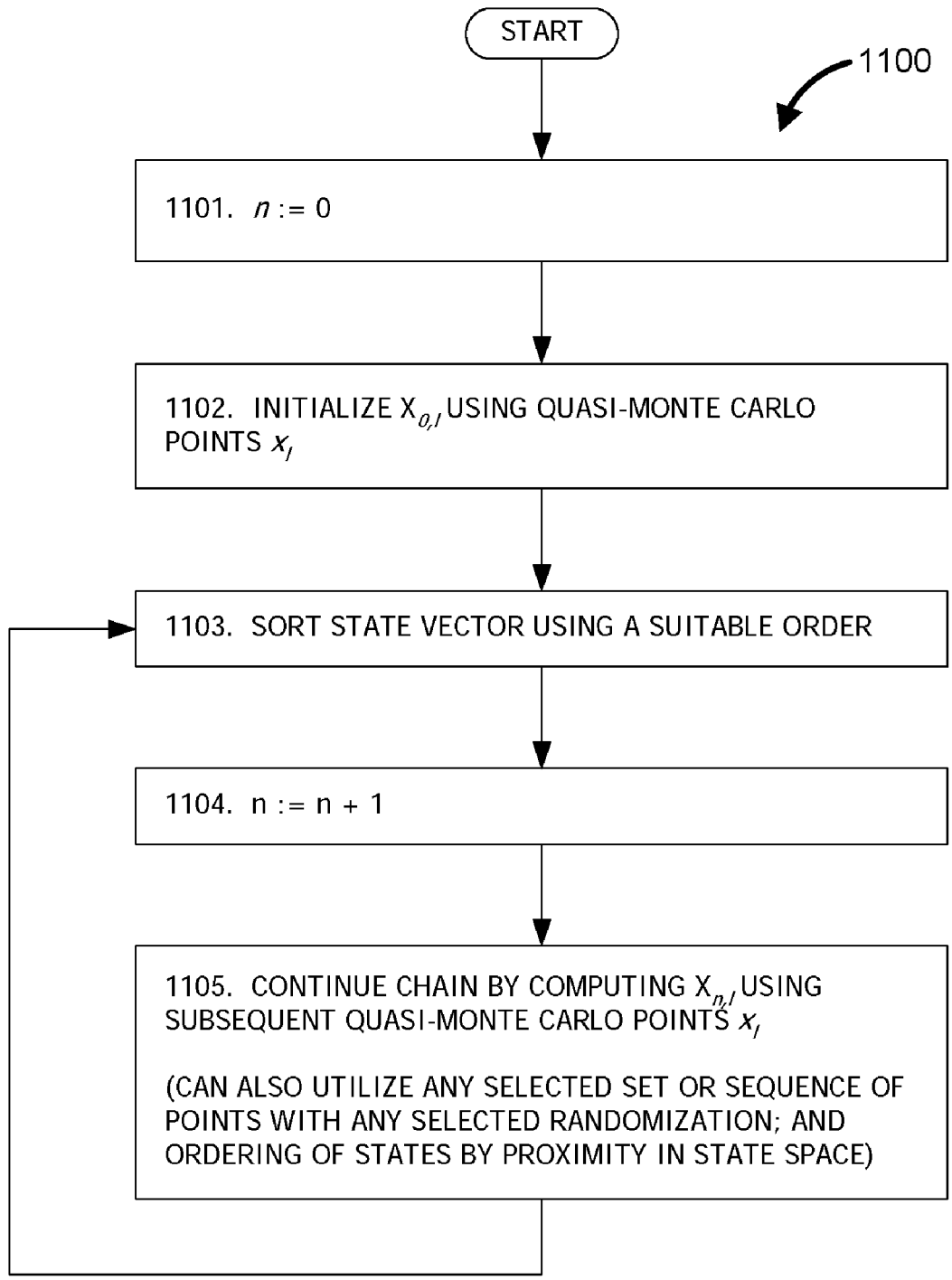

FIG. 25 shows a flowchart of a further technique 1100 according to the present invention for simulating a plurality of Markov chains simultaneously for an s-dimensional problem. The technique 1100 includes the following:

Box 1101: n:=0

(Set n equal to 0).

Box 1102: Initialize $X_{0,i}$ using quasi-Monte Carlo points $x_i$.

Box 1003: Sort state vector using a suitable order.

Box 1104: n:=n+1

(Increment n by 1).

Box 1105: Continue chain by computing $X_{n,i}$ using subsequent quasi-Monte Carlo points $x_i$.

(Can also utilize any selected set or sequence of points with any selected randomization; and ordering of states by proximity in state space).

Box 1103-1105 are performed in a loop.

Figure 26:
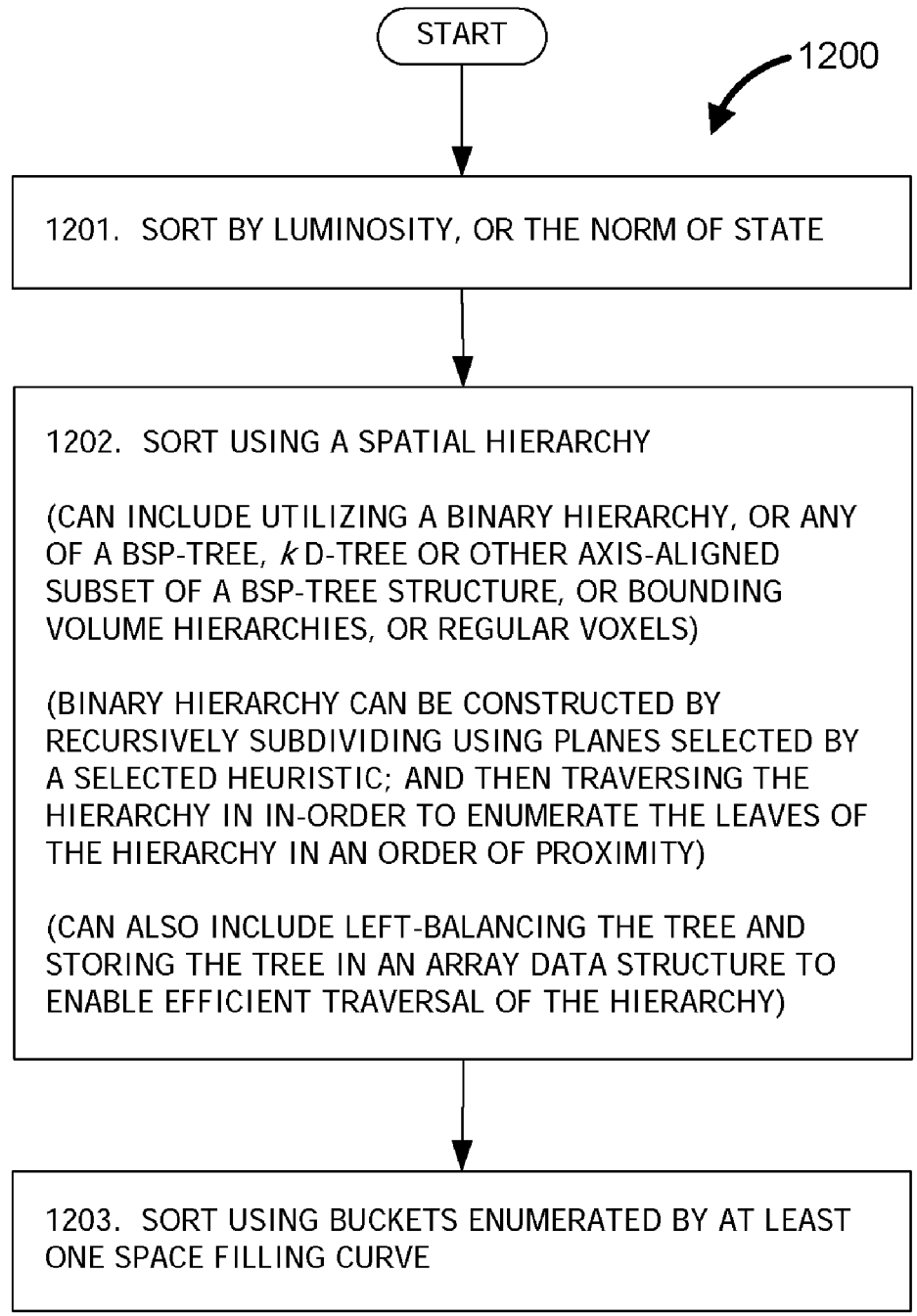

FIG. 26 is a flowchart of additional techniques 1200, one or more of which may be performed in conjunction with the technique 1100 illustrated in FIG. 25. These techniques 1200 include the following:

Box 1201: Sort by luminosity, or the norm of state.

Box 1202: Sort using a spatial hierarchy.

(Can include utilizing a binary hierarchy, or any of a BSP-tree, kD-tree, or other axis-aligned subset of a BSP-tree structure, or bounding volume hierarchies, or regular voxels; binary hierarchy can be constructed by recursively subdividing using planes selected by a selected heuristic; and then traversing the hierarchy in in-order to enumerate the leaves of the hierarchy in an order of proximity; can also include left-balancing the tree and storing the tree in an array data structure to enable efficient traversal of the hierarchy).

Box 1203: Sort using buckets enumerated by at least one space filling curve.

Figure 27:
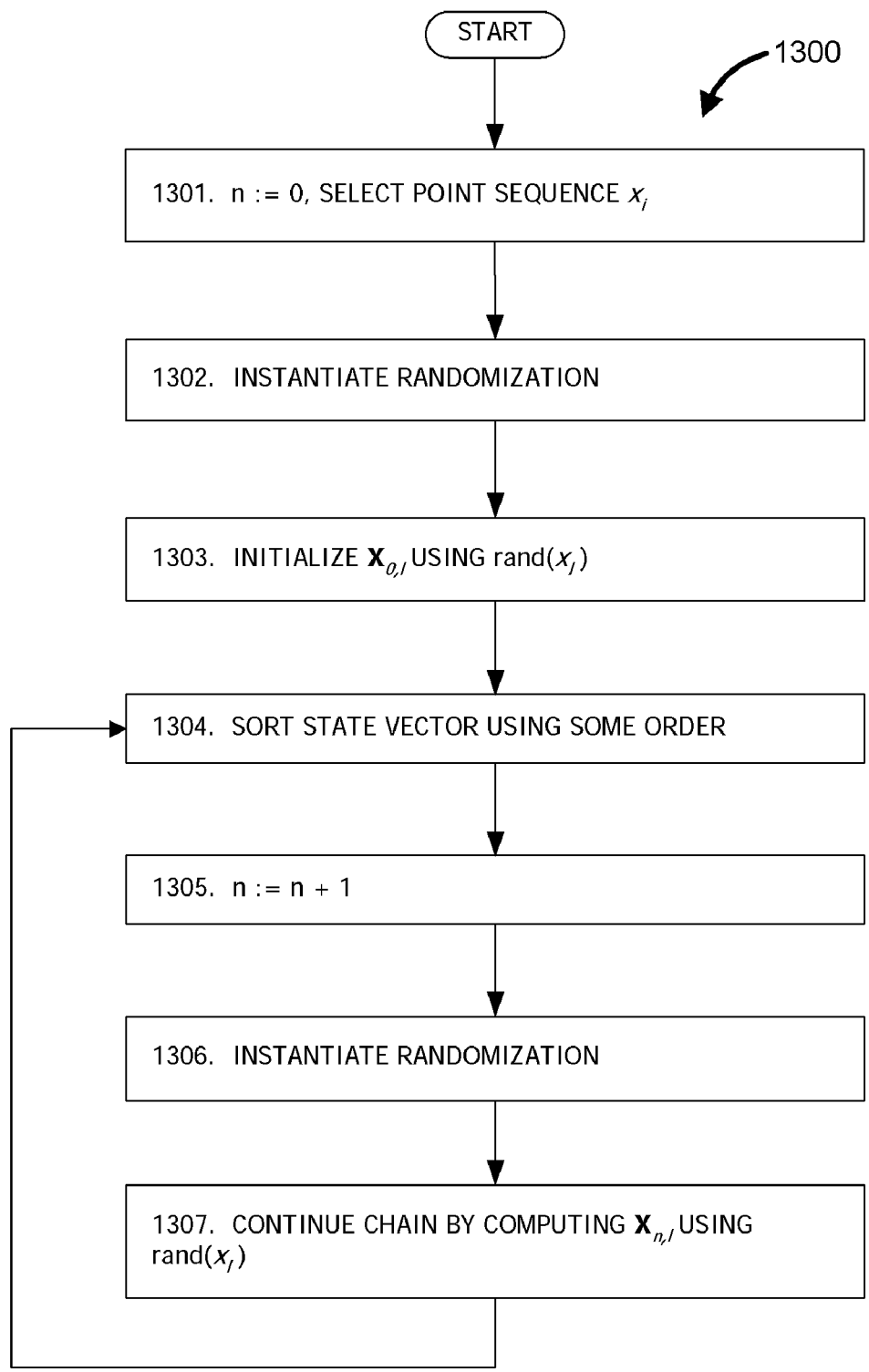

FIG. 27 is a flowchart of a further technique 1300 according to the invention. The technique 1300 includes the following:

Box 1301: n:=0, select point sequence $x_i$.

Box 1302: Instantiate randomization.

Box 1303: Initialize $X_{0,I}$ using rand($x_I$).

Box 1304: Sort state vector using some order.

Box 1305: n:=n+1

Box 1306: Instantiate randomization.

Box 1307: Continue chain by computing $X_{n,I}$ using rand ($x_I$).

Boxes 1304-1307 are performed in a loop.

Figure 28:
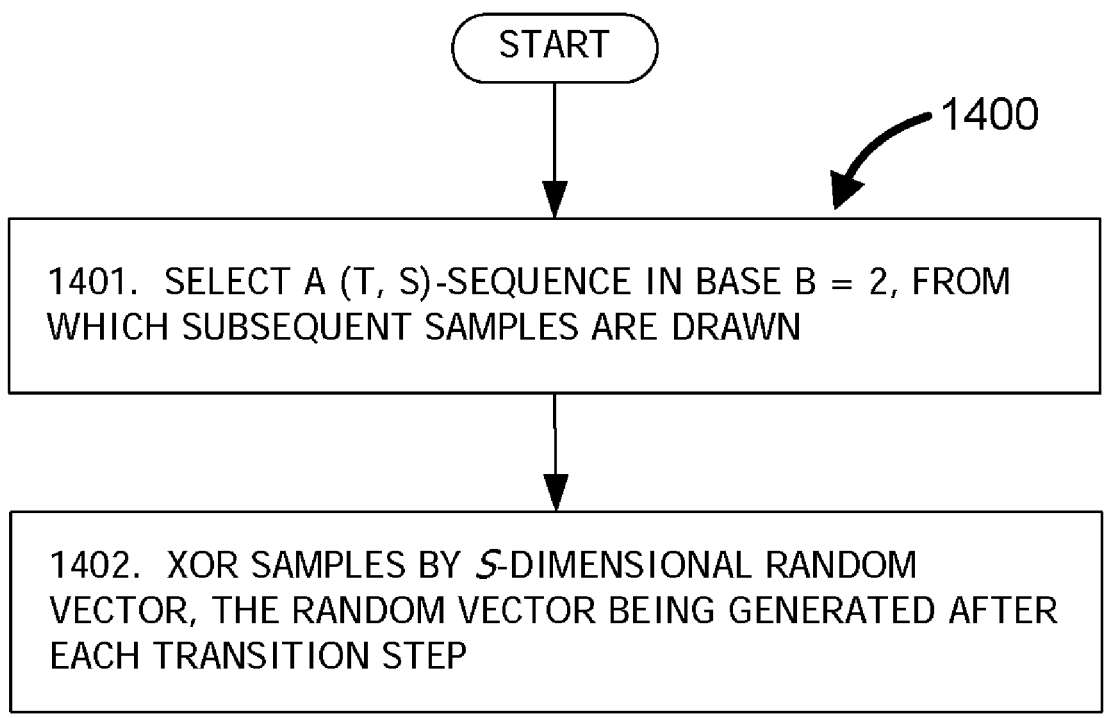

FIG. 28 is a flowchart of an additional technique 1400 that may be performed in conjunction with the FIG. 27 technique 1300. The additional technique 1400 randomizes Quasi-Monte Carlo points in each time step n, and includes the following:

Box 1401: Select a (t, s)-sequence in base b=2, from which subsequent samples are drawn.

Box 1402: XOR samples by s-dimensional random vector, the random vector being generated after each transition step.

Figure 29:
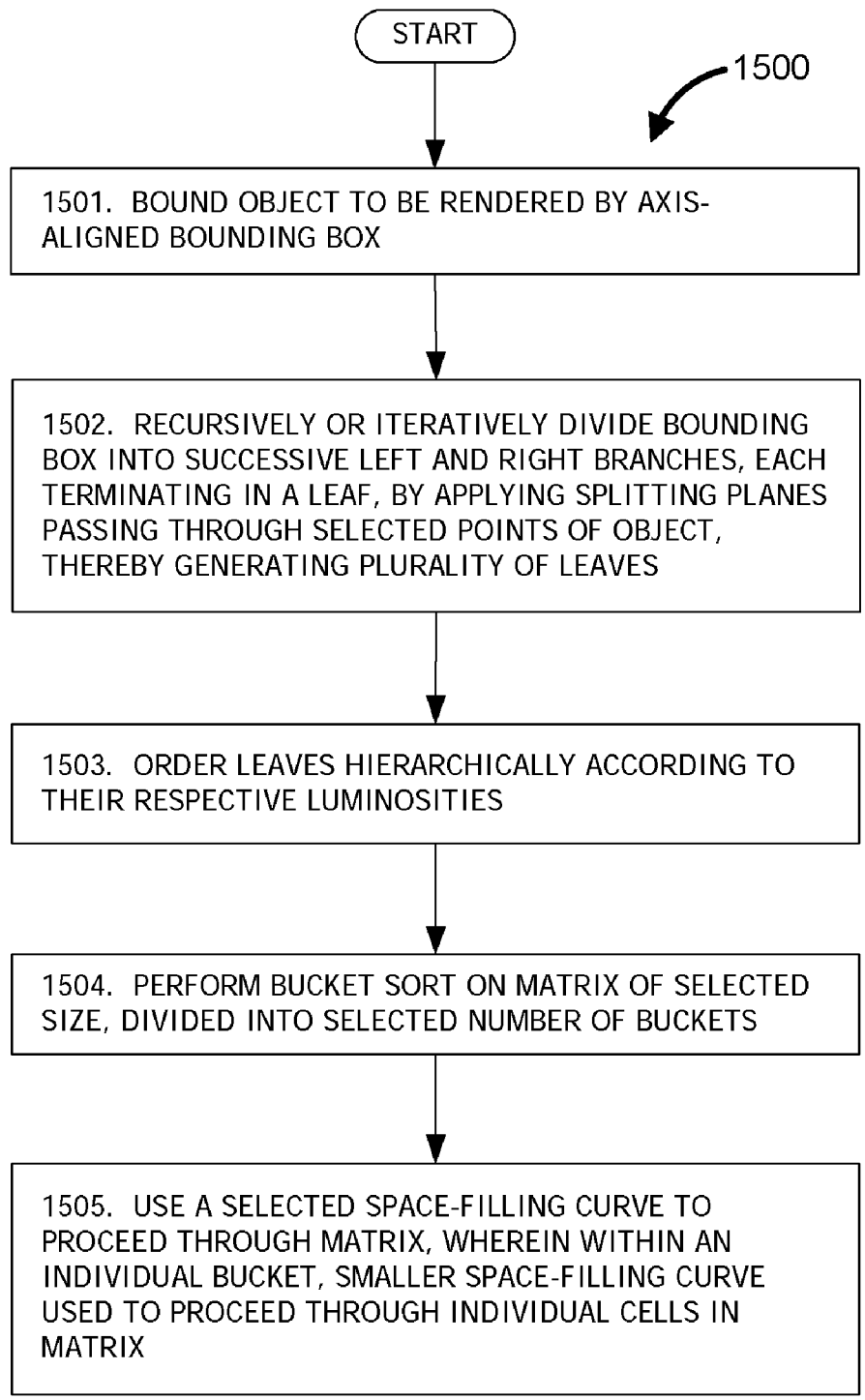

FIG. 29 is a flowchart of further technique 1500 according to the invention. The technique 1500 includes the following:

Box 1501: Bound object to be rendered by axis-aligned bounding box.

Box 1502: Recursively or iteratively divide bounding box into successive left and right branches, each terminating in a leaf, by applying splitting planes passing through selected points of object, thereby generating plurality of leaves.

Box 1503: Order leaves hierarchically according to their respective luminosities.

Box 1504: Perform bucket sort on matrix of selected size, divided into selected number of buckets.

Box 1505: Use a selected space-filling curve to proceed through matrix, wherein within an individual bucket, smaller space-filling curve used to proceed through individual cells in matrix.

Figure 30:
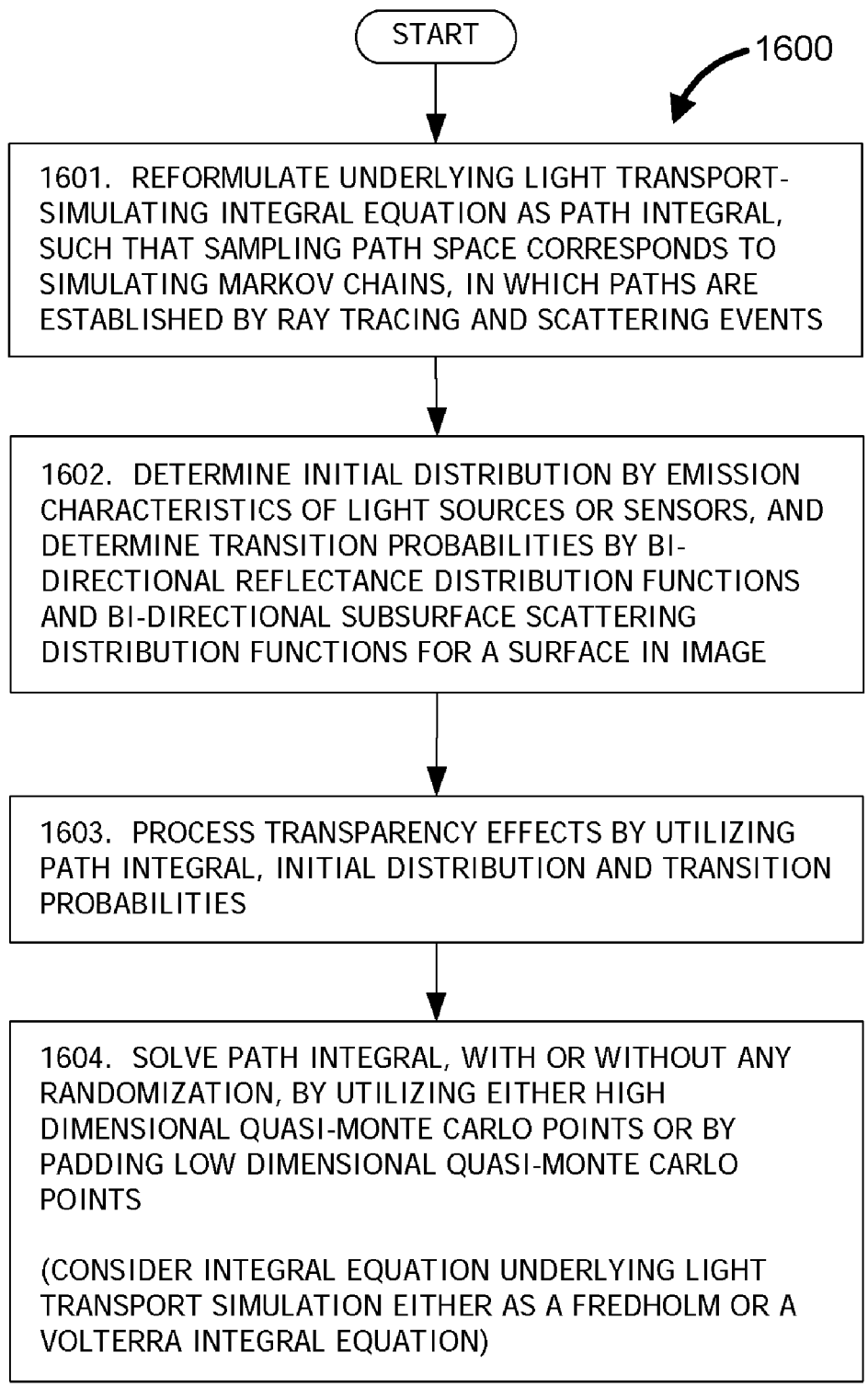

FIG. 30 is a flowchart of a further technique 1600 according to the invention. The technique 1600 configures a simulation to enable light-transport simulation for synthesizing realistic-appearing images, and includes the following:

Box 1601: Reformulate underlying light transport-simulating integral equation as path integral, such that sampling path space corresponds to simulating Markov chains, in which paths are established by ray tracing and scattering events.

Box 1602: Determine initial distribution by emission characteristics of light sources or sensors, and determine transition probabilities by bi-directional reflectance distribution functions and bi-directional subsurface scattering distribution functions for a surface in image.

Box 1603: Process transparency effects by utilizing path integral, initial distribution and transition probabilities.

Box 1604: Solve path integral, with or without any kind of randomization, by utilizing either high-dimensional Quasi-Monte Carlo points or by padding low-dimensional Quasi-Monte Carlo points.

(Consider integral equation underlying light transport simulation either as a Fredholm or a Volterra integral equation).

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

---

COMPUTER PROGRAM LISTING

CODE LISTING 2.2.1

```
void Triangle::Transform( )
{
Point *p = (Point *)this;
Vendor n3d;
Vector n_abs = n3d = (p[1]-p[0])|(p[2]-p[0]);
// search largest component for projection (0=x,1=y,2=z)
uintCast(n_abs.dx) &= 0x7FFFFFFF;
uintCast(n_abs.dy) &= 0x7FFFFFFF;
uintCast(n_abs.dz) &= 0x7FFFFFFF;
// Degenerated Triangles must be handled (set edge-signs)
if(!((n_abs.dx+n_abs.dy+n_abs.dz) > DEGEN_TRI_EPSILON))
//(!(...) > EPS) to handle NaN's
{
d = p[0].x;
p0.u = -p[0].y;
p0.v = -p[0].z;
```

-continued
COMPUTER PROGRAM LISTING

```
n.u=n.v = 0.0f;
e[0].u = e[1].u = e[0].v = e[1].v = 1.0f;
return;
}
U32 axis = 2;
if(n_abs.dx > n_abs.dy)
{
if(n_abs.dx > n_abs.dz)
axis = 0;
}
else if(n_abs.dy > n_abs.dz)
axis = 1;
Point p03d = p[0];
Point p13d = p[1];
Point p23d = p[2];
float t_inv = 2.0f/n3d[axis];
e[0].u = (p23d[PlusOneMod3[axis]]−p03d[PlusOneMod3[axis]])*t_inv;
e[0].v = (p23d[PlusOneMod3[axis+1]]−p03d[PlusOneMod3[axis+1]])*t_inv;
e[1].u = (p13d[PlusOneMod3[axis]]−p03d[PlusOneMod3[axis]])*t_inv;
e[1].v = (p13d[PlusOneMod3[axis+1]]−p03d[PlusOneMod3[axis+1]])*t_inv;
t_inv *= 0.5f;
n.u = n3d[PlusOneMod3[axis]] *t_inv;
n.v = n3d[PlusOneMod3[axis+1]]*t_inv;
p0.u = −p03d[PlusOneMod3[axis]];
p0.v = −p03d[PlusOneMod3[axis+1]];
d = p03d[axis] + n.u*p03d[PlusOneMod3[axis]] +
n.v*p03d[PlusOneMod3[axis+1]];
}
```
CODE LISTING 2.2.2

```
U32 *idx = pointer_to_face_indices;
U32 ofs = projector_case;
for(U32 ii = num_triData; ii; ii−−,idx++)
{
float t = (triData[*idx].d − ray.from[ofs]
− triData[*idx].n.u*ray.from[PlusOneMod3[ofs]]
− triData[*idx].n.v*ray.from[PlusOneMod3[ofs+1]])
/ (ray.d[ofs] + triData[*idx].n.u*ray.d[PlusOneMod3[ofs]]
+ triData[*idx].n.v*ray.d[PlusOneMod3[ofs+1]]);
if(uintCast(t)−1 > uintCast(result.tfar)) //−1 for +0.0f
continue;
float h1 = t*ray.d[PlusOneMod3[ofs]] + ray.from[PlusOneMod3[ofs]]
+ triData[*idx].p0.u;
float h2 = t*ray.d[PlusOneMod3[ofs+1]] + ray.from[PlusOneMod3[ofs+1]]
+ triData[*idx].p0.v;
float u = h1*triData[*idx].e[0].v − h2*triData[*idx].e[0].u;
float v = h2*triData[*idx].e[1].U − h1*triData[*idx].e[1].v;
float uv = u+v;
if((uintCast(u) | uintCast(v) | uintCast(uv)) > 0x40000000)
continue;
result.tfar = t;
result.tri_index = *idx
}
```
CODE LISTINGS 2.3.1

```
Point *p = (Point *)&triData[tri_index];
int boxMinIdx, boxMaxIdx;
// boxMinIdx and boxMaxIdx index the smallest and largest vertex of
the triangle
// in the component dir[0] of the split plane
if(p[0][dir[0]] < p[1][dir[0]])
{
if(p[2][dir[0]] < p[0][dir[0]])
{
boxMinIdx = 2;
boxMaxIdx = 1;
}
else
{
boxMinIdx = 0;
boxMaxIdx = p[2][dir[0]] < p[1][dir[0]] ? 1 : 2;
}
}
else
{
if(p[2][dir[0]] < p[1][dir[0]])
{
```

-continued

COMPUTER PROGRAM LISTING

```
boxMinIdx = 2;
boxMaxIdx = 0;
}
else
{
boxMinIdx = 1;
boxMaxIdx = p[2][dir[0]] < p[0][dir[0]] ? 0 : 2;
}
}
/* If the triangle is in the split plane or completely on one side of
the split plane
is decided without any numerical errors, i.e. at the precision the
triangle is
entered to the rendering system. Using epsilons here is wrong and not
necessary.
*/
if((p[boxMinIdx][dir[0]] == split) && (p[boxMaxIdx][dir[0]] == split))
// in split plane ?
{
on_splitItems++;
if(split < middle_split) // put to smaller volume
left_num_divItems++;
else
{
unsorted_border--;
U32 t = itemsList[unsorted_border];
right_num_divItems--;
itemsList[right_num_divItems] = itemsList[left_num_divItems];
itemsList[left_num_divItems] = t;
}
}
else if(p[boxMaxIdx][dir[0]] <= split) // triangle completely left ?
left_num_divItems++;
else if(p[boxMinIdx][dir[0]] >= split) // triangle completely right ?
{
unsorted_border--;
U32 t = itemsList[unsorted_border];
right_num_divItems--;
itemsList[right_num_divItems] = itemsList[left_num_divItems];
itemsList[left_num_divItems] = t;
}
else
// and now detailed decision, triangle must intersect split plane ...
{
/* In the sequel we determine whether a triangle should go left and/or
right, where we already know that it must intersect the split plane in
a line segment.
All computations are ordered so that the more precise computations are
done first. Scalar products and cross products are evaluated last.
In some situations it may be necessary to expand the bounding box by
an epsilon. This, however, will blow up the required memory by large
amounts.
If such a situation is encountered, it may be better to analyze it
numerically in order not to use any epsilons...
Arriving here we know that p[boxMaxIdx][dir[0]] < split <
p[boxMaxIdx[dir[0]]
and that p[boxMidIdx][dir[0]] \in p[boxMaxIdx][dir[0]],
p[boxMaxIdx][dir[0]]].
We also know, that the triangle has a non-empty intersection with the
current
voxel. The triangle also cannot lie in the split plane, and its
vertices cannot
lie on one side only.
*/
int boxMidIdx = 3 − boxMaxIdx − boxMinIdx; // missing index, found by
3 = 0 + 1 + 2
/* We now determine the vertex that is alone on one side of the split
plane.
Depending on whether the lonely vertex is on the left or right side,
we have to later swap the decision, whether the
triangle should be going to the left or right.
*/
int Alone = (split < p[boxMidIdx][dir[0]]) ? boxMinIdx; : boxMaxIdx;
int NotAlone = 3 − Alone − boxMidInx;
// == (split < p[boxMidIdx][dir[0]]) ? boxMaxIdx : boxMinIdx;
// since sum of idx = 3 = 0 + 1 + 2
float dist = split − p[Alone][dir[0]];
```

-continued

COMPUTER PROGRAM LISTING

```
U32 swapLR = uintCast(dist)>>31; // == p[Alone][dir[0]] > split;
/* Now the line segments connecting the lonely vertex with the
remaining two verteces
are intersected with the split plane. a1 and a2 are the intersection
points.
The special case "if(p[boxMidIdx][dir[0]] == split)" [yields a x / x,
which could
be optimized] does not help at all since it only can happen as often
as the highest
valence of a vertex of the mesh is...
*/
float at = dist / (p[boxMidIdx][dir[0]] – p[Alone][dir[0]]);
float at2 = dist / (p[NotAlone][dir[0]] – p[Alone][dir[0]]);
float a1x = (p[boxMidIdx][dir[1]] – p[Alone][dir[1]]) * at;
float a1y = (p[boxMidIdx][dir[2]] – p[Alone][dir[2]]) * at;
float a2x = (p[NotAlone][dir[1]] – p[Alone][dir[1]]) * at2;
float a2y = (p[NotAlone][dir[2]] – p[Alone][dir[2]]) * at2;
// n is a vector normal to the line of intersection a1a2 of the
triangle
// and the split plane
float nx = a2y – a1y;
float ny = a2x – a1x;
// The signs indicate the quadrant of the vector normal to the
intersection line
U32 nxs = uintCast(nx)>>31; // == (nx < 0.0f)
U32 nys = uintCast(ny)>>31; // == (ny < 0.0f)
/* Numerical precision: Due to cancellation, floats of approximately
same exponent
should be subtracted first, before adding something of a different
order of
magnitude. All brackets in the sequel are ESSENTIAL for numerical
precision.
Change them and you will see more errors in the BSP...
pMin is the lonely point in the coordinate system with the origin at
bBox.bMinMax[0]
pMax is the lonely point in the coordinate system with the origin at
bBox.bMinMax[1]
*/
float pMinx = p[Alone][dir[1]] – bBox.bMinMax[0][dir[1]];
float pMiny = p[Alone][dir[2]] – bBox.bMinMax[0][dir[2]];
float pMaxx = p[Alone][dir[1]] – bBox.bMinMax[1][dir[1]];
float pMaxy = p[Alone][dir[2]] – bBox.bMinMax[1][dir[2]];
// Determine coordinates of the bounding box, however, with respect to
p + a1 being the origin.
float boxx[2];
float boxy[2];
boxx[0] = (pMinx + a1x) * nx;
boxy[0] = (pMiny + a1y) * ny;
boxx[1] = (pMaxx + a1x) * nx;
boxy[1] = (pMaxy + a1y) * ny;
/* Test, whether line of intersection of the triangle and the split
plane passes by the
bounding box. This is done by indexing the coordinates of the bounding
box by the
quadrant of the vector normal to the line of intersection. In fact
this is
the nifty implementation of the 3d test introduced by in the book with
Haines:
"Real-Time Rendering"
By the indexing the vertices are selected, which are farthest from the
line.
Note that the triangle CANNOT completely pass the current voxel, since
it must have
a nonempty intersection with it.
*/
U32 resultS;
if(pMinx + MAX(a1x,a2x) < 0.0f // line segment of intersection a1a2
left of box
resultS = uintCast(pMinx)>>31;
else if(pMiny + MIN(a1y,a2y) < 0.0f // line segment of intersection
a1a2 below box
resultS = uintCast(pMiny)>>31;
else if(pMaxx + MIN(a1x,a2x) > 0.0f // line segment of intersection
a1a2 right of box
resultS = (pMaxx > 0.0f);
else if(pMaxy + MAX(a1y,a2y) > 0.0f // line segment of intersection
a1a2 above box
```

COMPUTER PROGRAM LISTING

```
resultS = (pMaxy > 0.0f);
else if(boxx[1^nxs] > boxy[nys])
// line passes beyond bbox ? => triangle can only be on one side
resultS = (a1y*a2x > a1x*a2y);
// sign of cross product a1 x a2 is checked to determine side
else if (boxx[nxs] < boxy[1^nys])
resultS = (a1y*a2x < a1x*a2y);
else
// Ok, now the triangle must be both left and right
{
stackList[currStackitems++] = itemsList[left_num_divItems];
unsorted_border--;
itemsList[left_num_divItems] = itemsList[unsorted_border];
continue;
}
if(swapLR != /*^*/ resultS)
{
unsorted_border--;
U32 t = itemsList[unsorted_border];
right_num_divItems--;
itemsList[right_num_divItems] = itemsList[left_num_divItems];
itemsList[left_num_divItems] = t;
}
else
left_num_divItems++;
}
CODE LISTINGS 2.4.1

Intersection Boundary::Intersect(Ray &ray) //ray.tfar is changed!
{
// Optimized inverse calculation (saves 2 of 3 divisions)
float inv_tmp = (ray.d.dx*ray.d.dy)*ray.d.dz;
if((uintCast(inv_tmp)&0x7FFFFFFF) > uintCast(DIV_EPSILON))
{
inv_tmp = 1.0f / inv_tmp;
ray.inv_d.dx = (ray.d.dy*ray.d.dz)*inv_tmp;
ray.inv_d.dy = (ray.d.dx*ray.d.dz)*inv_tmp;
ray.inv_d.dz = (ray.d.dx*ray.d.dy)*inv_tmp;
}
else
{
ray.inv_d.dx = ((uintCast(ray.d.dx)&0x7FFFFFFF) >
uintCast(DIV_EPSILON)) ?
(1.0f / ray.d.dx : INVDIR_LUT[uintCast(ray.d.dx) >> 31];
ray.inv_d.dy = ((uintCast(ray.d.dy)&0x7FFFFFFF) >
uintCast(DIV_EPSILON)) ?
(1.0f / ray.d.dy : INVDIR_LUT[uintCast(ray.d.dy) >> 31];
ray.inv_d.dz = ((uintCast(ray.d.dz)&0x7FFFFFFF) >
uintCast(DIV_EPSILON)) ?
(1.0f / ray.d.dz : INVDIR_LUT[uintCast(ray.d.dz) >> 31];
}
Intersection result;
result.tfar = ray.tfar;
result.tri_index = -1;
//
//BBox-Check
//
float tnear = 0.0f;
worldBBox.Clip(ray,tnear);
if(uintCast(ray.tfar) == 0x7F7843B0) //ray.tfar==3.3e38f //!!
return(result);
//
U32 current_bspStack = 1; //wegen empty stack case == 0
U32 node = 0;
//
//BSP-Traversal
//
const U32 whatnode[3] = {(uintCast(ray.inv_d.dx)>>27 &
sizeof(BSPNODELEAF),
(uintCast(ray.inv_d.dy)>>27) & sizeof(BSPNODELEAF),
(uintCast(ray.inv_d.dz)>>27) & sizeof(BSPNODELEAF)};
U32 bspStackNode[128];
float bspStackFar[128];
float bspStackNear[128];
bspStackNear[0] = -3.4e38f; // sentinel
do
{
```

-continued

COMPUTER PROGRAM LISTING

```
//Ist Node ein Leaf (type<0) oder nur ne Verzweigung (type>=0)
while (((BSPNODELEAF&)bspNodes[node]).type >= 0)
{
//Split-Dimension (x\y\z)
U32 proj = ((BSPNODELEAF&)bspNodes[node]).type & 3;
float dist1 =
(((BSPNODELEAF&)bspNodes[node]).splitlr[whatnode[proj]>>4]
 - ray.from[proj])*ray.inv_d[proj];
float distr =
(((BSPNODELEAF&)bspNodes[node]).splitlr[(whatnode[proj]>>4)^1]
 - ray.from[proj])*ray.inv_d[proj];
node = (((BSPNODELEAF&)bspNodes[node]).type - proj) | whatnode[proj];
//type & 0xFFFFFFF0
if(tnear <= dist1)
{
if(ray.tfar >= distr)
{
bspStackNear[current_bspStack] = MAX(tnear,distr);
bspStackNode[current_bspStack] = node^sizeof(BSPNODELEAF);
bspStackFar[current_bspStack] = ray.tfar;
current_bspStack++;
}
ray.tfar = MIN(ray.tfar,dist1);
}
else
if(ray.tfar >= distr)
{
tnear = MAX(tnear,distr);
node ^= sizeof(BSPNODELEAF);
}
else
goto stackPop;
}
//
//Faces-Intersect
... code omitted ...
//
//
//Hit gefunden?
//
do //!! NEEDS bspStackNear[0] = -3.4e38f; !!!!!
{
stackPop:
current_bspStack--;
tnear = bspStackNear[current_bspStack];
}while(result.tfar < tnear);
if(current_bspStack == 0)
return(result);
node(bspStackNode = current_bspStack];
ray.tfar = bspStackFar[current_bspStack];
} while (true);
}
```

We claim:

1. A method, executable in a computer graphics system for generating a pixel value for a pixel in an image, the pixel value being representative of points in a scene as recorded on an image plane of a simulated camera, the computer graphics system being configured to generate the pixel value for an image using a selected ray-tracing methodology comprising the simulating of at least one ray shot from the pixel into a scene along a selected direction, the ray-tracing methodology further comprising the calculating of the intersections of rays and surfaces of objects in the scene and the simulating of trajectories of rays illuminating objects in the scene, the simulating of trajectories using Markov chains, the method comprising:

simulating the Markov chains using a quasi-Monte Carlo methodology;

wherein the simulating of Markov chains comprises sorting states;

wherein the sorting comprises: proximity sorting;

sorting by luminosity, or the norm of state;

sorting using a spatial hierarchy; and sorting using buckets enumerated by at least one space filling curve.

2. The method of claim 1, wherein:

sorting using a spatial hierarchy comprises utilizing a binary hierarchy.

3. The method of claim 2, wherein:

the spatial hierarchy comprises any of a BSP-tree, kD-tree or other axis-aligned subset of a BSP-tree structure, or bounding volume hierarchies, or regular voxels.

4. The method of claim 1, wherein:

a binary hierarchy is constructed by recursively subdividing using planes selected by a selected heuristic; and then traversing the hierarchy in in-order to enumerate the leaves of the hierarchy in an order of proximity.

5. The method of claim 4, further comprising left-balancing the tree and storing the tree in an array data structure to enable efficient traversal of the hierarchy.

6. The method of claim 5, wherein:
the spatial hierarchy comprises leaves; and
sorting using a spatial hierarchy further comprises utilizing bucket sorting and a selected space-filling curve.

7. The method of claim 5, wherein sorting using a spatial hierarchy further comprises using regular voxels.

8. The method of claim 6, further comprising:
bounding an object to be rendered by an axis-aligned bounding box;
recursively or iteratively dividing the bounding box into successive left and right branches, each terminating in a leaf, by applying splitting planes passing through selected points of the object, thereby generating a plurality of leaves;
ordering the leaves hierarchically according to their respective luminosities;
performing a bucket sort on a matrix of selected size, divided into a selected number of buckets; and
using a selected space-filling curve to proceed through the matrix, wherein within an individual bucket, a smaller space-filling curve is used to proceed through individual cells in the matrix.

9. The method of claim 1, wherein the simulation is operable for configuration to solve integral equations.

10. The method of claim 1, wherein:
an underlying light transport simulating integral equation is reformulated as a path integral, such that sampling path space corresponds to simulating Markov chains, in which paths are established by ray tracing and scattering events;
wherein an initial distribution is determined by emission characteristics of light sources or sensors, and transition probabilities are determined by bi-directional reflectance distribution functions and bi-directional subsurface scattering distribution functions for a surface in the image.

11. The method of claim 10, further comprising:
processing transparency effects by utilizing the path integral, initial distribution and transition probabilities.

12. The method of claim 10, wherein:
the path integral is solved by utilizing either high dimensional quasi-Monte Carlo points or by padding low dimensional quasi-Monte Carlo points.

13. The method of claim 12, wherein:
the integral equation underlying light transport simulation is considered either as a Fredholm or a Volterra integral equation.

14. The method of claim 1, further comprising:
simulating inhomogeneous Markov chains.

15. The method of claim 1, further comprising simulating a plurality of Markov chains simultaneously.

16. The method of claim 15, wherein the simulating of a plurality of Markov chains simultaneously comprises utilizing quasi-Monte Carlo points.

17. The method of claim 16, wherein the quasi-Monte Carlo points are selected using any of a Halton sequence, a variant of a Halton sequence, a lattice sequence or a (t, s)-sequence.

18. The method of claim 15, wherein the simulating of a plurality of Markov chains simultaneously further comprises adding additional trajectories on the fly.

19. The method of claim 15, wherein the simulating of a plurality of Markov chains simultaneously further comprises trajectory splitting.

20. The method of claim 15, wherein the simulating of a plurality of Markov chains simultaneously comprises utilizing a technique simulating particle absorption.

21. The method of claim 20, wherein the simulating of a plurality of Markov chains simultaneously further comprises utilizing a Russian Roulette technique.

22. The method of claim 15, wherein the simulating of a plurality of Markov chains simultaneously for an s-dimensional problem comprises:
(a) providing an initial state for a Markov chain, using quasi-Monte Carlo points,
(b) sorting a state vector using a selected order,
(c) continuing the Markov chain using subsequent quasi-Monte Carlo points, and
(d) repeating (b) and (c) until complete.

23. The method of claim 22, further comprising:
ordering states by proximity in state space.

24. The method of claim 23, further comprising randomization.

25. The method of claim 23, further comprising randomization, the randomization comprising:
(a) selecting a point sequence,
(b) providing an initial state for a Markov chain, using a randomization function applied to a point sequence,
(c) sorting a state vector using a selected order,
(d) reapplying the randomization function to re-randomize the point sequence,
(e) continuing the Markov chain using the re-randomized point sequence, and
(f) repeating (c) through (e) until complete.

26. The method of claim 23, further comprising:
randomizing the quasi-Monte Carlo points in each time step n, the randomizing comprising:
selecting a (t, s)-sequence in base b=2, from which subsequent samples are drawn, and
XOR-ing the samples by an s-dimensional random vector, the random vector being generated after each transition step.

27. The method of claim 26, further comprising adding a selected number of additional trajectories on the fly.

28. The method of claim 27, further comprising trajectory splitting.

29. The method of claim 28, further comprising utilizing a technique simulating particle absorption.

30. The method of claim 29, further comprising utilizing a Russian Roulette technique.

31. In a computer graphics system for generating a pixel value for a pixel in an image, the pixel value being representative of points in a scene as recorded on an image plane of a simulated camera, the computer graphics system being configured to generate the pixel value for an image using a selected ray-tracing methodology comprising the simulating of at least one ray shot from the pixel into a scene along a selected direction, the ray-tracing methodology further comprising the calculating of the intersections of rays and surfaces of objects in the scene and the simulating of trajectories of rays illuminating objects in the scene, the simulating of trajectories using Markov chains, a subsystem comprising:
means for simulating the Markov chains using a quasi-Monte Carlo methodology,
wherein the means for simulating of Markov chains composes means for sorting states, wherein the means for sorting comprises means for proximity sorting and sorting by luminosity, or the norm of state, sorting using a spatial hierarchy, and sorting using buckets enumerated by at least one space filling curve, and wherein the simulating of Markov chains is utilized in light transport simulation for synthesizing realistic-appearing images.

32. In a computer graphics system for generating a pixel value for a pixel in an image, the pixel value being representative of points in a scene as recorded on an image plane of a simulated camera, the computer graphics system being configured to generate the pixel value for an image using a selected ray-tracing methodology comprising the simulating of at least one ray shot from the pixel into a scene along a selected direction, the ray-tracing methodology further comprising the calculating of the intersections of rays and surfaces of objects in the scene and the simulating of trajectories of rays illuminating objects in the scene, the simulating of trajectories using Markov chains, a computer program product comprising computer-executable program code stored on a non-transitory computer-readable medium, the computer-executable program code comprising:

computer code means for simulating the Markov chains using a quasi-Monte Carlo methodology, wherein the computer code means for simulating of Markov chains comprises computer code means for sorting states, wherein the computer code means for sorting comprises computer code means for proximity sorting, and sorting by luminosity, or the norm of state, sorting using a spatial hierarchy, and sorting using buckets enumerated by at least one space filling curve;

and wherein the simulating of Markov chains is utilized in light transport simulation for synthesizing realistic-appearing images.

\* \* \* \* \*